(12) United States Patent
Steinbauer et al.

(10) Patent No.: US 12,288,439 B1
(45) Date of Patent: Apr. 29, 2025

(54) APPARATUS AND METHOD FOR AN ORAL NICOTINE DISPENSING SYSTEM

(71) Applicant: SkyX IP Holdings I LLC, New York, NY (US)

(72) Inventors: Martin Steinbauer, New York, NY (US); Jeff Chagnon, Somerville, MA (US); Sylvere Azoulai, Mamaroneck, NY (US); Kylie Halperin, New York, NY (US); Christopher Russell, Glasgow (GB)

(73) Assignee: SkyX IP Holdings I LLC, New York, NY (US)

( * ) Notice: Subject to any disclaimer, the term of this patent is extended or adjusted under 35 U.S.C. 154(b) by 0 days.

(21) Appl. No.: 18/965,564

(22) Filed: Dec. 2, 2024

Related U.S. Application Data

(63) Continuation of application No. 18/918,529, filed on Oct. 17, 2024.

(60) Provisional application No. 63/661,625, filed on Jun. 19, 2024, provisional application No. 63/634,965, filed on Apr. 17, 2024.

(51) Int. Cl.
| | |
|---|---|
| G07F 17/00 | (2006.01) |
| G07F 9/00 | (2006.01) |
| G07F 11/58 | (2006.01) |

(52) U.S. Cl.
CPC .......... *G07F 17/0092* (2013.01); *G07F 9/009* (2020.05); *G07F 11/58* (2013.01)

(58) Field of Classification Search
CPC ...................... B65D 83/0418; B65D 2583/005
USPC .................................................. 221/197, 198
See application file for complete search history.

(56) References Cited

U.S. PATENT DOCUMENTS

| | | | |
|---|---|---|---|
| 8,499,966 B2 * | 8/2013 | Palmer | A61K 9/2018 604/59 |
| 8,905,964 B2 | 12/2014 | Poutiatine et al. | |
| 11,805,812 B1 * | 11/2023 | Nekos | A24F 40/48 |
| 2002/0175238 A1 * | 11/2002 | Hatano | G11B 23/107 242/348 |
| 2005/0199023 A1 | 9/2005 | Ritson | |
| 2008/0024272 A1 | 1/2008 | Fiske | |
| 2013/0166066 A1 | 6/2013 | Dunn | |
| 2014/0339249 A1 * | 11/2014 | Reddy | G16H 20/13 221/1 |
| 2015/0267690 A1 | 9/2015 | Foshansky et al. | |
| 2021/0100285 A1 * | 4/2021 | Spencer | A24F 40/42 |

(Continued)

FOREIGN PATENT DOCUMENTS

| | | |
|---|---|---|
| WO | 2003034848 A1 | 5/2003 |
| WO | 2009152833 A1 | 12/2009 |

OTHER PUBLICATIONS

International Search Report of PCT/US2024/058006 dated Jan. 27, 2025.

*Primary Examiner* — Timothy R Waggoner
(74) *Attorney, Agent, or Firm* — POLSINELLI PC

(57) ABSTRACT

An apparatus and method for an oral nicotine dispensing system. The apparatus includes storing a plurality of a pods in a magazine within a body, receiving a fingerprint scan from a user via a fingerprint scanner coupled to the body, authenticating the fingerprint scan, de-activating a locking mechanism to allow access to at least a pod upon successful authentication of the fingerprint scan, and dispensing, using at least a drive mechanism, the at least a pod from the magazine through an opening of the body.

20 Claims, 60 Drawing Sheets

(56) References Cited

U.S. PATENT DOCUMENTS

| | | |
|---|---|---|
| 2021/0392952 A1 | 12/2021 | Werny et al. |
| 2022/0028515 A1 | 1/2022 | Amoyal et al. |
| 2022/0031972 A1 | 2/2022 | Davidson et al. |
| 2022/0313558 A1 | 10/2022 | Duda et al. |
| 2023/0080576 A1* | 3/2023 | Businelle .............. A61J 7/0481 221/7 |
| 2023/0180826 A1* | 6/2023 | Murison .................. B67D 7/42 206/255 |

* cited by examiner

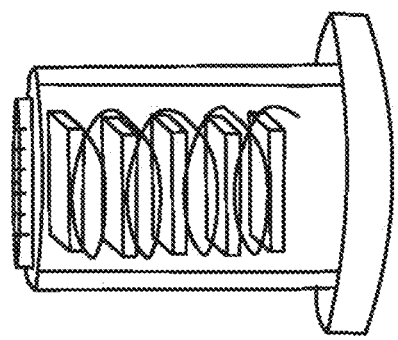
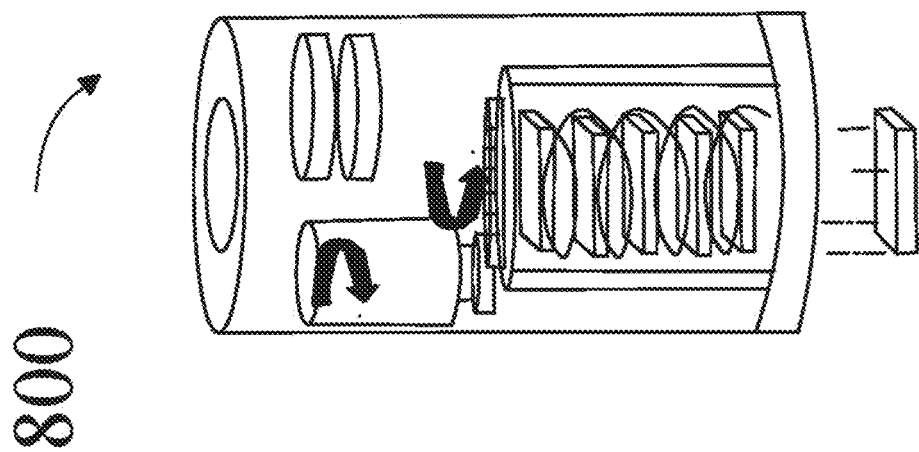
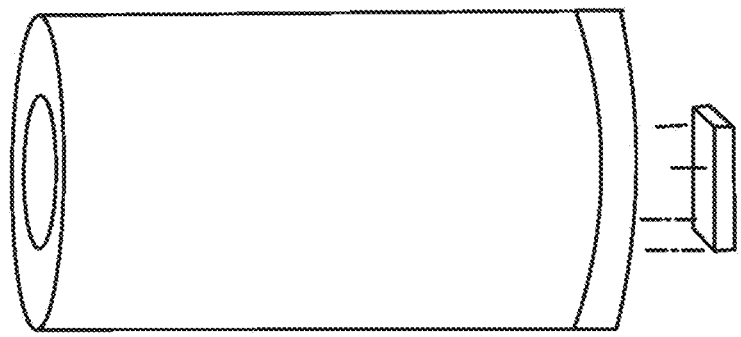
FIG. 8

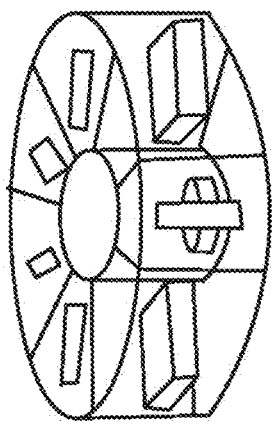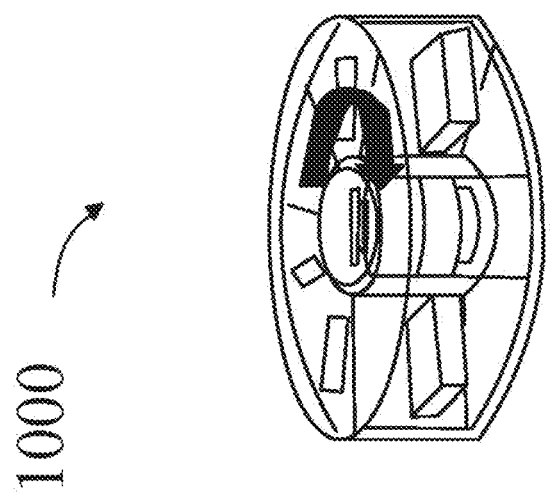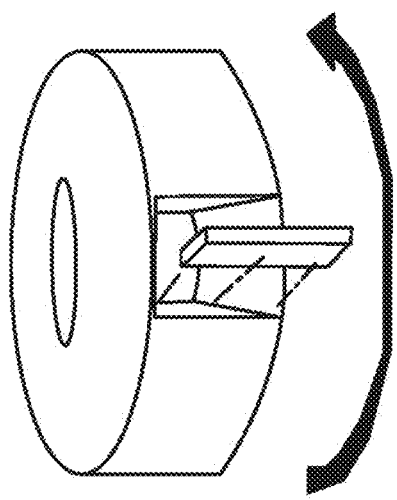
FIG. 10

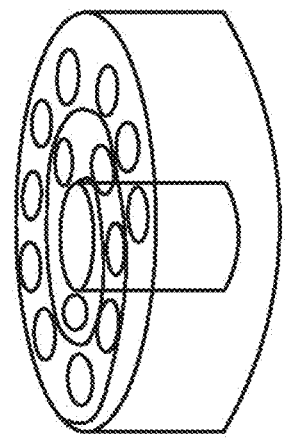
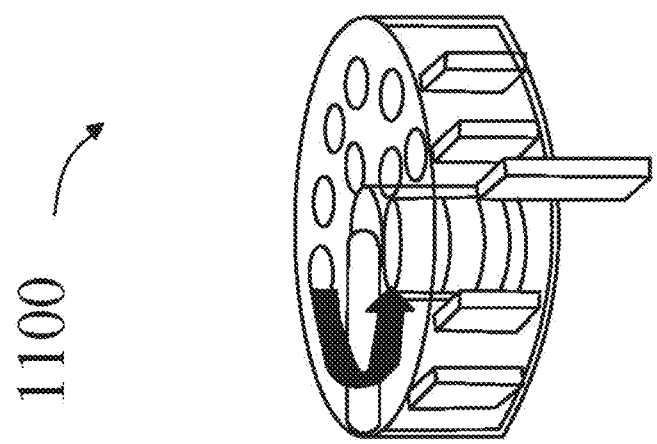
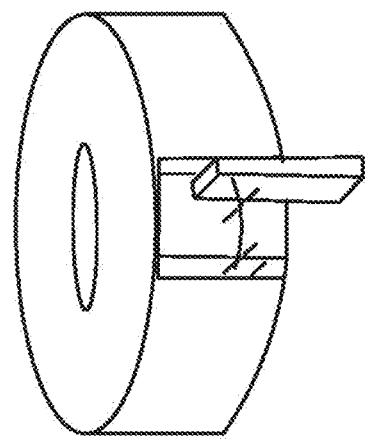
FIG. 11

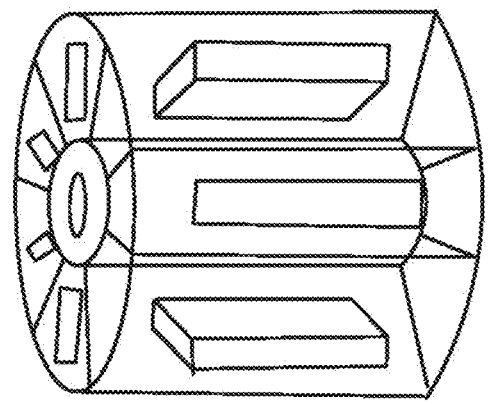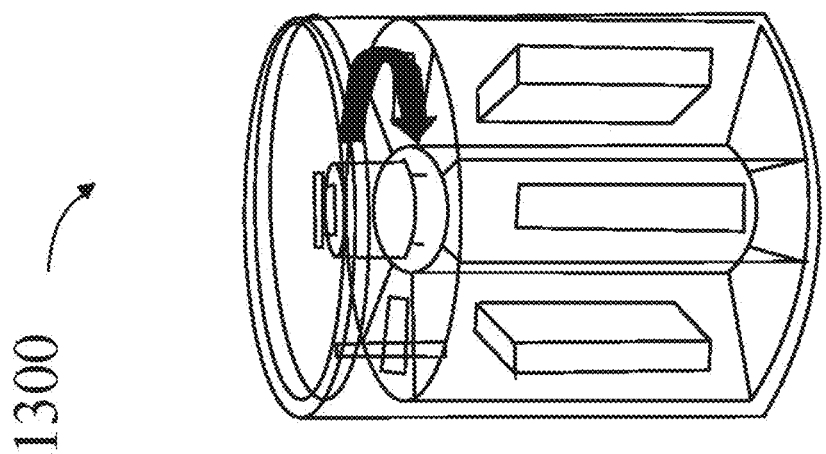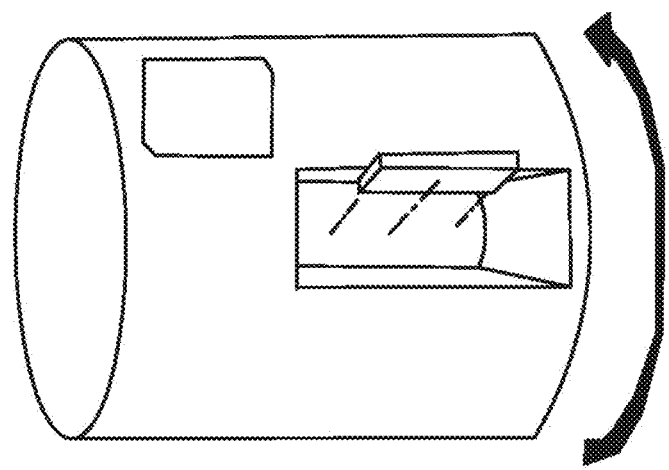
FIG. 13

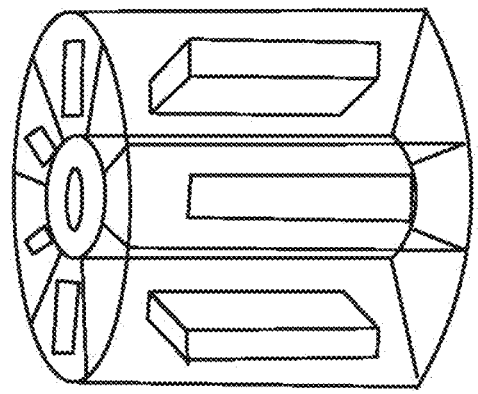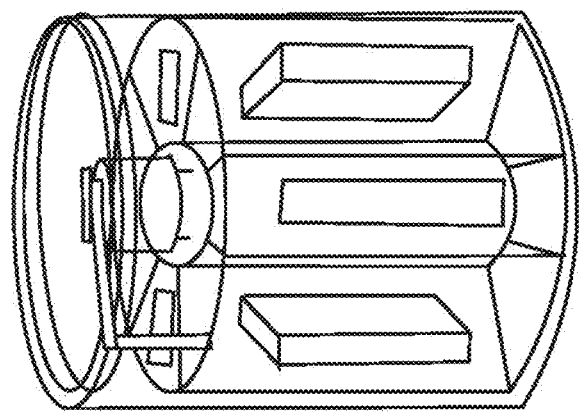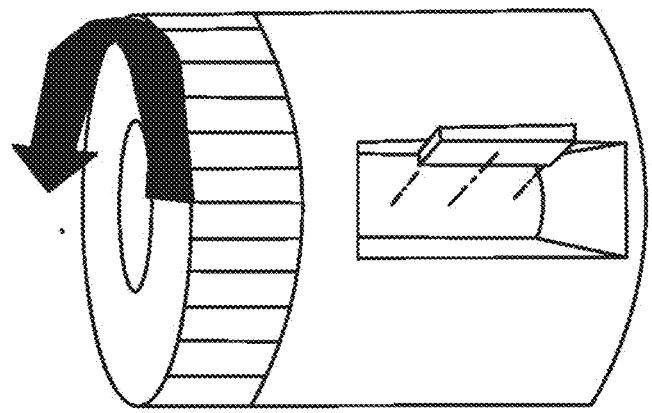
FIG. 15

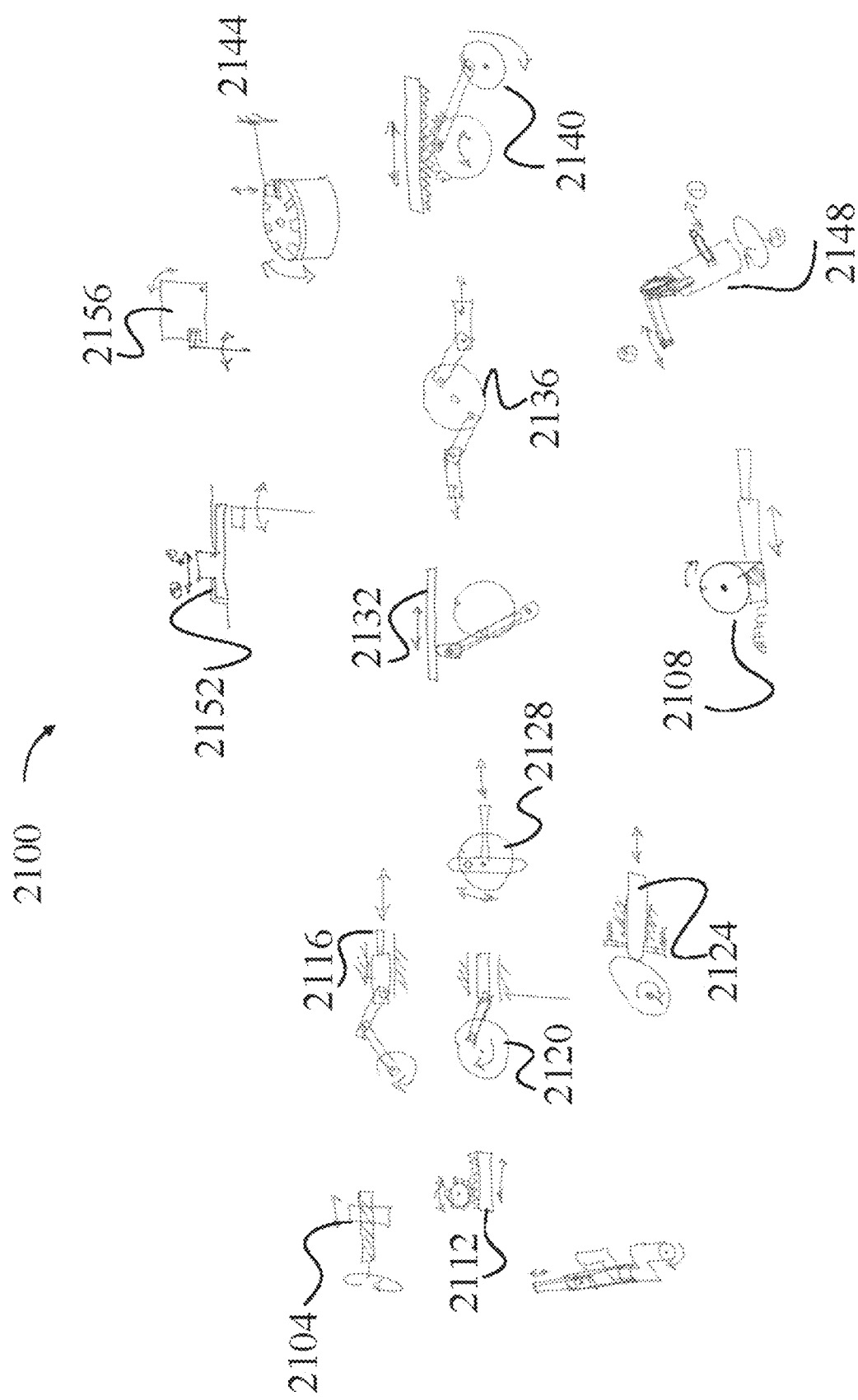

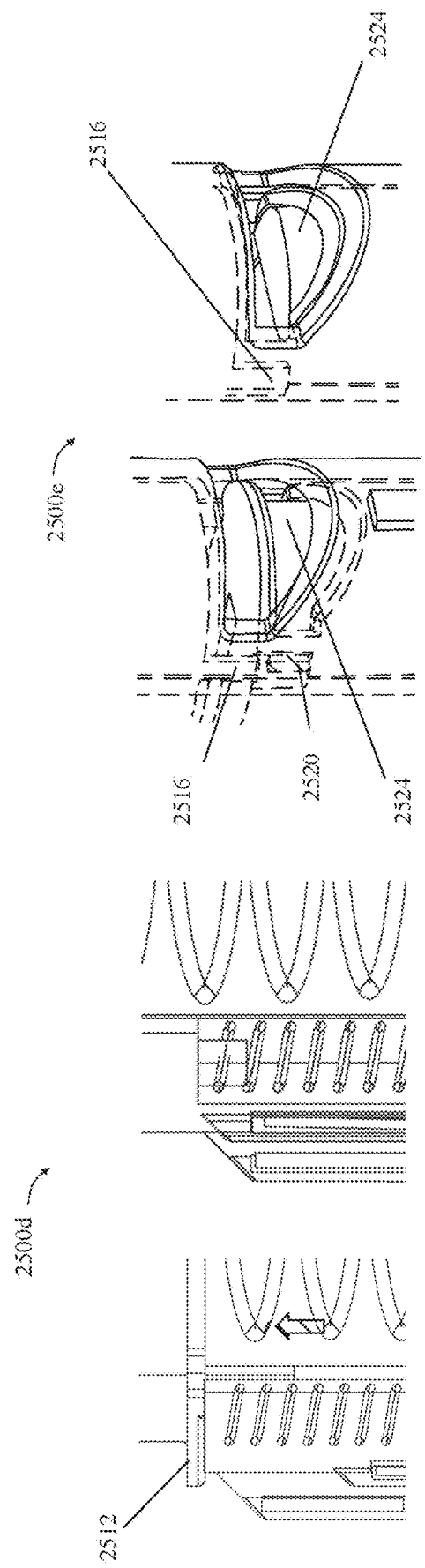

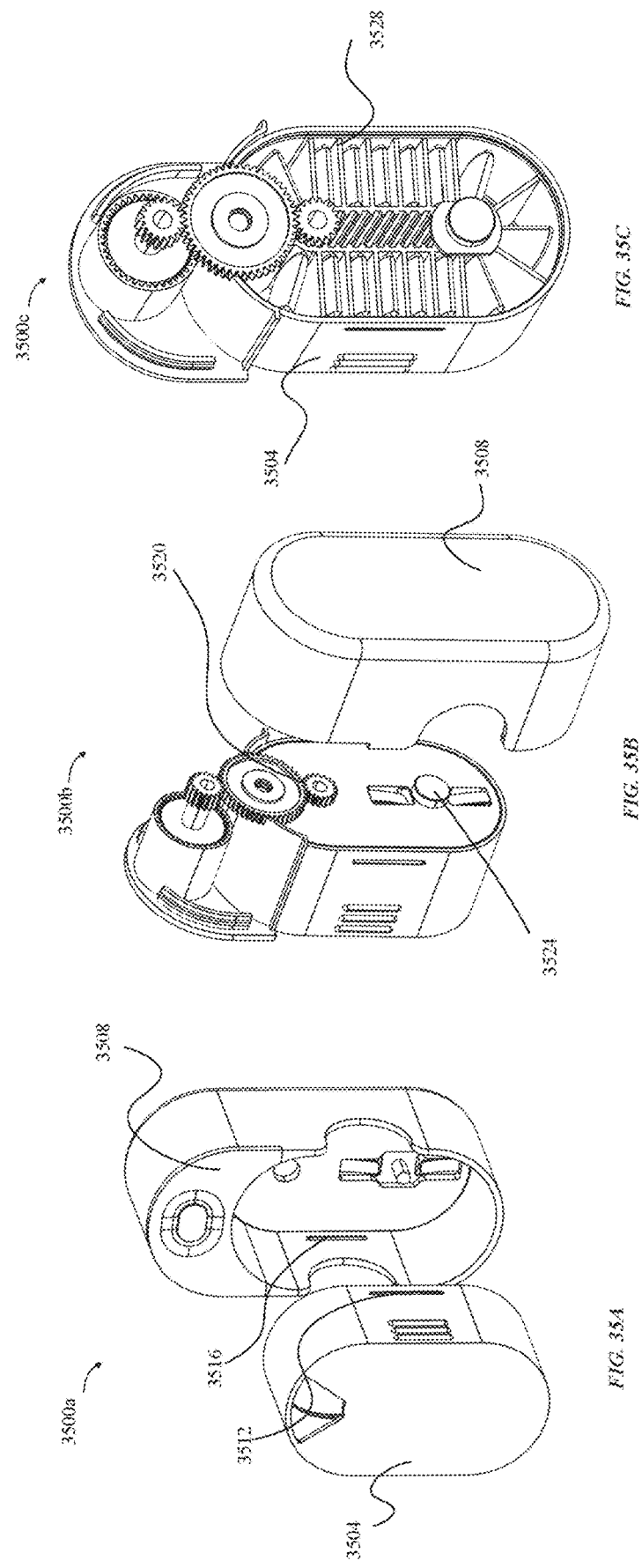

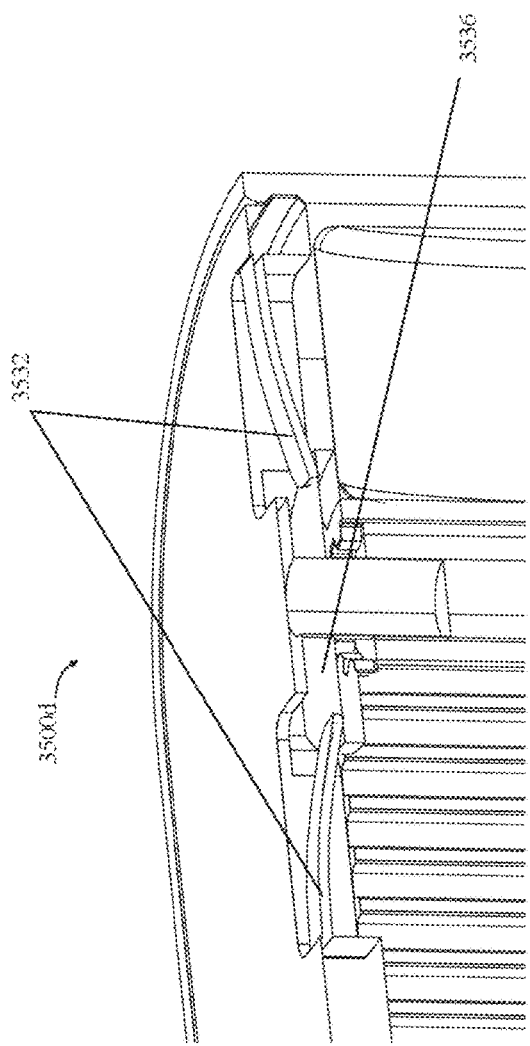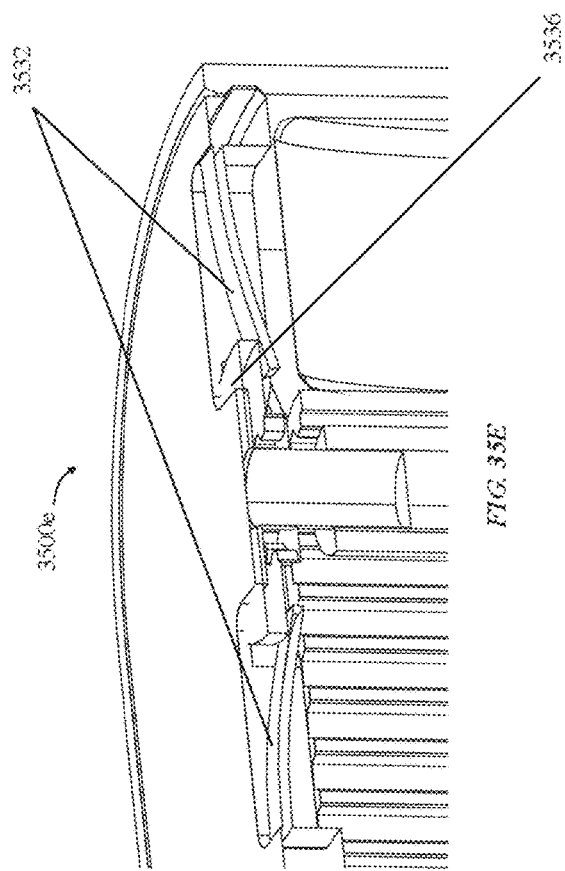

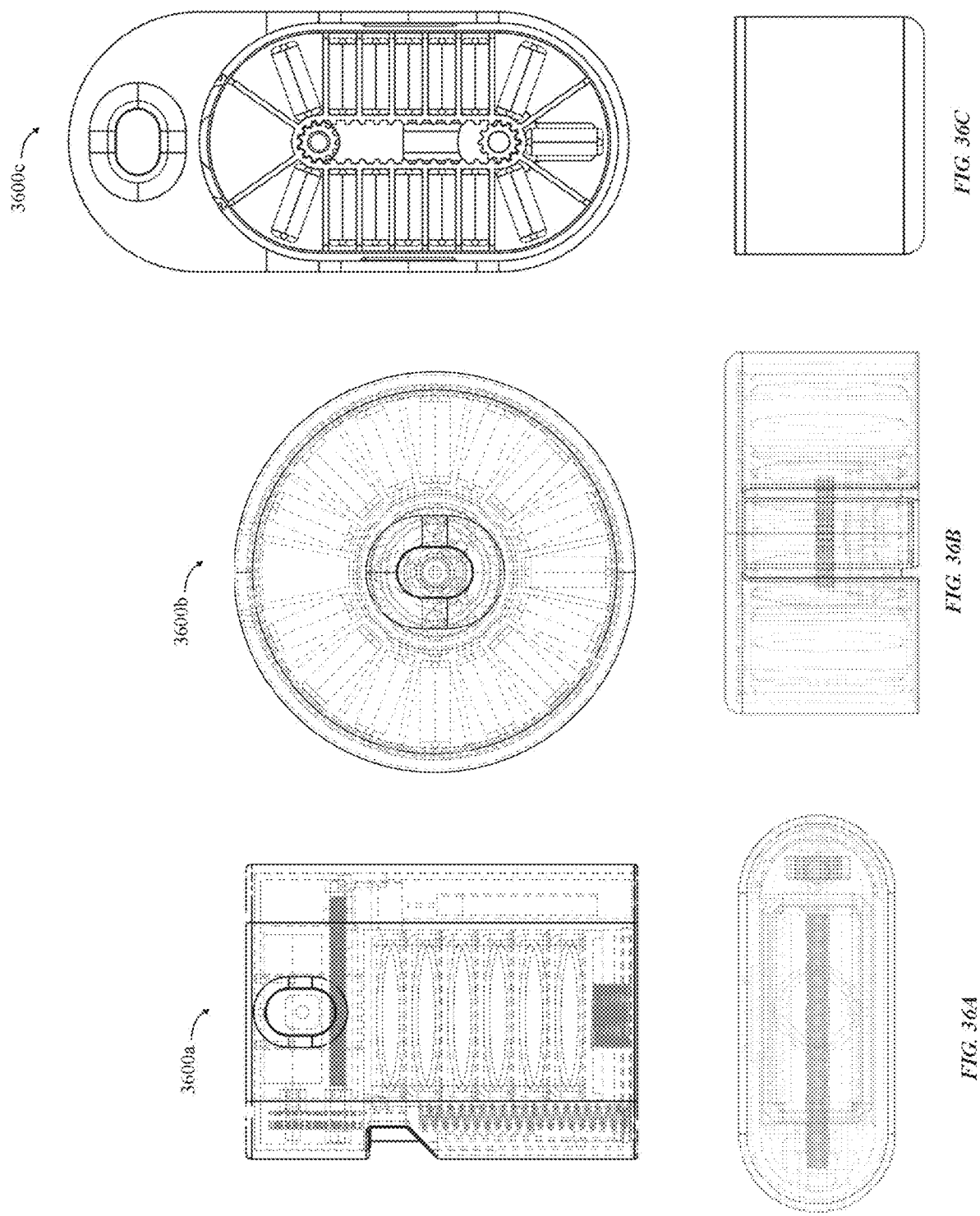

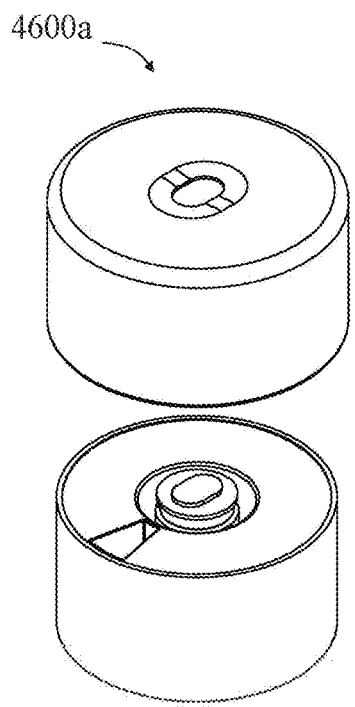
*FIG. 46A*
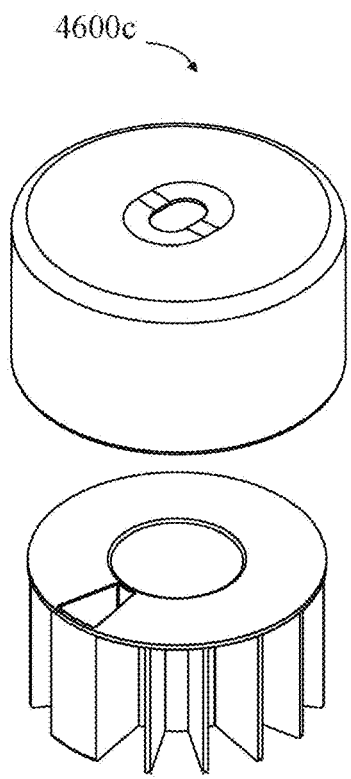
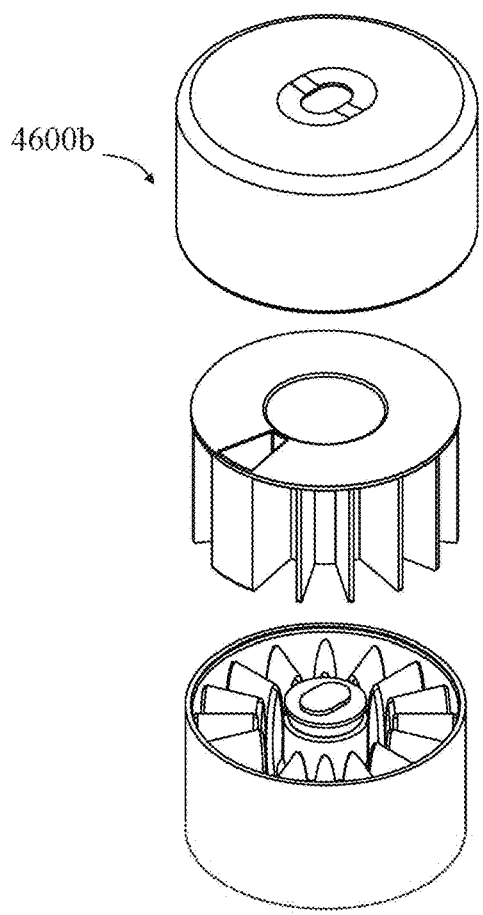
*FIG. 46B*
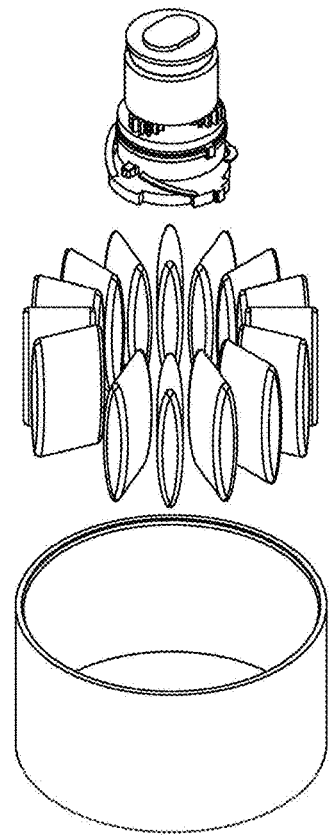
*FIG. 46C*

```
                    4900

┌─────────────────────────────────┐
        │ Storing A Plurality Of A Pods In A │─── 4905
        │    Magazine Within A Body        │
        └─────────────────────────────────┘
                      │
                      ▼
        ┌─────────────────────────────────┐
        │  Receiving A Fingerprint Scan From A │
        │ User Via A Fingerprint Scanner Coupled │─── 4910
        │           To The Body            │
        └─────────────────────────────────┘
                      │
                      ▼
        ┌─────────────────────────────────┐
        │  Authenticating The Fingerprint Scan │─── 4915
        └─────────────────────────────────┘
                      │
                      ▼
        ┌─────────────────────────────────┐
        │  De-Activating A Locking Mechanism │
        │   To Allow Access To At Least A Pod │─── 4920
        │  Upon Successful Authentication Of The │
        │         Fingerprint Scan          │
        └─────────────────────────────────┘
                      │
                      ▼
        ┌─────────────────────────────────┐
        │ Dispensing, Using At Least A Drive │
        │ Mechanism, The At Least A Pod From │─── 4925
        │ The Magazine Through An Opening Of │
        │             The Body              │
        └─────────────────────────────────┘
```

*FIG. 49*

APPARATUS AND METHOD FOR AN ORAL NICOTINE DISPENSING SYSTEM

CROSS-REFERENCE TO RELATED APPLICATIONS

This application is a continuation of U.S. patent application Ser. No. 18/918,529, filed on Oct. 17, 2024, and titled "APPARATUS AND METHOD FOR AN ORAL NICOTINE DISPENSING SYSTEM", which claims the benefit U.S. Provisional Patent Application Ser. No. 63/661,625, filed on Jun. 19, 2024, and titled "ORAL NICOTINE DISPENSING SYSTEM," and claims the benefit of priority of U.S. Provisional Patent Application Ser. No. 63/634,965, filed on Apr. 17, 2024, and titled "METHOD AND APPARATUS FOR DISPENSING ORAL NICOTINE," both of which is incorporated by reference herein in its entirety.

FIELD OF THE INVENTION

The present invention generally relates to the field of nicotine delivery system. In particular, the present invention is directed to an apparatus and a method for dispensing oral nicotine.

BACKGROUND

Oral nicotine products are used as alternatives to traditional tobacco products and have been licensed as nicotine replacement therapies. However, concerns persist regarding unauthorized access to these nicotine products, particularly by minors. Current packaging and dispensing methods often lack robust mechanisms to prevent misuse or ensure proper dosage control. Additionally, existing systems may not adequately address issues of product authenticity, supply chain transparency, and regulatory compliance. As oral nicotine products continue to evolve, there is a growing need for innovative dispensing solutions that can enhance safety, improve user experience, and provide better control over product access and usage.

SUMMARY OF THE DISCLOSURE

In an aspect, an apparatus for an oral nicotine dispensing system includes a body, wherein the body configured to hold at least a pod of a plurality of pods, a fingerprint scanner coupled to the body, wherein the fingerprint scanner is configured to authenticate a user, a locking mechanism coupled to the fingerprint scanner, wherein the locking mechanism is configured to allow authorized access to the at least a pod, a drive mechanism, wherein the drive mechanism dispenses the at least a pod upon successful authentication, a magazine within the body and coupled to the drive mechanism, wherein the magazine is configured to store the plurality of pods and guide, using the drive mechanism, the at least a pod into a dispensing position, an aperture located on the body, wherein the aperture is configured to allow the at least a pod to move from within the body to exterior environment.

In another aspect, a method for an oral nicotine dispensing system includes storing a plurality of a pods in a magazine within a body, receiving a fingerprint scan from a user via a fingerprint scanner coupled to the body, authenticating the fingerprint scan, de-activating a locking mechanism to allow access to at least a pod upon successful authentication of the fingerprint scan, and dispensing, using at least a drive mechanism, the at least a pod from the magazine through an opening of the body.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8 is an exemplary illustration of a helix concept for an apparatus;

FIG. 10 is an exemplary illustration of a spoke direct drive concept for an apparatus;

FIG. 11 is an exemplary illustration of a nebula concept for an apparatus;

FIG. 13 is an exemplary illustration of a colt concept for an apparatus;

FIG. 15 is an exemplary illustration of a vortex concept for an apparatus;

FIG. 21 is an exemplary illustration of a plurality of unlocking mechanisms;

FIG. 25D is an exemplary illustration of a magazine door locked into a stored state;

FIG. 25E is an exemplary illustration of an interaction between a metal snap arm and a magnet as a magazine is loaded into the dispenser;

FIG. 35A is an exemplary illustration of an exploded view of a pod-guidance channel concept for an apparatus with a detent feature;

FIG. 35B is an exemplary illustration of an exploded view of a pod-guidance channel concept for an apparatus with an idler gear and a magnetic locking mechanism;

FIG. 35C is an exemplary illustration of a conveyor magazine in a pod-guidance channel concept of an apparatus;

FIG. 35D, an exemplary illustration of a disk and one or more snap arms in the locked state;

FIG. 35E, an exemplary illustration of a disk and one or more snap arms in the unlocked state;

FIG. 36A is an exemplary illustration of a launchpad concept for an apparatus;

FIG. 36B is an exemplary illustration of a spoke concept for an apparatus;

FIG. 36C is an exemplary illustration of a conveyor concept for an apparatus;

FIG. 46A is an exemplary illustration of an isometric view of an apparatus with the cover removed;

FIG. 46B is an exemplary illustration of an isometric view of an apparatus in a semi-exploded view;

FIG. 46C is an exemplary illustration of an isometric view of an apparatus in an exploded view;

FIG. 49 is a block diagram of an exemplary method for an oral nicotine dispensing system;

Figure 1:
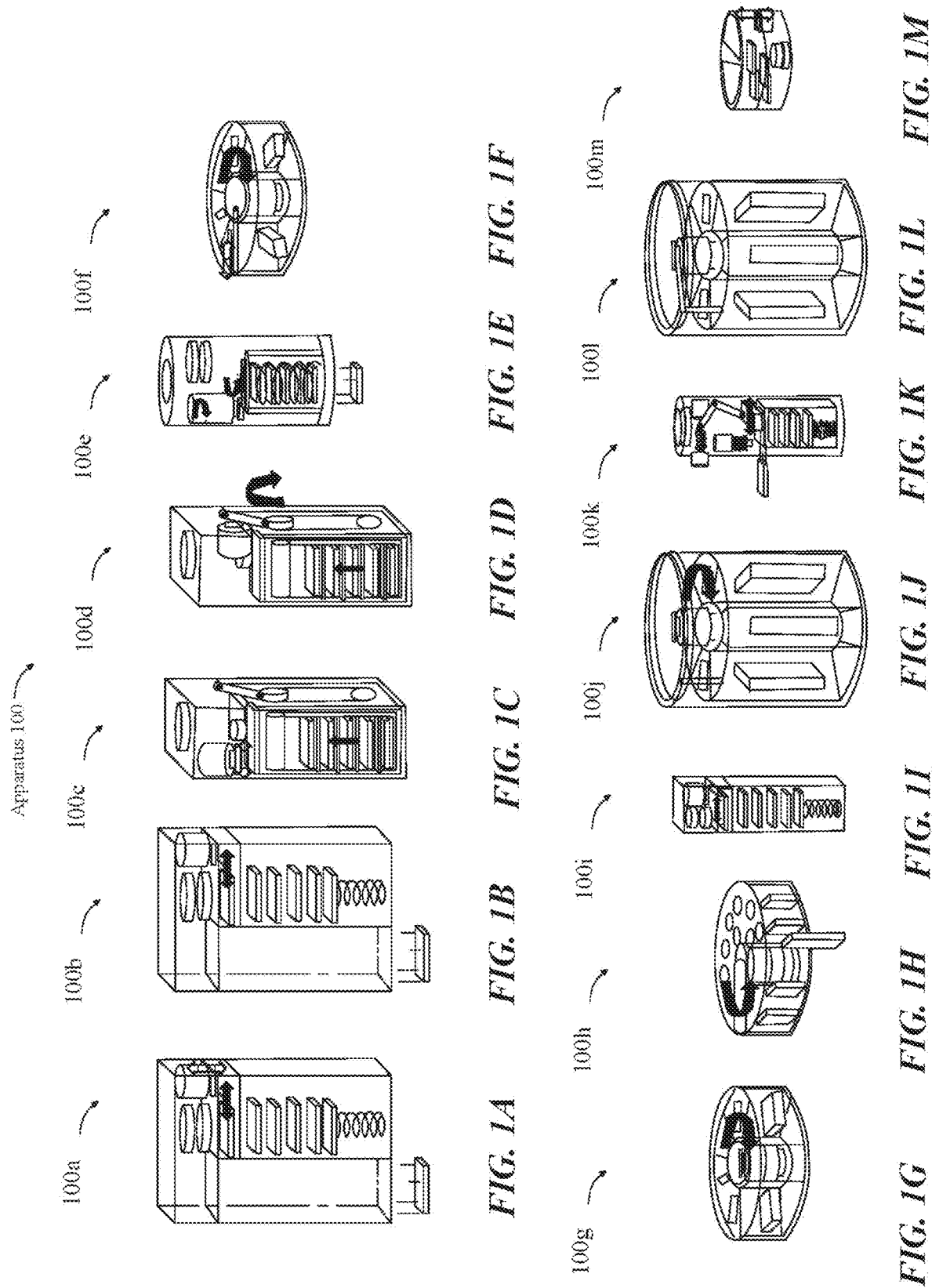
FIG. 1A-1M is an illustration of different embodiments of an apparatus for an oral nicotine dispensing system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for an oral nicotine dispensing system. The apparatus includes a body, wherein the body is configured to hold at least a pod of a plurality of pods, a fingerprint scanner coupled to the body, wherein the fingerprint scanner is configured to authenticate a user, a locking mechanism coupled to the finger scanner, wherein the locking mechanism is configured to allow authorized access to the at least a pod, a drive mechanism, wherein the drive mechanism dispenses the at least a pod upon successful authentication, a magazine within the body and coupled to the drive mechanism, wherein the magazine is configured to store the plurality of pods and guide, using the drive mechanism, the at least a pod into a dispensing position, an aperture located on the body, wherein the aperture is configured to allow the at least a pod to move from within the body to exterior environment.

Referring now to FIG. 1A-1M, an illustration, 100, of different embodiments of an apparatus for an oral nicotine dispensing system. The apparatus 100 may include various configurations, including apparatus 100a, apparatus 100b, apparatus 100c, apparatus 100d, apparatus 100e, apparatus 100f, apparatus 100g, apparatus 100h, apparatus 100i, apparatus 100j, apparatus 100k, apparatus 100l, and apparatus 100m, each designed to hold and dispense at least a pod of a plurality of pods. The apparatus 100 may include components such as an exterior shell, an interior shell, a button, a fingerprint scanner, a locking mechanism, a drive mechanism, a magazine, and an aperture.

In an embodiment, apparatus 100a may include an exterior shell coupled to a top exterior surface and a bottom exterior surface, with the top exterior surface opposite the bottom exterior surface. The exterior shell includes a front exterior surface and a back exterior surface, with the front exterior surface opposite the back exterior surface. The body is configured to hold at least a pod of a plurality of pods within an interior shell, which is located within the exterior shell and coupled to a top interior surface and a bottom interior surface. The top interior surface is opposite the bottom interior surface, and the interior shell includes a front interior surface and a back interior surface, with the front interior surface opposite the back interior surface. In a non-limiting example, apparatus 100a may include a cuboid body with a single button on the front surface. Without limitation, a user's thumb may be scanned, using a fingerprint scanner, and then the button pushed up to drive a mechanism that pushes out at least a pod. Without limitation, internally a rechargeable battery may power a motor which may unlock the slider when a fingerprint is read. Without limitation, at least a pod may advance and fall down a chute. Continuing, the magazine may include a vault and at least a pod may be advanced by a spring which compresses a plurality of pods in a line. Without limitation, apparatus 100a is illustrated in more detail in FIG. 4.

In an embodiment, apparatus 100b is similar to apparatus 100a but may include additional features such as a button coupled to the body. The button is configured to interact with the drive mechanism to dispense at least a pod. Without limitation, the apparatus 100b may include a fingerprint scanner coupled to the button, which may be configured to authenticate a user before allowing access to the at least a pod. In a non-limiting example, 100b may be configured to so that the user does not have to move the button. Continuing, after a positive scan the motor may advance the drive mechanism instead of unlocking the mechanism. Without limitation, this configuration may require less complexity and mechanisms if done this way. Continuing, since the user cannot access any internal workings of the apparatus 100b the risk for tampering/overpowering may be decreased. Without limitation, apparatus 100b is illustrated in more detail in FIG. 5.

In an embodiment, apparatus 100c includes a locking mechanism coupled to the fingerprint scanner. The locking mechanism is configured to allow authorized access to at least a pod upon successful authentication. The drive mechanism in apparatus 100c dispenses at least a pod upon successful authentication, ensuring secure and controlled dispensing. In a non-limiting example, 100c may include a cuboid body with a single button on the front surface and a flip top. Without limitation, a user's thumb may be scanned and the user may flip open the top compartment to reveal at least a pod. Without limitation, internally a disposable button battery in the magazine powers a motor which may unlock the flip top when a fingerprint is read. Continuing, the opening of the top door may mechanically advance the conveyor belt holding a plurality of pods. Continuing, the at least a pod may rise into view for the user to grab. The magazine may include a vault and the plurality of pods may be advanced by rotating the conveyor belt which may hold the at least a pod in an individual rack. Without limitation, apparatus 100c is illustrated in more detail in FIG. 6.

In an embodiment, apparatus 100d may include a magazine within the body, coupled to the drive mechanism. The magazine may be configured to store the plurality of pods and guide, using the drive mechanism, at least a pod into a dispensing position. The magazine may ensure that the pods are held securely and are properly aligned for dispensing. In a non-limiting example, 100d may be similar to 100c however it may include a top flap and or door that may be configured to be opened at any time. Continuing, after a positive scan the motor may advance the conveyor mechanism instead of unlocking the mechanism. Without limitation, apparatus 100d is illustrated in more detail in FIG. 7.

In an embodiment, apparatus 100e may include an aperture located on the body. Without limitation, the aperture may be configured to allow at least a pod to move from within the body to the exterior environment, facilitating the dispensing of the pod to the user. The aperture may include a sliding cover or a flexible membrane to protect the internal components from dust, debris, and unauthorized access. In a non-limiting example, 100e may include a cylindrical body with a single button on the front surface. Without limitation, a thumb may be scanned to advance the at least a pod internally for dispensing. Internally, a rechargeable battery may power a motor which rotates a helix within the magazine when a fingerprint is read. Continuing, the rotation of the helix may advance each at least a pod together and at a certain point at least a pod may fall out of the drive mechanism. The magazine may include a vault and at least a pod is may only dispensed by programmed and hidden internal motion which rotates the helix. Without limitation, apparatus 100e is illustrated in more detail in FIG. 8.

In an embodiment, apparatus 100f may include a cylindrical shape, providing a smooth, continuous surface that may be easily gripped and handled by the user. The cylindrical shape may enhance the ergonomic design of the apparatus, making the apparatus comfortable to hold and operate. The cylindrical shape may allow for efficient use of space within the apparatus, providing a compact and streamlined design that houses the internal components securely and effectively. In a non-limiting example, 100f may include a single button on the top surface which may scan the user's fingerprint and then may be advanced radially or tangentially to advance the internal "wheel spoke" magazine. Continuing, a thumb may be scanned and then the dial may automatically advance to reveal the next waiting at least a pod. Continuing, internally a disposable button battery in the magazine may power a motor which unlocks the "wheel spoke" rotation when a fingerprint is read. Continuing, the rotation of the wheel may advance the next compartment to be exposed to the user. The magazine may be a vault and at least a pod may be advanced when the user provides adequate force to rotate the wheel. Without limitation, apparatus 100f is illustrated in more detail in FIG. 9.

In an embodiment, apparatus 100g may include a rotating conveyor belt within the magazine. The rotating conveyor belt is configured to advance at least a pod using a rack of a plurality of racks. The conveyor belt ensures that the pods are moved smoothly and reliably to the dispensing position. In a non-limiting example, 100g may include the difference between this version and the original is that the user does not have to move the button. Continuing, after a positive scan the motor may advance the wheel spoke component instead of unlocking the mechanism. Without limitation, apparatus 100g is illustrated in more detail in FIG. 10.

In an embodiment, apparatus 100h may include a wheel spoke shape with at least a compartment for at least a pod. The wheel spoke shape allows for the organization and alignment of multiple compartments around a central axis, facilitating the efficient storage and dispensing of the pods. In a non-limiting example, 100h may include a cylindrical body with a single button on the top surface which scans the fingerprint. Continuing, a fingerprint may be scanned and then the dial may automatically advance to push the next at least a pod out of the access door. Continuing, internally a rechargeable battery may power a motor which may advance the spiral ejection component when a fingerprint is read. Continuing, the rotation of the ejection mechanism may advance the plurality of pods together and may eject each individual pod through operation. Continuing, the magazine may be a vault and the at least a pod may be advanced when the drive mechanism pushes them along the spiral pathway of the disposable. Without limitation, apparatus 100h is illustrated in more detail in FIG. 11.

In an embodiment, apparatus 100i may include a linear tray configuration for dispensing the pods. Continuing, the linear tray configuration may allow the plurality of pods to be arranged in a straight line within a tray, and the drive mechanism may move the tray linearly to position the next pod for dispensing. In a non-limiting example, 100i may include a cuboid body with a single button on the top surface. Continuing, a thumb may be scanned and then the device may eject at least a pod automatically. Continuing, internally a rechargeable battery may power a motor which may dispense at least a pod via shuttle mechanism. Continuing, the opening of the top door may mechanically advance the conveyor belt holding a plurality of pods and the at least a pod may rise into view for the user to grab. Continuing, the magazine may be a vault and at least a pod may be advanced by a spring which compresses all pouches in a line. Without limitation, apparatus 100i is illustrated in more detail in FIG. 12.

In an embodiment, apparatus 100j may include a cylindrical body with a single button on the side outer diameter surface which scans the fingerprint. Continuing, a fingerprint may be scanned and then the dial may automatically advance to reveal the next waiting pouch. Continuing, internally a disposable button battery in the magazine may power a motor which unlocks the revolver cylinder rotation when a fingerprint is read. Continuing, the rotation of the cylinder may advance the next compartment to be exposed to the user. Continuing, the magazine may be a vault and at least a pod may be advanced when the motor rotates the storage cylinder. Without limitation, apparatus 100j is illustrated in more detail in FIG. 13.

In an embodiment, apparatus 100k includes a revolver configuration, where a plurality of pods are loaded into a rotating cylinder. Continuing, the drive mechanism may rotate the cylinder to position the next pod in line with the dispensing opening, providing compact storage and quick access to the pods. In a non-limiting example, 100k may include a cylindrical body with a button on the side outer diameter near the top and a fingerprint scan button on the top of the cylinder. Continuing, a finger may pull in the charging button and then a thumb may be scanned. Continuing, internally, the charging button may function to use a piezo to generate electricity which is then stored in a capacitor and which may be used by the fingerprint scanner and solenoid, and may also function to charge the physical ejection spring. Continuing, after the fingerprint is scanned the solenoid may pull back and unlock the ejection shuttle which may eject at least a pod. Continuing, the device may be the vault and the at least a pod may be advanced by a spring which compresses the plurality of pods in a line. Without limitation, apparatus 100k is illustrated in more detail in FIG. 14.

In an embodiment, apparatus 100l include a cylindrical body with a single button on top and an external rotating dial on the top. Continuing, a digit may be scanned and then the user may rotate the top portion of the cylinder to advance the next pouch into view. Continuing, Internally a replaceable coin cell battery powers a motor which unlocks the "rotating dial user touch-point" after a fingerprint is read. Continuing, the rotation of the cylinder may advance the next compartment to be exposed to the user. Continuing, the device may be the vault and the at least a pod may be advanced when the storage cylinder is rotated by the user. Without limitation, apparatus 100l is illustrated in more detail in FIG. 15.

In an embodiment, apparatus 100m may include a gravity feed mechanism, where the plurality of pods may be stacked vertically. Continuing, gravity may cause the next pod to move into the dispensing position when the previous pod is removed, ensuring a consistent and reliable flow of pods. In a non-limiting example, 100m may include a cylindrical body with a single button on the lower outer diameter and an external rotating dial on the top. Continuing, a digit may be scanned and then the user may rotate the top portion of the cylinder to advance the opening alignment on top of the container. Continuing, internally a rechargeable battery may power a motor which may unlock the "rotating dial user touch-point" after a fingerprint is read. Continuing, the rotation of the cylinder may allow the internal compartment to be exposed to the user. Continuing, the device may be the vault and the at least a pod may be exposed when the openings are aligned by the user. Continuing, the use case may include either the user emptying a newly purchased container of pouches into this higher security container, or this container "clamps/encapsulates" a currently marketed container with its door open or top off. Without limitation, apparatus 100m is illustrated in more detail in FIG. 16.

Figure 2:
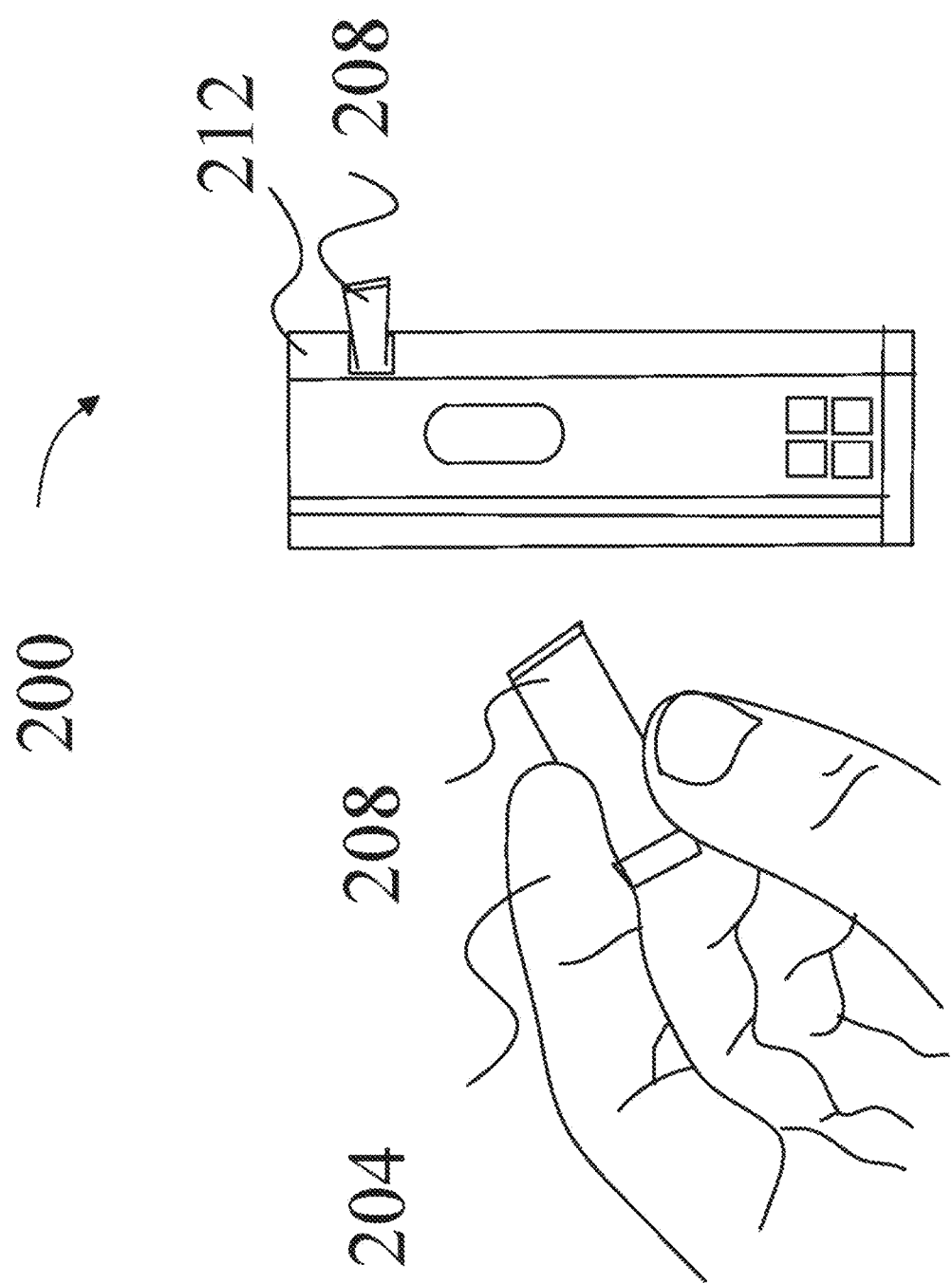
FIG. 2 is an illustration of a user's hand holding at least a pod and an apparatus for dispensing the at least a pod in the background.

Referring now to FIG. 2, an illustration, 200, of a user's hand holding at least a pod and an apparatus for dispensing the at least a pod in the background. Without limitation, FIG. 2, may illustrate the interaction between the user 204 and the apparatus 212, demonstrating the process of dispensing the at least a pod 208. In an embodiment, the user's hand may be depicted holding the at least a pod 208, indicating the manual handling and retrieval of the pod from the apparatus 212. Continuing, the user's hand may be positioned to grasp the at least a pod 208 securely, showcasing the ergonomic design of the at least a pod for easy handling. Continuing, the at least a pod 208 may be shown as a small, compact unit designed for oral nicotine delivery. Continuing, the at least a pod 208 may be configured to be dispensed from the apparatus 212 and held comfortably by the user. Without limitation, the design of the at least a pod 208 ensures that the at least a pod 208 may be easily retrieved and used by the user. Continuing, the apparatus 212 may be depicted in the background, illustrating the role of the apparatus 212 in dispensing the at least a pod 208. The apparatus 212 may include a dispensing mechanism that releases the at least a pod 208 upon successful authentication.

Figure 3:
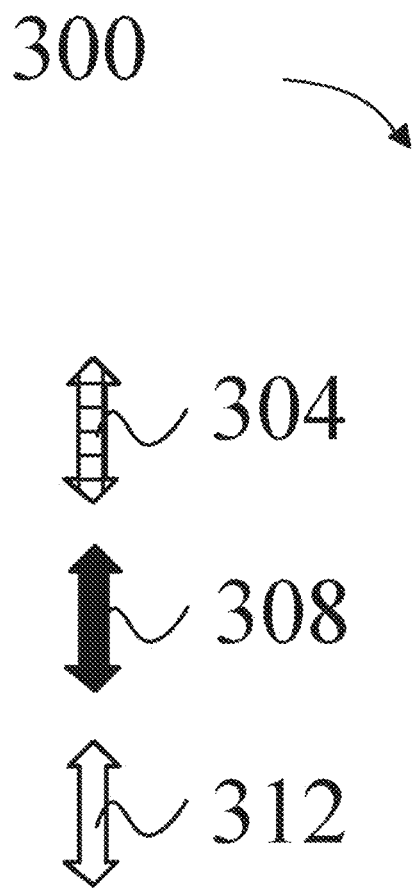
FIG. 3 is an exemplary illustration of a key lock feature movement arrow, an internal mechanism movement arrow, and a user interface movements arrow.

Referring now to FIG. 3, an exemplary illustration, 300, of a key lock feature movement arrow, an internal mechanism movement arrow, and a user interface movements arrow used to describe the motion of the apparatus as described herein. In an embodiment, the illustration, 300, includes a lock feature movement arrow 304, an internal mechanism movement arrow 308, and a user interface movements arrow 312. Without limitation, the lock feature movement arrow 304 may indicate the direction of movement for the lock feature. The lock feature, as discussed herein, may secure the apparatus and prevent unauthorized access. The lock feature movement arrow 304 may show the movement required to engage or disengage the lock, ensuring that the apparatus remains secure when not in use.

With continued reference to FIG. 3, the internal mechanism movement arrow 308 may illustrate the direction of movement for the internal mechanism. Continuing, this component may be responsible for the internal operations of the apparatus, such as advancing the at least a pod to the dispensing position. The internal mechanism movement arrow 308 may show the movement necessary for the internal components to function correctly, ensuring smooth and reliable operation.

With continued reference to FIG. 3, the user interface movements arrow 312 may indicate the direction of movement for the user interface. Continuing, this component may allow the user to interact with the apparatus, such as pressing a button or activating a fingerprint scanner. The user interface movements arrow 312 may show the movement required for the user interface to operate, providing an indication of how the user interacts with the apparatus.

Figure 4:
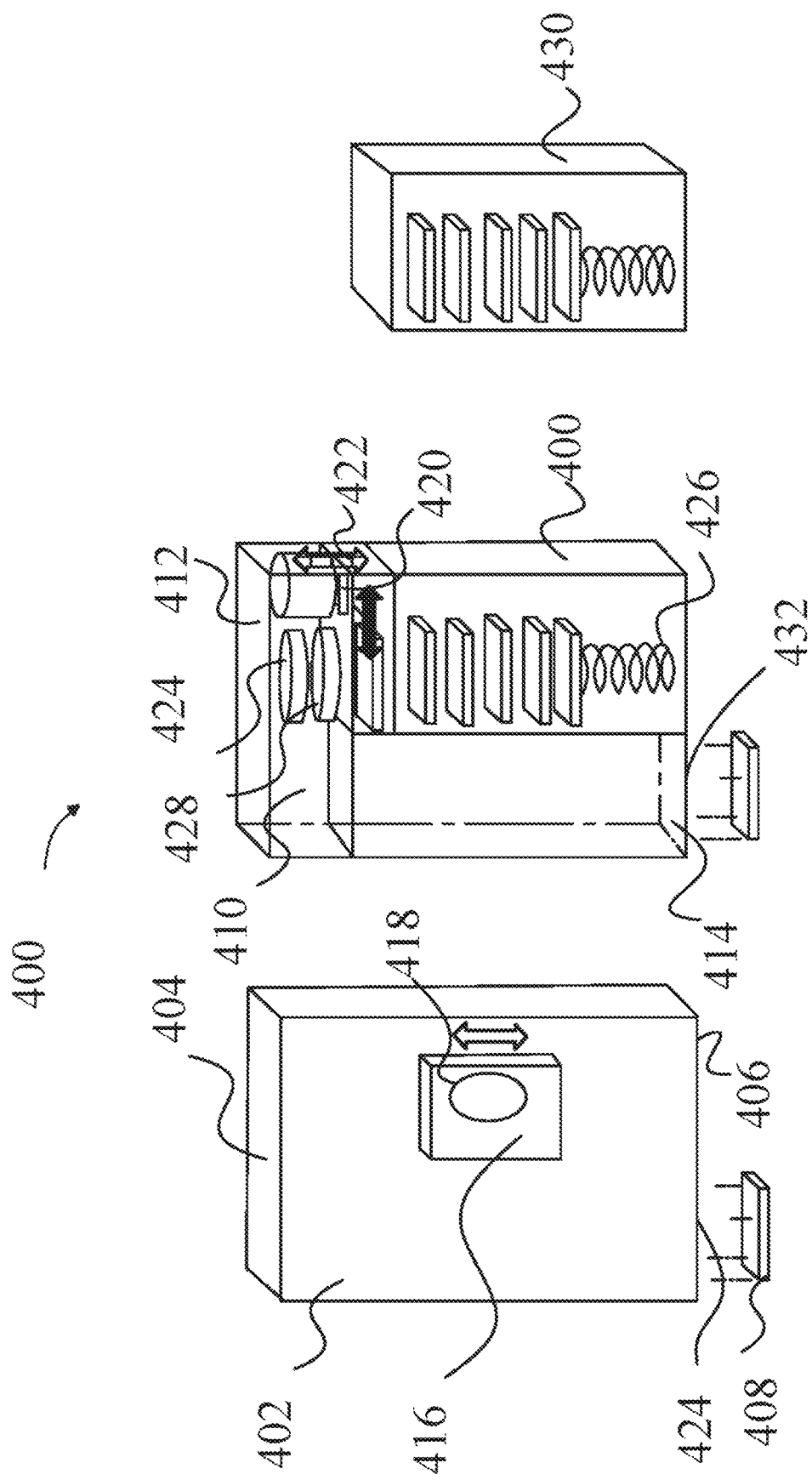
FIG. 4 is an exemplary illustration of a gravity-feed concept for an apparatus.

Referring now to FIG. 4, an exemplary embodiment of a gravity-feed concept apparatus 400 for dispensing oral nicotine is illustrated. Apparatus 400 includes a body, wherein the body may include an exterior shell 402 coupled to a top exterior surface 404 and a bottom exterior surface 406, wherein the top exterior surface 404 is opposite the bottom exterior surface 406, the exterior shell 402 comprising a front exterior surface and a back exterior surface, wherein the front exterior surface is opposite the back exterior surface, the body is configured to hold at least a pod 408 of a plurality of pods within an interior shell 410, the interior shell 410 located within the exterior shell 402 coupled to a top interior surface 412 and a bottom interior surface 414, wherein the top interior surface 412 is opposite the bottom interior surface 414, the interior shell 410 comprising a front interior surface and a back interior surface, wherein the front interior surface is opposite the back interior surface. As used in this disclosure, a "body" is the primary structure of the apparatus which encloses and supports the components necessary for dispensing the pods. Without limitation, the body may be composed of various materials that provide durability, structural integrity, and protection for the internal components. In a non-limiting example, the body may be made from high-strength plastics such as polycarbonate (PC), acrylonitrile butadiene styrene (ABS), or polyethylene terephthalate glycol (PETG). Continuing, the aforementioned materials may offer impact resistance, lightweight properties, and ease of manufacturing. Additionally and or alternatively, the body may be composed of metals such as aluminum or stainless steel. Without limitation, metals may provide enhanced durability and a premium feel. In another non-limiting example, the body may include composite materials, such as carbon fiber-reinforced polymers. Continuing, without limitation, the composite materials may offer a combination of strength, lightweight properties, and aesthetic appeal. In another non-limiting example, the body may be designed with ergonomic considerations, featuring smooth surfaces and rounded edges to ensure comfortable handling by the user. As used in this disclosure, an "exterior shell" is the outermost layer of the body that provides structural integrity and protection to the internal components of the apparatus As used in this disclosure, a "top exterior surface" is the uppermost surface of the exterior shell 402, which is opposite the bottom exterior surface 406. In a non-limiting example, the top exterior surface 404 may include features such as button 416 or aperture 432 for user interaction. As used in this disclosure, a "bottom exterior surface" is the lowermost surface of the exterior shell 402, which is opposite the top exterior surface 404. As used in this disclosure, a "front exterior surface" is the surface of the exterior shell 402 that faces the user during normal operation. In a non-limiting example, the front exterior surface may feature user interface elements such as button 416, displays, or aperture 432 for dispensing pods. As used in this disclosure, a "back exterior surface" is the surface of the exterior shell 402 that is opposite the front exterior surface. In a non-limiting example, the back exterior surface may provide additional structural support and housing for internal components. Without limitation, the exterior surfaces of the body may be coated with materials that provide a tactile grip, such as rubberized coatings or textured finishes, to prevent slipping during use. Continuing, the choice of materials for the body may ensure that the apparatus is robust, user-friendly, and capable of withstanding daily wear and tear.

With continued reference to FIG. 4, as used in this disclosure, a "pod" is a pre-portioned amount of nicotine, flavorings, and or other ingredients designed for oral use. In a non-limiting example, the pod may include e-cigarette cartridges, nicotine chewing gum, nicotine lozenges, nicotine pouches, nicotine patches, nicotine containing loose leaf, and the like. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, e-cigarette cartridges, also known as vape cartridges or e-liquid cartridges, may include replaceable components of electronic cigarettes (e-cigarettes) that contain e-liquid. Without limitation, nicotine salt pods may include pre-filled cartridges designed for use in pod-based vaping systems. Continuing, nicotine salt pods may contain nicotine salts, which are a form of nicotine derived from the natural state of nicotine found in tobacco leaves and may include higher nicotine concentration and smoother throat hit. Without limitation, nicotine chewing gum may be designed to help individuals reduce or quit smoking. Without limitation, nicotine patches may include transdermal patches which may include adhesive patches that release nicotine through the skin over a period of time. As used in this disclosure, an "interior shell" is the innermost layer of the body that provides structural integrity and protection to the internal components of the apparatus. As used in this disclosure, a "top interior surface" is the uppermost surface of the interior shell 410, which is opposite the bottom interior surface 414. In a non-limiting example, the top interior surface 412 may interface with features such as the button 416 or the aperture 432 for user interaction. As used in this disclosure, a "bottom interior surface" is the lowermost surface of the interior shell 410, which is opposite the top interior surface 412. In a non-limiting example, the bottom interior surface 414 may provide a stable base for the magazine 430 to rest within as discussed in more detail below. In a non-limiting example, the bottom interior surface 414 may interface with the button 416 or the aperture 432 for dispensing the at least a pod 408. As used in this disclosure, a "front interior surface" is the surface of the interior shell 410 that faces, but is not exposed, to the user during normal operation. In a non-limiting example, the front interior surface may interface with the button 416 or the aperture 432 for dispensing the at least a pod 408. As used in this disclosure, a "back interior surface" is the surface of the interior shell 410 that is opposite the front interior surface. In a non-limiting example, the back interior surface may provide additional structural support and housing for internal components. In a non-limiting example, the back interior surface may interface with the button 416 or the aperture 432 for dispensing the at least a pod 408.

Without limitation the pod may include e-liquid bottles, such as 10 ml or 50 ml size bottles. In a nonlimiting example, the e-liquid bottle may be custom-designed bottle that fits into the apparatus. Continuing, this setup may allow users to refill their open systems devices efficiently. The apparatus may be designed to accept a standardized bottle and may provide the ability to set and control the dispensing volume, such as 2 ml, 5 ml, or other specified amounts. This may ensure precise and convenient refilling for users. The standardized bottle may have an identified, including a bar code, QR code, memory, NFC, RFID, or the like, that communicates with the dispensing apparatus on the contents of the bottle. For instance, an e-liquid bottle may be defined by flavoring ingredients, formulation ingredients, nicotine strengths, excipients, and stabilizers. Further, a dispensing apparatus may communicate with open system through a form of communication, including but not limited to, Bluetooth, NFC, RFID, memory transfer, to set appropriate power settings on the open system or to regulate whether the dispensed e-liquid formulation fits the parameters of the open system. For instance, certain power settings or wicking configurations of an open system may not be compatible with a nicotine salt e-liquid by for instance creating harmful and potentially harmful chemicals as a by-product. A dispensing apparatus in communication with an open system can prevent users from accidentally using a non-compatible liquid from being used. In another non-limiting example, the at least a pod 408 may include loose leaf embodiments. For example, without limitation, the loose leaf embodiment may include loose leaf nicotine which may include loose leaf materials, designed to be dispensed from a custom container that fits into the apparatus. The apparatus may permit refilling open systems devices with precise amounts of loose leaf material. Continuing, users may insert a standardized container into the apparatus, which allows them to set and control the dispensing volume, such as 2 grams, 5 grams, or other specified quantities. This setup ensures accurate and convenient refilling, making the process efficient and user-friendly. This set-up further applies to smoking articles with age restriction, such as *cannabis*. Further, loose leaf may also refer to chewing tobacco or chewing tobacco alternatives, whereby the user consumes or puts the materials in their mouth for a certain duration. A specific prespecified dose of material will make it easier for the user to estimate dosing and not use too much or too little of the materials. Further, a specific dosing of this material may assist in receiving regulatory approvals from regulatory bodies, such as Food and Drug Administration, as a specific and uniform dosing may streamline toxicological studies, clinical studies, and behavioral studies.

With continued reference to FIG. 4, the body may include a cuboid shape. As used in this disclosure, a "cuboid shape" is a three-dimensional geometric shape with six rectangular faces. Without limitation, each face of the cuboid shape may include a rectangle and opposite faces may be equal in size. In another non-limiting example, the cuboid may include 12 edges, 8 vertices, and 6 faces. In a non-limiting example, the exterior shell 402 and interior shell 410 may be 1-10 cm in height, 3-10 cm in width, and 1-10 cm in length.

With continued reference to FIG. 4, the body may include a cylindrical shape. As used in this disclosure, a "cylindrical shape" is a three-dimensional geometric form that has two parallel circular bases connected by a curved surface at a fixed distance from the center of the bases. Without limitation, the cylindrical shape may provide a smooth, continuous surface that may be easily gripped and handled by the user. In a non-limiting example, the cylindrical shape may enhance the ergonomic design of the apparatus, making it comfortable to hold and operate. Additionally and or alternatively, the cylindrical shape may allow for efficient use of space within the apparatus, providing a compact and streamlined design that houses the internal components securely and effectively. For example, without limitation, the cylindrical shape may hold at least a pod 408 and the drive mechanism, ensuring that the pods are aligned and ready for dispensing. Continuing, the cylindrical shape may allow the plurality of pods to be stacked vertically or arranged in a spiral configuration, optimizing the use of internal space. Continuing, the drive mechanism, which may include components such as motor 422, spring 426, and gears, may be positioned along the central axis of the cylinder, providing a balanced and efficient layout. Additionally and or alternatively, the cylindrical shape may accommodate a locking mechanism 420 that secures the pods within the apparatus. Continuing, the locking mechanism 420, may include elements such as solenoids, latches, or magnetic locks, can be integrated into the curved surface of the cylinder, ensuring that the pods are securely held in place until authorized access is granted. Continuing, this design may provide that the internal components are protected and that the apparatus remains compact and easy to handle.

Still referring to FIG. 4, apparatus 400 may include a button 416, wherein the button 416 is coupled to the body. As used in this disclosure, a "button" is a control mechanism that allows the user to initiate a specific action. In a non-limiting example, when force is applied to the button 416 by an authorized user, the apparatus may dispense at least a pod 408. For example, without limitation, the user may press down on the button 416 which may trigger the drive mechanism to advance the at least a pod 408 through the aperture 432 of the body. Without limitation, the button 416 may provide a means for the user to interact with the apparatus. In a non-limiting example, the button 416 may be circular, square, rectangular, triangular, and the like in shape. In another non-limiting example, the button 416 may protrude away from the body. In a non-limiting example, the button 416 may be 1-5 cm in length, 1-5 cm in height, and 0-5 cm protruding away from the exterior surface of the apparatus.

With continued reference to FIG. 4, the button 416 may be located on a front surface of the body. Without limitation, the button 416 may be configured to move linearly when a force is applied. In a non-limiting example, the linear movement may allow the button 416 to interact with internal components of the apparatus, such as the drive mechanism or the fingerprint scanner 418, to initiate the dispensing process. Continuing, the placement of the button 416 on the front exterior surface may ensure that it is easily accessible to the user during normal operation, providing a convenient and intuitive interface for dispensing the pods. In a non-limiting example, the button 416 may be designed to protrude slightly from the front exterior surface, making it easy for the user to locate and press. Continuing, the button 416 linear movement may be guided by tracks or rails within the exterior shell 402, ensuring smooth and consistent operation. Additionally and or alternatively, the button 416 may be equipped with a return mechanism, such as a spring 426, to ensure that it returns to its original position after being pressed, ready for the next use. Without limitation, the button 416 may be integrated with other features to enhance the user experience and ensure secure operation. For instance, without limitation, the button 416 may include a built-in fingerprint scanner 418 that authenticates the user before allowing the dispensing process to proceed. Continuing, upon successful authentication, the button 416 linear movement may trigger the drive mechanism to advance a pod to the dispensing position. Continuing, this combination of features may ensure that only authorized users can dispense the pods, enhancing the security and safety of the apparatus.

Still referring to FIG. 4, apparatus 400 includes a fingerprint scanner 418 coupled to the button 416, wherein the fingerprint scanner 418 is configured to authenticate a user. As used in this disclosure, a "fingerprint scanner" is a biometric device that captures and analyzes the unique patterns of ridges and valleys on a user's fingertip to verify their identity. Without limitation, the fingerprint scanner 418 may be used to authenticate authorized users and ensure secure access to the apparatus. In a non-limiting example, the fingerprint scanner 418 may be an optical scanner that captures a digital image of the fingerprint and uses algorithms to compare it against stored fingerprint data. In another non-limiting example, the fingerprint scanner 418 may be a capacitive scanner that measures the electrical properties of the fingerprint to create a detailed map of the fingerprint's unique features. Additionally and or alternatively, the fingerprint scanner 418 may be integrated with other components of the apparatus, such as the button 416 or the locking mechanism 420, to provide a seamless and secure user experience. For instance, without limitation, the fingerprint scanner 418 may be activated when the user presses the button 416, and upon successful authentication, the locking mechanism 420 may be released to allow access to the pods. Without limitation, the fingerprint scanner 418 may protrude away from the exterior surface of the apparatus. In another non-limiting example, the fingerprint scanner 418 may be recessed within the exterior surface of the apparatus. In another non-limiting example, the fingerprint scanner 418 may be seamlessly integrated into the body of the exterior surface of the apparatus. In another non-limiting example, the fingerprint scanner 418 may include an indication inscription of text or other visual or tactile indicators to assist the user in locating where to place their finger for scanning. For instance, the visual indicator may be an ink text printed on the exterior surface of the apparatus, clearly marking the area designated for fingerprint scanning. This text may say "Place Finger Here" or similar instructions, providing straightforward guidance for users. Additionally, the visual indicator may take the form of a tactile guide, such as a circle of raised dots on the exterior surface of the apparatus. These dots may be easily felt with a finger, allowing users to align their finger correctly for scanning without needing to look at the device. This tactile feedback may ensure that even in low-light conditions or for visually impaired users, the scanner's placement area can be identified and used effectively. These indicators may ensure that the fingerprint scanner 418 is accessible and user-friendly, improving the overall usability of the apparatus.

With continued reference to FIG. 4, without limitation, the fingerprint scanner 418 may integrated into the button 416 wherein the button 416 is a slider, which only unlocks when the fingerprint scan is activated, providing the mechanical power to dispense. Continuing, the fingerprint scanner 418, may be hidden under the slider, and the slider may get pushed to generate mechanical power to open a hatch or access point upon activation. Without limitation, by converting mechanical energy into electrical energy, it may be possible to use a smaller battery 424 or power source. Additionally and or alternatively, alternative methods of electricity generation may eliminate the need for a charging port.

With continued reference to FIG. 4, the fingerprint scanner 418 may include a self-lock out feature to enhance security and prevent unauthorized access. As used in this disclosure, a "self-lock out feature" is a security mechanism designed to enhance protection against unauthorized access attempts. Without limitation the self-lock out feature may activate after a predetermined number of unsuccessful fingerprint scan attempts. Continuing, the self-lock out feature may help ensure that the apparatus becomes temporarily inoperable to deter potential tampering. For instance, without limitation, after three to five failed attempts at opening the device with the fingerprint scanner 418, the fingerprint scanner 418 may initiate a lockout period during which no additional scans are accepted. Continuing, this mechanism may provide an additional layer of protection, making it challenging for unauthorized users to gain access through repeated attempts. Without limitation, during the lockout period, the fingerprint scanner 418 may enter a dormant state, effectively rendering the apparatus temporarily unusable. Continuing, this period may be customized based on specific security requirements, ranging from a few minutes to several hours. Continuing, the temporary lockout may prevent unauthorized access and serve as a deterrent, as potential intruders recognize that multiple failed attempts will result in a locked device. Without limitation, any unauthorized attempts may be met with an immediate response from the apparatus. Continuing, once the lockout period has expired, the fingerprint scanner 418 may automatically reset. Continuing, when the fingerprint scanner 418 automatically resets normal operation may resume. Without limitation, authorized users may then attempt to access the apparatus again using their registered fingerprints. Continuing, the automatic reset feature of the fingerprint scanner 418 may ensure that legitimate users are not permanently locked out due to accidental multiple failed attempts. Without limitation, resetting the fingerprint scanner 418 provides future usability and convenience for authorized individuals while still upholding robust security measures. In addition to providing security, the self-lockout feature may be integrated with notification systems to alert users of multiple failed access attempts. Continuing, this notification may be transmitted via a connected app or through an integrated display on the apparatus, informing the owner of potential security breaches. Continuing, the notifications may allow users to take immediate action if unauthorized access is suspected, further enhancing the security of the apparatus. Without limitation, the self-lock-out feature of the fingerprint scanner 418 operates through a combination of hardware and software mechanisms. When a user attempts to unlock the apparatus, the fingerprint scanner 418 may capture the biometric data and compare it against stored templates. Continuing, if the scanned fingerprint does not match any of the stored templates, the apparatus increments a failure counter. Continuing, this counter is managed by the scanner's firmware or the embedded system's software, which keeps track of consecutive failed attempts. Once the number of failed attempts reaches the predefined threshold, the system activates the lockout mechanism. Continuing, during the lockout period, the firmware or software disables the fingerprint scanning functionality, effectively preventing further access attempts. Without limitation, this may be achieved by putting the fingerprint scanner 418 into a low-power state or by ignoring additional input from the scanner for the duration of the lockout. Without limitation, the apparatus may use an internal timer to manage the lockout duration, which counts down until the period expires. Continuing, this timer may ensure that the scanner remains inactive for the specified duration, enhancing security by preventing rapid repeated attempts to gain unauthorized access. Without limitation, upon expiration of the lockout period, the internal timer may trigger the system to reset the failure counter and re-enable the fingerprint scanner 418. Continuing, this reset process involves reinitializing the scanner and allowing it to process new input data. The system may now be ready to accept new fingerprint scans, allowing authorized users to attempt access again. Throughout this process, the embedded system ensures seamless integration of the hardware components and software logic, maintaining a balance between security and usability. The lockout feature relies on precise coordination between the fingerprint scanner 418 hardware, the embedded system's software, and the timing mechanisms to provide robust protection against unauthorized access attempts. In addition to lock-out periods from unsuccessful attempts, lock-out periods may provide a regulatory purpose for the specific product being dispensed and can be customized or communicated by the inserted magazine. For instance, there may be a regulatory mandate to only to dispense one pod at a time for a certain time limit. In a non-limiting example, a nicotine pouch may be dispensed every few minutes by the authorized user and prevent social sharing of the dispensed product. A 3 mg nicotine pouch may last a user a shorter period than a 9 mg nicotine pouch, and the pharmacokinetic curve will show the blood nicotine content of a user over a period. A time limit for the interval in which the user is allowed to dispense a 3 mg and a 9 mg pouch may differ according to the pre-studied pharmacokinetic curve. For example, a 3 mg pouch magazine may dispense every 5 minutes, whereas a 9 mg pouch may dispense every 15 minutes. Furthermore, embodiments which have a wireless connection with either a phone, an app, or a physician interface, can allow the remote setting of the dispensing limits as desired. This mechanism can either be used to limit dispensing, in the case of consumer nicotine, or encourage dispensing, in the case of medication adherence and the need to take a prescription medication at a specified interval.

With continued reference to FIG. 4, the fingerprint scanner 418 may use various methods to activate it. In a non-limiting example, a temperature sensor, an optical sensor, a light sensor, a pressure sensor, a humidity sensor, an accelerometer, a noise sensor, an airflow sensor in a mouthpiece, a capacitive sensor, a gyroscope, an inductive sensor, two contacts and a metal ball inside setup for orientation dependent activation, camera and artificial intelligence, a LiDAR sensor, a magnetometer, and the like. Additionally and or alternatively, other biometric sensors may be used to unlock the apparatus. For instance, without limitation, an eye, blood, hand geometry, custom saved gestures, custom saved drawing gesture, face scanning, voice recognition, Bluetooth pairing, NFC, RFID, pairing with object (i.e., a physical ring), pass codes, a pass phrase, vein mapping, and the like. Without limitation, a temperature sensor may measure the rate of temperature change when a user places a finger on the sensor. This rate of change may indicate the presence of a user, thus activating the fingerprint scanner 418. This method relies on the natural temperature variation that occurs when a human finger comes into contact with the sensor, ensuring that the scanner is activated only when a finger is detected. Without limitation, an optical sensor, such as through-beam sensors, retro-reflective sensors, and diffuse reflection sensors, may detect the placement of a finger and activate the fingerprint scanner 418. Continuing, the optical sensor may operate by detecting changes in light patterns or reflections caused by the presence of a finger. Continuing, this may provide a reliable way to trigger the scanning process. Without limitation, the light sensors, specifically photodetectors, may also detect the placement of a finger to activate the fingerprint scanner 418. Continuing, these sensors respond to changes in light intensity when a finger is placed on or near the sensor area. Additionally, pressure sensors may activate the fingerprint scanner 418 by detecting the force of a finger on the board or by sensing changes in internal pressure due to user inhalation. Without limitation, other aforementioned methods include humidity sensors, which may activate the fingerprint scanner 418 based on breath or mouth moisture on a mouthpiece. An accelerometer may trigger the scanner by detecting the movement of the device when picked up by a user. Noise sensors may allow voice command activation, while airflow sensors in a mouthpiece can sense inhalation to activate the device. Strain sensors may measure deformation on the fingerprint scanner 418 or its coating, and capacitive sensors detect a finger moving close to the scanner without physical contact by sensing disruptions in the electrical field, thus activating the fingerprint scanner 418.

Still referring to FIG. 4, apparatus 400 includes a locking mechanism 420 coupled to the fingerprint scanner 418, wherein the locking mechanism 420 is configured to allow authorized access to the at least a pod 408. As used in disclosure, a "locking mechanism" is a system of components designed to secure the apparatus and control access to the pods, ensuring that only authorized users can dispense the pods. Without limitation, the locking mechanism 420 may interact with other components, such as the fingerprint scanner 418 and the drive mechanism, to provide a secure and controlled dispensing process. In a non-limiting example, the locking mechanism 420 may include an electromechanical lock that is activated upon successful authentication by the fingerprint scanner 418. In another non-limiting example, the locking mechanism 420 may use a combination of mechanical and electronic components, such as solenoids, latches, or magnetic locks, to secure the pods within the apparatus. Additionally and or alternatively, the locking mechanism 420 may be designed to work seamlessly with the user interface, such as the button 416, to provide a smooth and intuitive user experience. For instance, upon successful fingerprint authentication, the locking mechanism 420 may release, allowing the drive mechanism to advance a pod to the dispensing position. Continuing, this ensure may ensure that the apparatus remains secure and prevents unauthorized access to the pods.

Still referring to FIG. 4, apparatus 400 includes a drive mechanism, wherein the drive mechanism dispenses the at least a pod 408 upon successful authentication. As used in this disclosure, a "drive mechanism" is a system of components that work together to move or dispense the pods within the apparatus. Without limitation, the drive mechanism may use one or more spring 426 to dispense the at least a pod 408. In a non-limiting example, the drive mechanism may include elements such as motor 422, spring 426, gears, other mechanical or electromechanical parts, and the like, that facilitate the controlled movement and dispensing of the at least a pod 408. In a non-limiting example, the drive mechanism may include a motor 422 that advances the pods to a dispensing position when activated. In another non-limiting example, the drive mechanism may incorporate a spring 426 that provides the necessary force to push the pods through an aperture 432 for dispensing. Additionally and or alternatively, the drive mechanism may be designed to work in conjunction with other components, such as sensors or control circuits, to ensure precise and reliable operation. For instance, without limitation, a sensor may detect the position of the pods and signal the drive mechanism to advance or dispense a pod as needed.

With continued reference to FIG. 4, the drive mechanism may include at least a motor 422, at least a spring 426, at least a power source, and at least a circuit board. As used in this disclosure, a "motor 422" is an electromechanical device that converts electrical energy into mechanical energy to drive the movement of components within a system. In a non-limiting example the motor 422 may be used to advance or dispense at least a pod 408 through the aperture 432, as discussed in more detail below. In a non-limiting example, the motor 422 may be a DC motor 422, a stepper motor 422, or a servo motor 422, depending on the specific requirements of the apparatus. As used in this disclosure, a "spring" is a mechanical component that stores and releases mechanical energy. Without limitation, the apparatus may include one or more spring 426 that work together to move the at least a pod 408 in the apparatus or to move another component within the apparatus. In another non-limiting example, the at least a spring 426 may be used to provide a force or return mechanism within the apparatus, such as aiding in the movement or positioning of the pods. In a non-limiting example, the spring 426 may be a compression spring 426, a torsion spring 426, or a constant force spring 426, depending on the design and functional needs of the apparatus.

In an embodiment, the at least a power source may include at least a battery 424. As used in this disclosure, a "battery 424" is an electrochemical device that stores and provides electrical energy to power the various electronic and mechanical components of the apparatus. In a non-limiting example, there may be one or more batteries used in the apparatus. In a non-limiting example, the at least a battery 424 may power the motor 422 and any control circuitry within the apparatus. In a non-limiting example, the battery 424 may be a rechargeable lithium-ion battery 424, a disposable alkaline battery 424, or a coin cell battery 424, depending on the power requirements and design constraints of the apparatus.

As used in this disclosure, a "printed circuit board (PCB)" is piece of material on which electronic components are mounted and interconnected to form a functional circuit. Without limitation, the PCB may be used to host various types of electronic components and circuits, including field-programmable gate arrays (FPGAs), microcontrollers, analog control circuits, and non-clocked digital circuits. As used in this disclosure, an "FPGA" is a type of integrated circuit that can be configured by the user after manufacturing. FPGAs may consist of an array of programmable logic blocks and a hierarchy of reconfigurable interconnects that allow the blocks to be wired together. Without limitation, these devices may be used to implement custom hardware functionality and can be reprogrammed to change their behavior or optimize performance for specific tasks. As used in this disclosure, a "microcontroller" is a compact integrated circuit designed to govern a specific operation in an embedded system. Without limitation a microcontroller may include a processor, memory (RAM and ROM), and input/output peripherals on a single chip.

Microcontrollers may be used in automatically controlled products and devices, such as automotive engine control systems, remote controls, office machines, appliances, and other embedded systems. As used in this disclosure, an "analog control circuit" is a type of electronic circuit that processes analog signals to perform tasks such as amplification, filtering, modulation, and signal conditioning. Without limitation, the analog control circuits may use continuous voltage or current variations to represent information and control electronic systems. Analog control circuits may be used in power management, audio processing, sensor interfacing, and other applications requiring precise control of analog signals. As used in this disclosure, a "non-clocked digital circuit" is a type of digital circuit that operates without the need for a clock signal. Without limitation, non-clocked digital circuits, also known as combinational logic circuits, may produce outputs based solely on the current inputs, without any memory or timing elements. For example, without limitation, non-clocked digital circuits may include logic gates, multiplexers, decoders, and simple arithmetic circuits. Without limitation, non-clocked digital circuits may be used in applications where immediate responses to input changes are required.

With continued reference to FIG. 4, the drive mechanism may include at least a near field communication chip configured to lock and unlock the apparatus. As used in this disclosure, a "near field communication chip" is a small electronic device that enables wireless communication between two NFC-enabled devices over short distances. Without limitation, the NFC chip may be embedded within the apparatus. In a non-limiting example, the NFC chip may communicate with NFC-enabled devices, such as smartphones, NFC terminal, or NFC cards. Without limitation, the locking mechanism 420 may be controlled by the NFC chip. For example, without limitation, when the apparatus is locked, the drive mechanism may prevent the dispensing of the at least a pod 408. In another non-limiting example, to unlock the apparatus, the user must bring an authorized NFC-enabled device (such as a registered smartphone, NFC terminal, or an NFC card) close to the apparatus. Continuing, the NFC chip may read the unique identifier of the NFC-enabled device. Continuing, if the identifier matches the pre-programmed authorized identifiers stored in the chip's memory, the NFC chip may send a signal to the drive mechanism to unlock the apparatus. Continuing, upon a successful authentication, the NFC chip may activate the drive mechanism to release a latch or move an internal component that enables the apparatus to dispense the at least a pod 408. Additionally and or alternatively, the user may then press the button 416 on the apparatus to release the at least a pod 408. For instance, without limitation, the user may hold their NFC-enabled smartphone close to the apparatus, the NFC chip in the apparatus may detect the presence of the NFC device, the NFC chip reads the device's unique identifier, the NFC chip compares the identifier with a list of authorized identifiers stored in its memory, if the identifier is authorized, the NFC chip sends a signal to the locking mechanism 420, the locking mechanism 420 disengages, allowing the internal drive mechanism to move into the unlocked position, the user may now press the button 416 on the apparatus to dispense the at least a pod 408, the at least a pod 408 may be released, the drive mechanism may either relock the apparatus immediately after dispensing or remain unlocked for a specified duration, after dispensing the at least a pod 408, the drive mechanism may automatically relock the apparatus, requiring the user to reauthenticate for future use.

With continued reference to FIG. 4, in a non-limiting example, the NFC chip may be designed to facilitate secure, contactless interactions such as data transfer, payment processing, and device pairing. In a non-limiting example, the NCF chip design and application may be consistent with one or more aspects of the NFC chip described in U.S. patent application Ser. No. 18/211,706, filed on Jun. 20, 2023, titled "APPARATUS AND METHOD FOR AEROSOL DELIVERY," which is incorporated by reference herein in its entirety.

With continued reference to FIG. 4, in a non-limiting example, the NCF chip design and application may be consistent with one or more aspects of the NFC chip described in U.S. patent application Ser. No. 18/211,726, filed on Jun. 20, 2023, titled "APPARATUS AND METHOD FOR UNIQUE IDENTIFICATION OF AN OBJECT USING NEAR-FIELD COMMUNICATION (NFC)," which is incorporated by reference herein in its entirety.

With continued reference to FIG. 4, in a non-limiting example, the locking mechanism 420 design and application may be consistent with one or more aspects of the locking mechanism described in U.S. patent application Ser. No. 18/410,193, filed on Jan. 11, 2024, titled "APPARATUS AND METHOD FOR PREVENTING YOUTH ACCESS AND COUNTERFEIT AEROSOL DELIVERY," which is incorporated by reference herein in its entirety.

With continued reference to FIG. 4, in a non-limiting example, the NFC chip design and application may be consistent with one or more aspects of the NFC chip design and application described in U.S. patent application Ser. No. 18/912,221, filed on Oct. 10, 2024, titled "APPARATUS AND METHOD FOR NEAR FIELD COMMUNICATION (NFC) READING," which is incorporated by reference herein in its entirety.

With continued reference to FIG. 4, in a non-limiting example, the NFC chip design and application may be consistent with one or more aspects of the NFC chip design and application described in U.S. patent application Ser. No. 18/918,246, filed on Oct. 17, 2024, titled "APPARATUS AND METHOD FOR BIOMETRIC ACCESS CONTROL," which is incorporated by reference herein in its entirety.

With continued reference to FIG. 4, the drive mechanism may be further configured to provide access to the at least a pod 408 using one or more of a spiral coil mechanism, a gravity feed mechanism, and a carousel mechanism. As used in this disclosure, a "spiral coil mechanism" is a mechanism where pods are positioned along a spiral track, and the drive mechanism moves the spiral coil to push the pods towards the dispensing opening. Without limitation the spiral coil mechanism may provide a continuous feed of the at least a pod 408. Without limitation, the spiral coil mechanism may be ideal for an automated dispensing systems. For example, without limitation, the at least a pod 408 may be arranged along a spiral track inside the apparatus. Continuing, as the drive mechanism activates, the spiral coil may rotate, advancing the at least a pod 408 towards the dispensing opening. Continuing, the spiral coil mechanism may ensure a continuous and steady flow of the at least a pod 408, providing an automated and efficient way to dispense each at least a pod 408 in sequence. As used in this disclosure, a "gravity feed mechanism" is a mechanism where pods are stacked vertically, and gravity causes the next pod to move into the dispensing position when the previous pod is removed. In a non-limiting example, the drive mechanism may control a gate or stopper to release one pod at a time. Continuing, the gravity feed mechanism may leverage gravity to ensure a consistent and reliable flow of pods. For example, without limitation, the gravity feed mechanism may involve stacking the at least a pod 408 vertically within the apparatus. Continuing, when a first at least a pod 408 is dispensed, gravity may naturally move a second at least a pod 408 down into the dispensing position. Continuing, a gate or stopper controlled by the drive mechanism may ensure that only one at least a pod 408 is released at a time, maintaining order and preventing jams. As used in this disclosure, a "carousel mechanism" is a mechanism where pods are arranged on a rotating platform or wheel. Without limitation, the drive mechanism may rotate the carousel to bring the at least a pod 408 into alignment with the dispensing opening. Continuing, the carousel mechanism may provide an easy access to the at least a pod 408 and may be designed to display the at least a pod 408 attractively. For example, without limitation, the at least a pod 408 may be arranged on a rotating platform inside the apparatus. Continuing, when the drive mechanism is activated, the carousel may rotate, positioning the next at least a pod 408 in front of the dispensing opening. Without limitation, the carousel mechanism may ensure easy access to each at least a pod 408 but also allows for an attractive display of the at least a pod 408, adding a visual appeal to the dispensing process.

Still referring to FIG. 4, apparatus 400 includes a magazine 430 within the body and coupled to the drive mechanism, wherein the magazine 430 is configured to store the plurality of pods and guide, using the drive mechanism, the at least a pod 408 into a dispensing position. As used in this disclosure, a "magazine 430" is a component within the apparatus designed to store and organize a plurality of pods for dispensing. Without limitation, the magazine 430 may ensure that the pods are held securely and are properly aligned for dispensing by the drive mechanism. In another non-limiting example, the magazine 430 may include compartments or slots to hold individual pods in place and guide them into the dispensing position. Without limitation, the magazine 430 may be designed to operate seamlessly with the drive mechanism to ensure smooth and reliable dispensing of the pods. For instance, without limitation, the magazine 430 may include features such as alignment guides or locking mechanism 420s to ensure that the pods are correctly positioned and dispensed one at a time. In another non-limiting example, the magazine 430 may be designed with a spring 426-loaded mechanism that pushes the pods forward as each one is dispensed, ensuring a continuous supply of pods ready for dispensing. Continuing, this design may help maintain the position of the pods and prevents them from shifting or jamming within the magazine 430. For instance, without limitation, the magazine 430 may have a built-in track system that guides the pods into the dispensing position with precision, working seamlessly with the drive mechanism to provide smooth and reliable operation.

In another non-limiting example, methods of magazine 430 authentication and tracking may include mechanical, memory chip, NFC chip, and the like. For instance, without limitation, the magazine 430 may be outfitted with an NFC chip which may register at the point of sale using NFC readers on a secure age verification and enforcement (SAVE) system. As used in this disclosure, the "SAVE system" is a comprehensive security framework designed to enhance the authentication and verification processes across various digital platforms. Without limitation, the SAVE system may employ a multi-faceted approach to ensure user identity integrity and data protection. Without limitation, the SAVE system may integrate advanced biometric methods such as fingerprint scanning, facial recognition, and voice authentication, alongside traditional methods like passwords and PINs. Continuing, the SAVE system may provide a robust barrier against unauthorized access. Without limitation, the SAVE system may include adaptive algorithms that continuously analyze user behavior and environmental factors, enabling real-time threat detection and response. Continuing, the NFC chip may also serve as an authenticator during insertion, communicating product details such as strength and brand to the dispenser, which may display this information on a small screen. Continuing, the setup may be useful for indicating the remaining quantity in the magazine 430, helping users know when they are about to run out, as discussed in more detail herein. In another non-limiting example, electrical methods for magazine 430 authentication may include specific pin layouts and resistors. Additionally and or alternatively, optical methods may use reflection or pattern recognition such as bar codes, QR codes, and Snaptags. Without limitation, radio frequency methods may include RFID, NFC, BLE, and Zigbee, while magnetic methods may utilize a swipe strip. Continuing, memory-based methods may also be implemented, offering a range of options for effective magazine 430 tracking and authentication.

With continued reference to FIG. 4, the magazine 430 may be made out of biodegradable and or compostable plastic resins, metal, normal PCTG plastic constructions, and the like. Without limitation, the magazine 430 material choice may provide protection to the interior of the apparatus and be tamper proof. For instance, without limitation, biodegradable plastic resins may include polylactic acid (PLA), compostable plastics may include polyhydroxyalkanoates (PHA), metals may include stainless steel or aluminum, and standard plastic constructions may include polycarbonate (PC) or polyethylene terephthalate glycol (PETG). In some cases, plastic material such as, without limitation, BIOGRADE B-M (i.e., blend of thermoplastic starch (TPS), aliphatic polyesters (AP) and natural plasticizers (glycerol and sorbitol)) may be injected into the injectable mold under high pressure, filling the space and taking on the shape of injectable mold. Other exemplary plastic materials may include, without limitation, BIOPAR FG MO (i.e., bio-plastic resin consisting mainly of thermoplastic potato starch, biodegradable synthetic copolyesters and additives), BIOPLAST (i.e., new kind of plasticizer cherfreien thermoplastic material), ENSO RENEW RTP (i.e., renewable, biodegradable, compostable and economic thermoplastic), and/or the like. Certain plastics or metal may prevent moisture ingress and/or exit, thereby limiting or promoting opportunities of the outside environment contaminating the drug product stored in the magazine. Stability testing for comparisons of different magazine materials will be performed, and the material limiting the moisture ingress/exit the most is the material to be used.

With continued reference to FIG. 4, the magazine 430 may be a compact structure. Continuing, the magazine 430 may measure 1-10 cm in height, 3-10 cm in width, and 1-10 cm in length. Continuing, the slim profile may allow for easy handling and portability. The magazine 430 may include a base that may be 0-10 cm inch in height, providing stability and support.

With continued reference to FIG. 4, the magazine 430 is configured to be removed from the body and refilled with a replacement magazine 430. As used in this disclosure, a "replacement magazine 430" is a detachable and refillable component of the apparatus designed to store a plurality of pods. Without limitation, the replacement magazine 430 may be removed from the body of the apparatus and replaced with a new or refilled magazine 430 to ensure continuous dispensing of the pods. In a non-limiting example, the replacement magazine 430 may be pre-filled with pods by the manufacturer and sealed to maintain freshness until use. In another non-limiting example, the replacement magazine 430 may include a user-friendly mechanism, such as a snap-fit or twist-lock design, to facilitate easy removal and insertion into the body of the apparatus. In another non-limiting example, may be designed to help ensure that the magazine 430 is securely held in place during operation but can be quickly and easily replaced when empty. Additionally and or alternatively, the replacement magazine 430 may be designed with various capacities to accommodate different user needs. For instance, without limitation, a high-capacity magazine 430 may store a larger number of pods for users who require frequent dispensing, while a compact magazine 430 may be designed for portability and convenience, holding a smaller number of pods for occasional use.

Still referring to FIG. 4, apparatus 400 includes an aperture 432 located on the body, wherein the aperture 432 is configured to allow the at least a pod 408 to move from within the body to exterior environment. As used in this disclosure, "aperture 432" is an opening or hole in the exterior shell 402 of the body that allows the at least a pod 408 to move from within the body to the exterior environment, facilitating the dispensing of the pod to the user. In a non-limiting example, the aperture 432 may be circular, rectangular, or any other shape suitable for dispensing the pods. In another non-limiting example, the aperture 432 may be designed with a sliding cover that opens when a pod is being dispensed and closes afterward to protect the internal components from dust, debris, and unauthorized access. Continuing, this design may ensure that the apparatus remains clean and functional over extended use. Additionally and or alternatively, the aperture 432 may include a flexible membrane or flap that allows the pod to pass through while minimizing the ingress of moisture or contaminants. In another non-limiting example, the aperture 432 may be equipped with a sensor that detects when a pod is being dispensed and activates a light or sound indicator to notify the user. Continuing, this may enhance the user experience by providing feedback during the dispensing process. In another non-limiting example, the aperture 432 may be designed with a funnel-like shape to guide the pod smoothly from the interior of the apparatus to the user's hand. Continuing, this design may help prevent the pod from getting stuck or misaligned during dispensing.

With continued reference to FIG. 4, apparatus may be configured to display user feedback on a display screen. As used in this disclosure, "user feedback" is information provided to the user by the apparatus to inform the user about the status, operation, or any issues related to the device. Without limitation, user feedback may include visual, auditory, or tactile signals that guide the user through the use of the apparatus, confirm successful operations, alert the user to errors or malfunctions, and provide real-time updates on the device's status. In a non-limiting example, user feedback may include messages displayed on a screen, indicator lights, sounds, or vibrations. As used in this disclosure, a "display screen" is an electronic visual interface that presents information to the user. In a non-limiting example, the display screen may be on the exterior shell 402 of the apparatus and/or a downstream device. As used in this disclosure, a downstream device is an electronic device that presents information to the entity. In some cases, downstream device may be configured to project or show visual content generated by computers, video devices, or other electronic mechanisms. In some cases, downstream device may include a liquid crystal display (LCD), a cathode ray tube (CRT), a plasma display, a light emitting diode (LED) display, and any combinations thereof. In a non-limiting example, one or more downstream device may vary in size, resolution, technology, and functionality. Downstream device may be able to show any data elements and/or visual elements as listed above in various formats such as textural, graphical, video among others, in either monochrome or color. Downstream device may include, but is not limited to, a smartphone, tablet, laptop, monitor, tablet, and the like. Downstream device may include a separate device that includes a transparent screen configured to display computer generated images and/or information. In some cases, downstream device may be configured to present a graphical user interface (GUI) to a user, wherein a user may interact with a GUI. In some cases, a user may view a GUI through downstream device. Additionally, or alternatively, the processor be connected to downstream device. In one or more embodiments, transmitting user feedback may include displaying user feedback at downstream device using a visual interface.

With continued reference to FIG. 4 and without limitation, the display screen may show text, graphics, and other visual elements to convey user feedback, operational status, instructions, and other relevant information. In a non-limiting example, the display screen may be an LCD, LED, OLED, or e-ink screen integrated into the apparatus. In another non-limiting example, the display screen may be used to enhance the user experience by providing clear and accessible information about the device's operation and status. For example, without limitation, the display screen may show the number of pods remaining in the magazine 430, providing the user with real-time information on the available supply. In another non-limiting example, the display screen may indicate the status of the fingerprint authentication process, such as displaying a message like "Authentication Successful" or "Authentication Failed" to inform the user of the result. Additionally and or alternatively, the display screen may provide instructions or prompts to guide the user through the dispensing process, such as "Press Button to Dispense" or "Replace Magazine." In another non-limiting example, the display screen may show error messages or alerts, such as "Low Battery" or "Pod Jam Detected," to notify the user of any issues that need attention. Continuing, the display screen may also be used to show personalized information, such as the user's name or usage history, enhancing the overall user experience and providing a more interactive interface. Additionally and or alternatively, the apparatus may include a small LED light indicator that changes color to convey different types of user feedback. As used in this disclosure, an "LED light indicator" is a small light-emitting diode that provides visual signals to the user. In a non-limiting example, the LED light indicator may change color to indicate various statuses or actions. For instance, without limitation, a green light may indicate that the apparatus is ready for use, while a red light may signal an error or malfunction. Continuing, a blue light may indicate that the fingerprint authentication was successful, and a yellow light could warn the user of a low battery 424. Continuing, the color-coded feedback system may provide a simple and intuitive way for users to understand the status of the apparatus at a glance, without the need for detailed text or graphics.

Without limitation, the apparatus may be designed with user safety as a top priority. Without limitation the magazine 430 may remain closed and locked when not combined with the apparatus thereby preventing accidental access to the at least a pod 408, which may be especially important in households with children or pets. Continuing, this feature may also help in maintaining the quality and freshness of the at least a pod 408, as they are only exposed when intended for use. The locking mechanism 420 is robust, ensuring that the at least a pod 408 can only be dispensed when the magazine 430 is properly docked into the apparatus, thus reducing the risk of misuse or overconsumption. Additionally and or alternatively, the apparatus may be integrated with off the shelf (OTS) containers. Continuing, this may mean that the apparatus may be widely adopted without the need for specialized or proprietary packaging. Continuing, this compatibility not only makes it convenient for users but also ensures that the added safety features are accessible to a broader audience. The design of the apparatus also incorporates the locking mechanism 420, which is a tamper-evident mechanism, which provides an additional layer of security. Users may be confident that the at least a pod 408 have not been accessed or tampered with before use, ensuring peace of mind and maintaining the product's integrity. Additionally and or alternatively, these aforementioned safety features of the apparatus may offer a controlled dispensing mechanism that limits the number of pouches released at a time. This is particularly beneficial for users who need to regulate their nicotine intake, as it helps to prevent accidental overuse. The drive mechanism may be engineered to release one at least a pod 408 per activation, ensuring that users can easily manage their consumption. Overall, the apparatus combines convenience, compatibility, and enhanced safety features. This may be implemented as described and with reference any embodiment as described herein.

Figure 5:
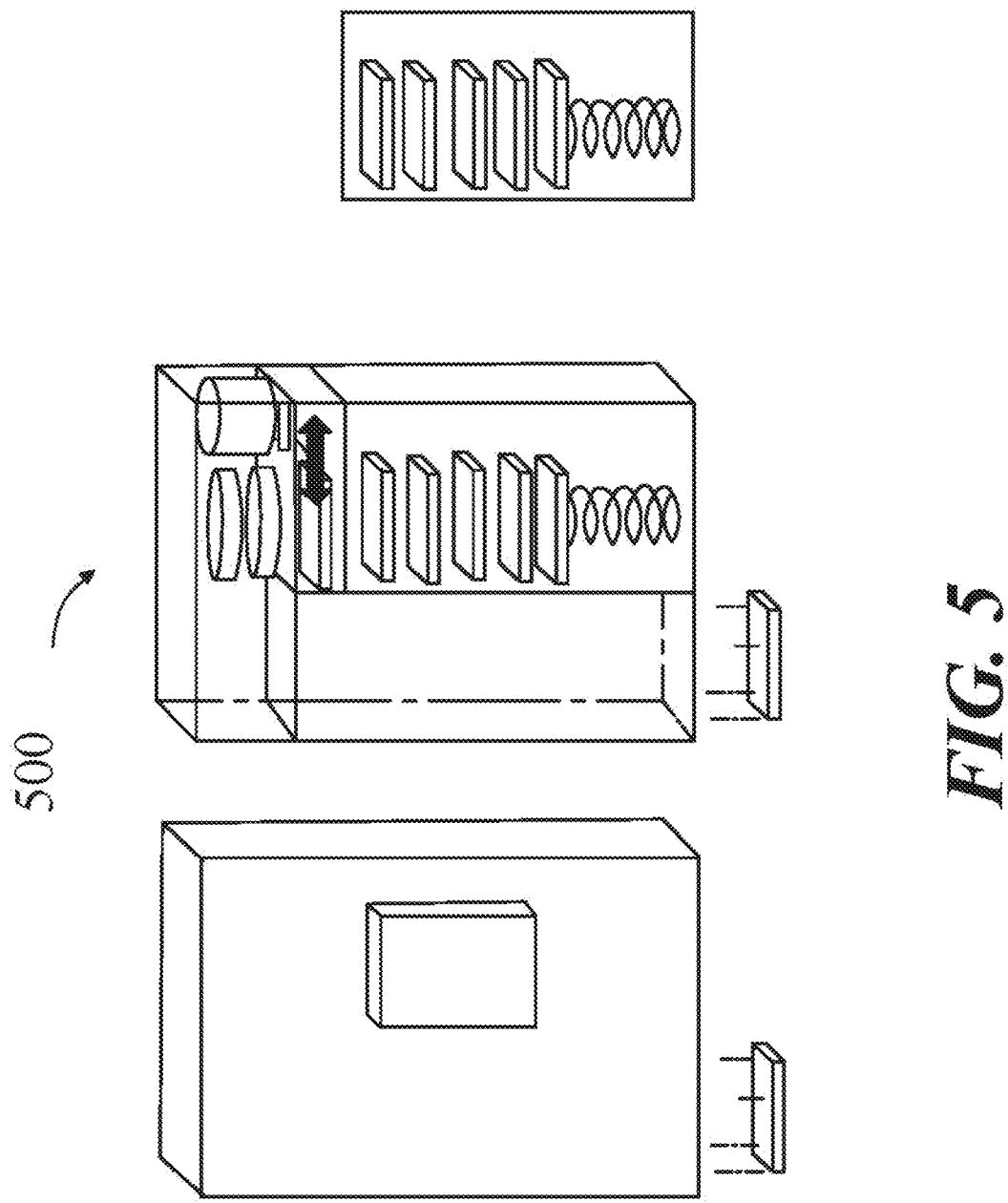
FIG. 5 is an exemplary illustration of a gravity-feed direct drive concept for an apparatus.

Now referring to FIG. 5, an exemplary illustration, 500, of a gravity-feed direct drive concept for an apparatus. Without limitation, the gravity-feed direct drive is described in detail in FIG. 1 and functions similar to the other embodiments of the apparatus as described herein. In a non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like.

Figure 6:
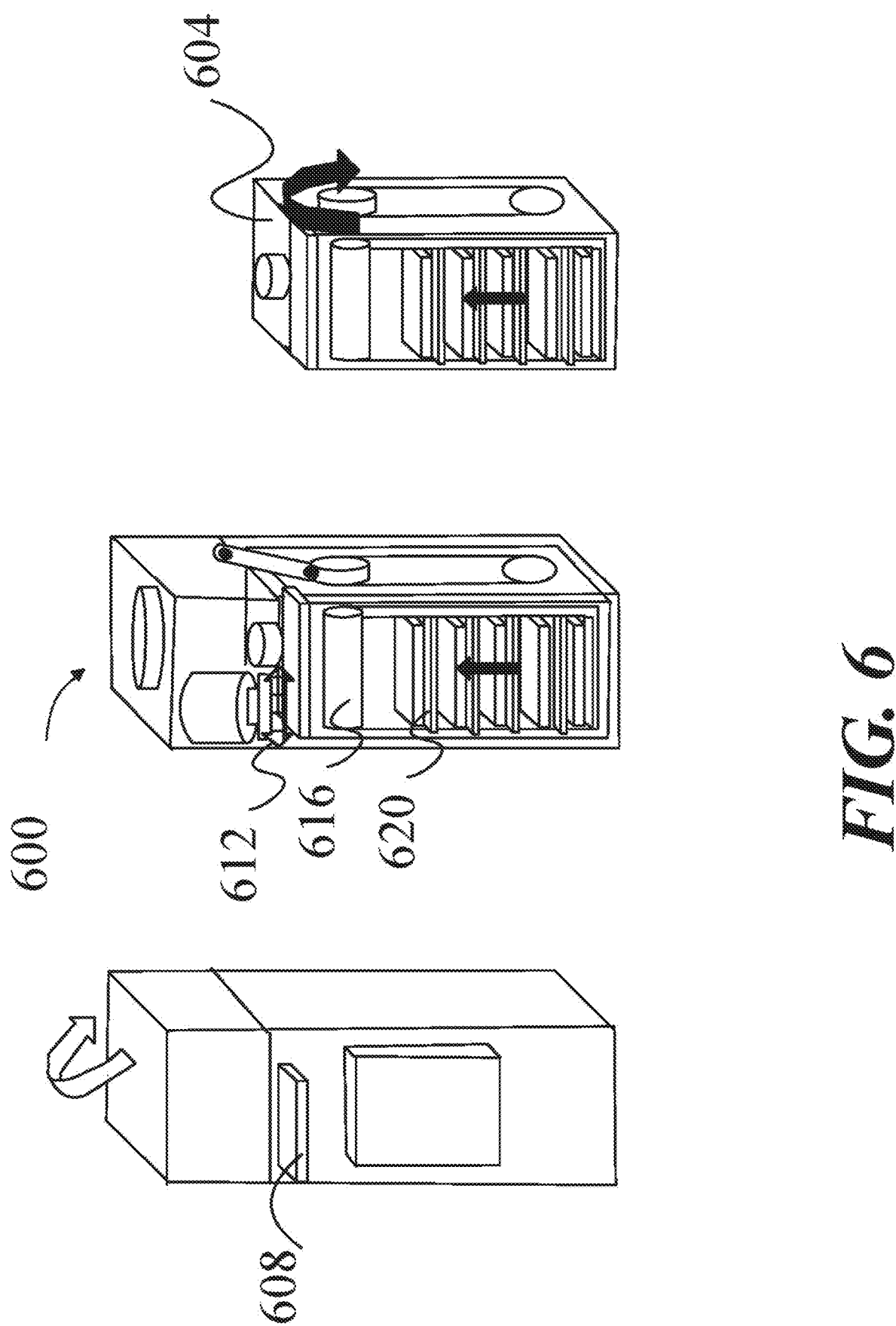
FIG. 6 is an exemplary illustration of a pod-guidance channel concept for an apparatus.

Now referring to FIG. 6 is an exemplary illustration, 600, of a pod-guidance channel concept for an apparatus. Without limitation, the magazine 604 may include a rotating conveyor belt 616, wherein the rotating conveyor belt 616 may be configured to advance at least a pod 608 using a rack 620 of the plurality of racks 620. As used in this disclosure, a "rotating conveyor belt" is a continuous loop of material that moves in a circular or elliptical path to transport and position the pods within the apparatus. Without limitation, the rotating conveyor belt 616 may be driven by the drive mechanism 612 and may be configured to advance the pods 608 to the dispensing position in a controlled and sequential manner. As used in this disclosure, a "rack" is a structural component of the rotating conveyor belt 616 that holds and organizes the pods in individual slots or compartments. Without limitation, the rack 620 may provide that each pod is securely positioned and properly aligned for dispensing, allowing the drive mechanism 612 to move the pods smoothly and reliably to the dispensing position. Without limitation, the rack 620 may be composed of durable plastic or metal materials to provide strength and longevity. In a non-limiting example, each rack 620 may contain multiple slots or compartments, specifically shaped and sized to fit the at least a pod 608, ensuring that they remain securely in place during the movement of the conveyor belt. Continuing, these slots may be spaced evenly along the length of the rack 620 to maintain consistent alignment and prevent the at least a pod 608 from shifting out of position. Additionally and or alternatively, the rack 620 may include small ridges or dividers between each slot to provide extra stability and prevent the pods from moving laterally. Continuing, to facilitate easy insertion and removal of the at least a pod 608, the slots might feature slightly flexible walls or spring-loaded mechanisms that gently grip each pod. Without limitation, the bottom of each slot may be open or partially open to allow the at least a pod 608 to be easily dispensed when it reaches the dispensing position. In another non-limiting example, the rack 620 may have guide rails or tabs along its edges that engage with corresponding track on the conveyor belt, ensuring smooth and precise movement along the designated path. In a non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the pod-guidance channel concept is described in detail in FIG. 1 and functions similar to the other embodiments of the apparatus as described herein.

Figure 7:
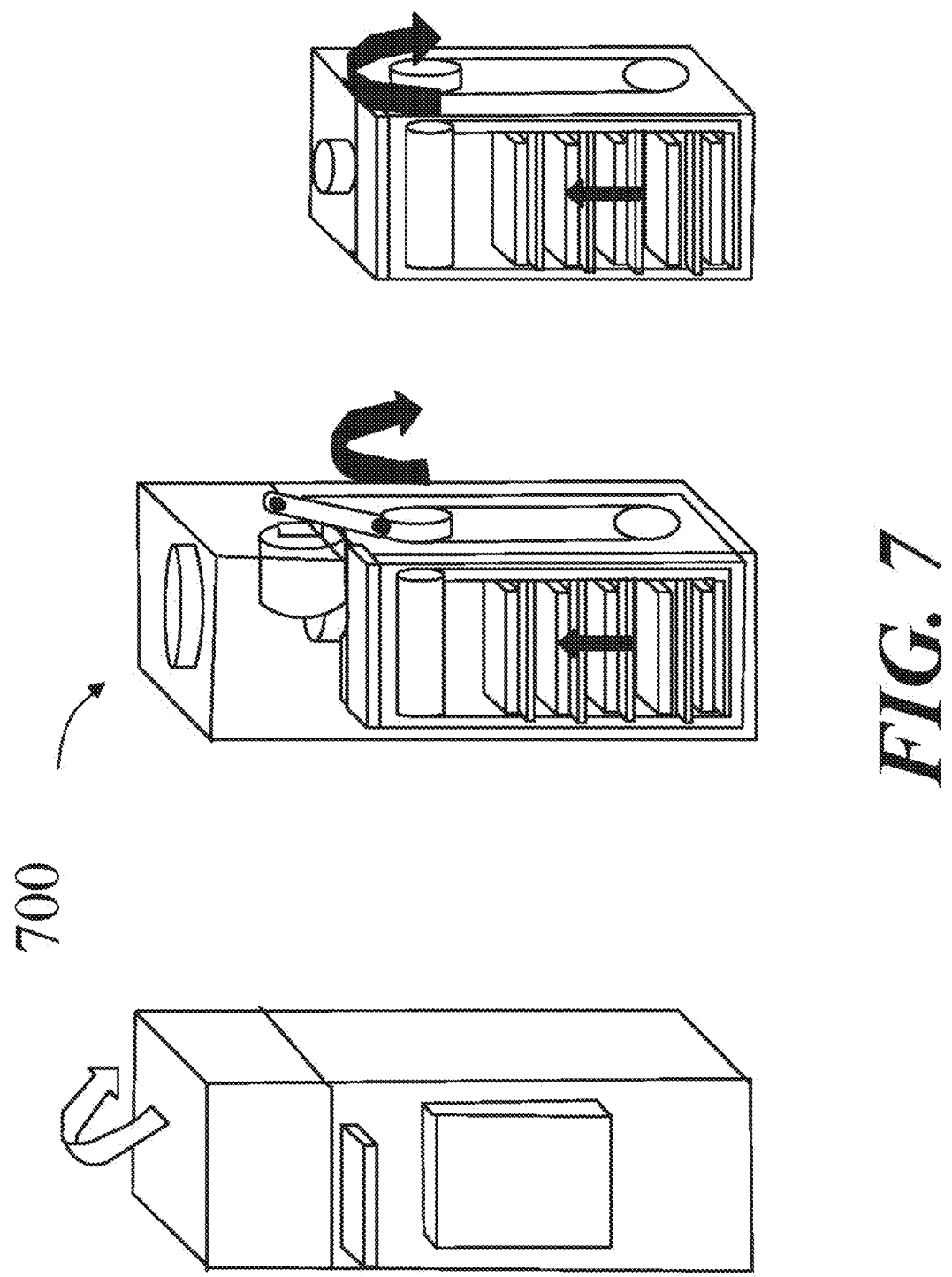
FIG. 7 is an exemplary illustration of a pod-guidance channel direct drive concept for an apparatus.

Now referring to FIG. 7 is an exemplary illustration, 700, of a pod-guidance channel direct drive concept for an apparatus. In a non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the pod-guidance channel direct drive concept is described in detail in FIG. 1 and functions similar to the other embodiments of the apparatus as described herein.

Now referring to FIG. 8 is an exemplary illustration, 800, of a helix concept for an apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the helix concept is described in detail in FIG. 1 and functions similar to the other embodiments of the apparatus as described herein.

Figure 9:
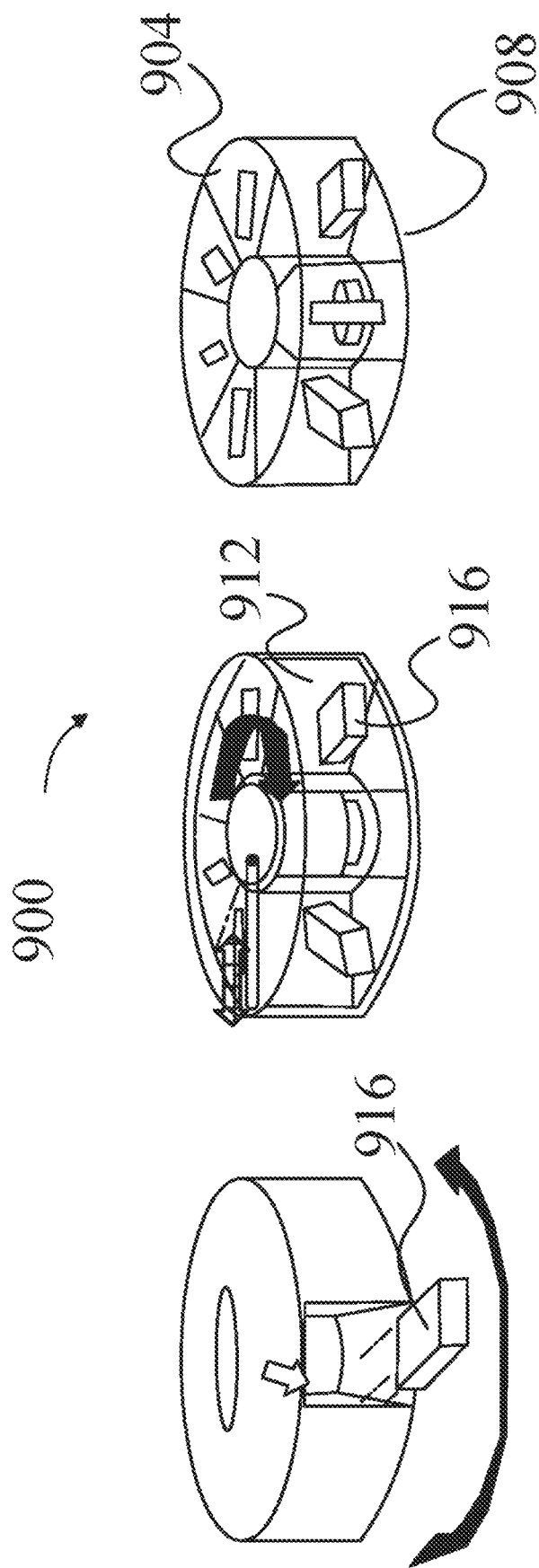
FIG. 9 is an exemplary illustration of a spoke concept for an apparatus.

Now referring to FIG. 9 is an exemplary illustration, 900, of a spoke concept for an apparatus. Without limitation, the magazine 904 may include a wheel spoke 908 shape with at least a compartment 912 for the at least a pod 916. As used in this disclosure, a "wheel spoke" is a structural design resembling the spokes of a wheel, where multiple radial arms extend from a central hub to the outer rim. Without limitation, the wheel spoke 908 shape may allow for the organization and alignment of multiple compartments 912 around the central axis, facilitating the efficient storage and dispensing of the at least a pod 916. Without limitation, the wheel spoke 908 shape may provide a compact and organized layout, ensuring that each pod 916 is securely held in place and easily accessible for dispensing. As used in this disclosure, a "compartment" is an individual section or slot within the magazine 904 designed to hold a single pod 916. Without limitation, each compartment 912 may be specifically shaped and sized to securely fit the pod 916, preventing it from moving or shifting during storage and dispensing. Without limitation, the compartments 912 may be arranged in a radial pattern around the central hub of the wheel spoke 908 shape, allowing for efficient use of space and easy access to each pod 916. In a non-limiting example, the wheel spoke 908 shape may be composed of durable plastic materials such as polycarbonate (PC) or acrylonitrile butadiene styrene (ABS). Without limitation, these materials may provide strength and impact resistance, ensuring that the magazine 904 can withstand daily use and handling. Without limitation, plastic construction may allow for lightweight design, making it easy to insert and remove the magazine 904 from the apparatus. Additionally and or alternatively, the plastic materials may be molded into precise shapes, ensuring that each compartment 912 is accurately sized to fit the at least a pod 916. Continuing, the size of the wheel spoke 908 shape may vary depending on the number of compartment 912 and the size of the pod 916. In a non-limiting example, the wheel spoke 908 shape may have an outer diameter of 3-10 cm a height of 1-5 cm, with each compartment 912 measuring approximately 1-10 cm in width and height. Continuing, the central hub may have a diameter of 0-10 cm, providing a stable base for the radial arms. Continuing, the overall thickness of the wheel spoke 908 shape may be 1-10 cm, ensuring that it can fit within the body of the apparatus while providing sufficient structural integrity. In a non-limiting example, the shape of the compartment 912 may be tailored to the specific type of pod 916 being used. For instance, if the pod 916 are cylindrical, the compartments 912 may have a circular cross-section to securely hold the pod 916 in place. If the pod 916 are rectangular, the compartment 912 may have a rectangular cross-section with rounded corners to prevent damage to the pod 916. The compartment 912 may also include small ridges or dividers to provide additional stability and prevent the pod 916 from moving laterally. Additionally and or alternatively, the compartment 912 may have open or partially open bottoms to allow the pod 916 to be easily dispensed when they reach the dispensing position. In another non-limiting example, the wheel spoke 908 shape may be composed of metal materials such as aluminum or stainless steel. These materials provide enhanced durability and a premium feel, making the magazine 904 suitable for high-end applications. The metal construction also allows for precise machining, ensuring that each compartment 912 is accurately sized and shaped to fit the pod 916. The metal wheel spoke 908 shape may have a similar size and layout as the plastic version, with outer diameter of 3-10 cm a height of 1-5 cm, with each compartment 912 measuring approximately 1-10 cm in width and height. The central hub may have a diameter of 1-10 cm, and the overall thickness may be 1-10 cm. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the spoke concept is described in detail in FIG. 1 and functions similar to the other embodiments of the apparatus as described herein.

With continued reference to FIG. 9, the magazine may be securely aligned with the body of the apparatus, ensuring that the magazine itself cannot rotate within the body of the apparatus. Continuing, this design may allow the magazine to rotate a basket containing the at least a pod without any unintended movement of the magazine. In another non-limiting example, the magazine may be assembled with a lock disk that is contained between the cover and the basket. Continuing, the lock disk may be biased "up" due to the 4 spring arms that are slightly flexed. Continuing, in the center of the lock disk may include a piece of ferrous metal. Continuing, the point of the lock disk may be twofold: to prevent rotation of the cover when the magazine is not in the dispenser device and to translate the drive torque from the dispense device to rotate the basket. Continuing, in the stored state the lock disk may be in contact with two pins in the cover. Continuing, during operation the lock disk may be pulled "down" axially in this view and disengages with the cover. Continuing, the lock disk may be keyed to the basket in the stored and operation states.

Continuing, when the magazine is inserted into the dispensing device a magnet may pull the ferrous material towards it to enable movement. Continuing, the point of the magnet may be to cause a state change in the device without the user being given access to drive the change. Continuing, this may add security to the magazine when it is not being used with the dispense device. Continuing, the user may likely be unaware that the magazine could be unlocked manually with a magnet.

Continuing, the drive system may include a PCB, coin cell battery, motor, planetary gear system, and keyed output shaft. Continuing, additional planetary gear systems may be added along the axis (just doubling the system) to increase the torque generated.

In this embodiment a radially extending feature on the dispenser may engage with a notch and lip in the basket as a means of retaining the magazine in the dispenser during operation. Continuing, the user may insert the magazine and the feature passes through the notch. Continuing, by means of some button press or the device sensing the presence of the magazine the motor may rotate slightly and engage the radial feature with the lip and prevent axial movement. Continuing, in this embodiment ejecting the magazine may require the basket be rotated back to the initial position. In other embodiments a simple snap may retain the magazine. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Now referring to FIG. 10 is an exemplary illustration, 1000, of a spoke direct drive concept for an apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the spoke direct drive concept is described in detail in FIG. 1 and functions similar to the other embodiments of the apparatus as described herein.

Now referring to FIG. 11 is an exemplary illustration, 1100, of a nebula concept for an apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the nebula concept is described in detail in FIG. 1 and functions similar to the other embodiments of the apparatus as described herein.

Figure 12:
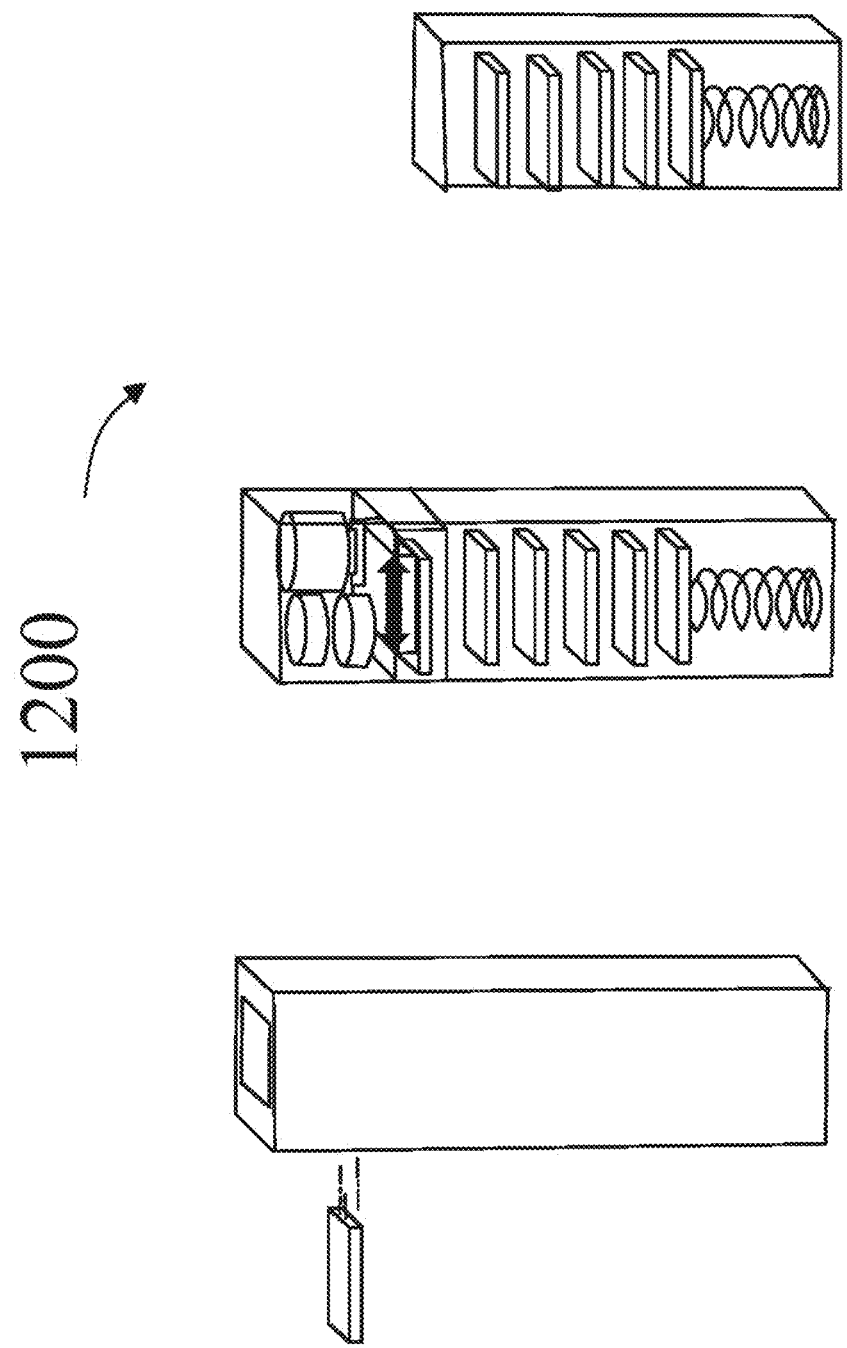
FIG. 12 is an exemplary illustration of a launchpad concept for an apparatus.

Now referring to FIG. 12 is an exemplary illustration, 1200, of a launchpad concept for an apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the launchpad concept is described in detail in FIG. 1 and functions similar to the other embodiments of the apparatus as described herein.

Now referring to FIG. 13 is an exemplary illustration, 1300, of a colt concept for an apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the colt concept is described in detail in FIG. 1 and functions similar to the other embodiments of the apparatus as described herein.

Figure 14:
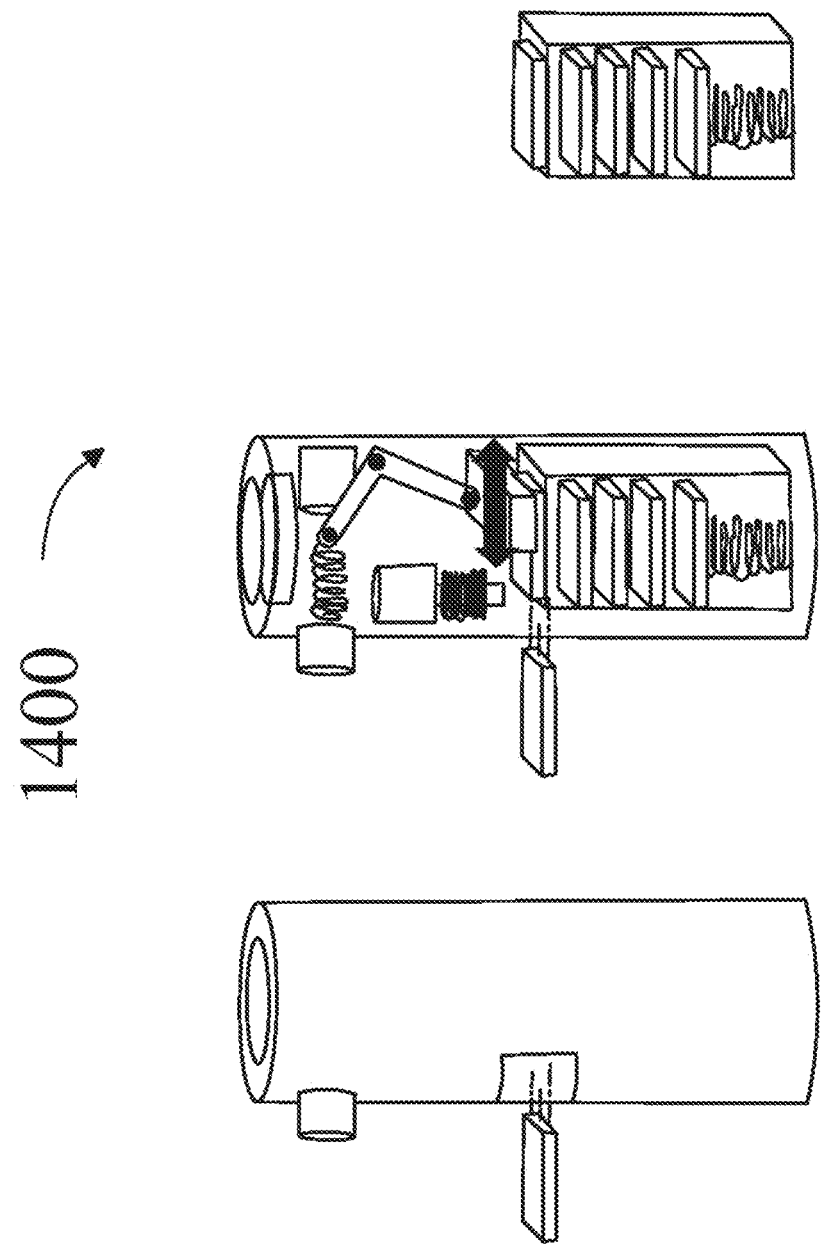
FIG. 14 is an exemplary illustration of a springboard concept for an apparatus.

Now referring to FIG. 14 is an exemplary illustration, 1400, of a springboard concept for an apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the springboard concept is described in detail in FIG. 1 and functions similar to the other embodiments of the apparatus as described herein.

Now referring to FIG. 15 is an exemplary illustration, 1500, of a vortex concept for an apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the vortex concept is described in detail in FIG. 1 and functions similar to the other embodiments of the apparatus as described herein.

Figure 16:
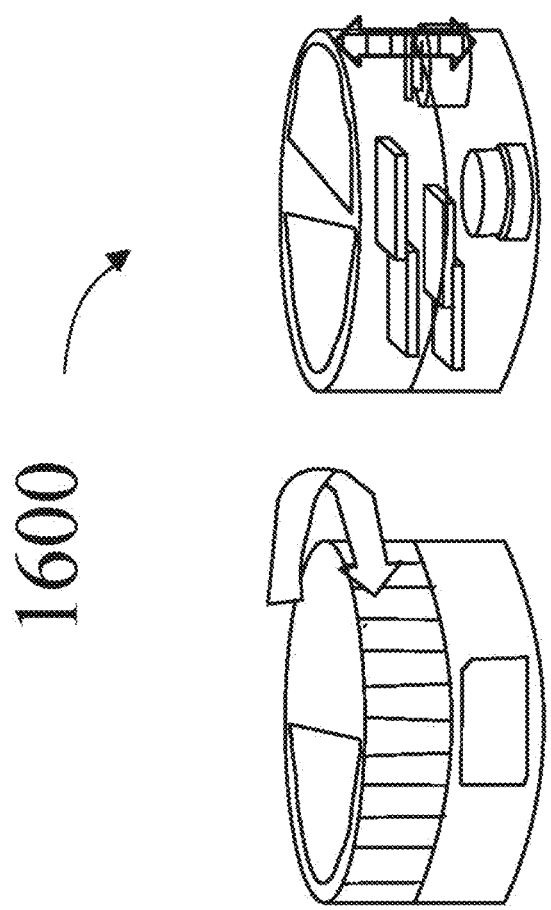
FIG. 16 is an exemplary illustration of a meta concept for an apparatus.

Now referring to FIG. 16 is an exemplary illustration, 1600, of a meta concept for an apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. Without limitation, the meta concept is described in detail in FIG. 1 and functions similar to the other embodiments of the apparatus as described herein.

Figure 17:
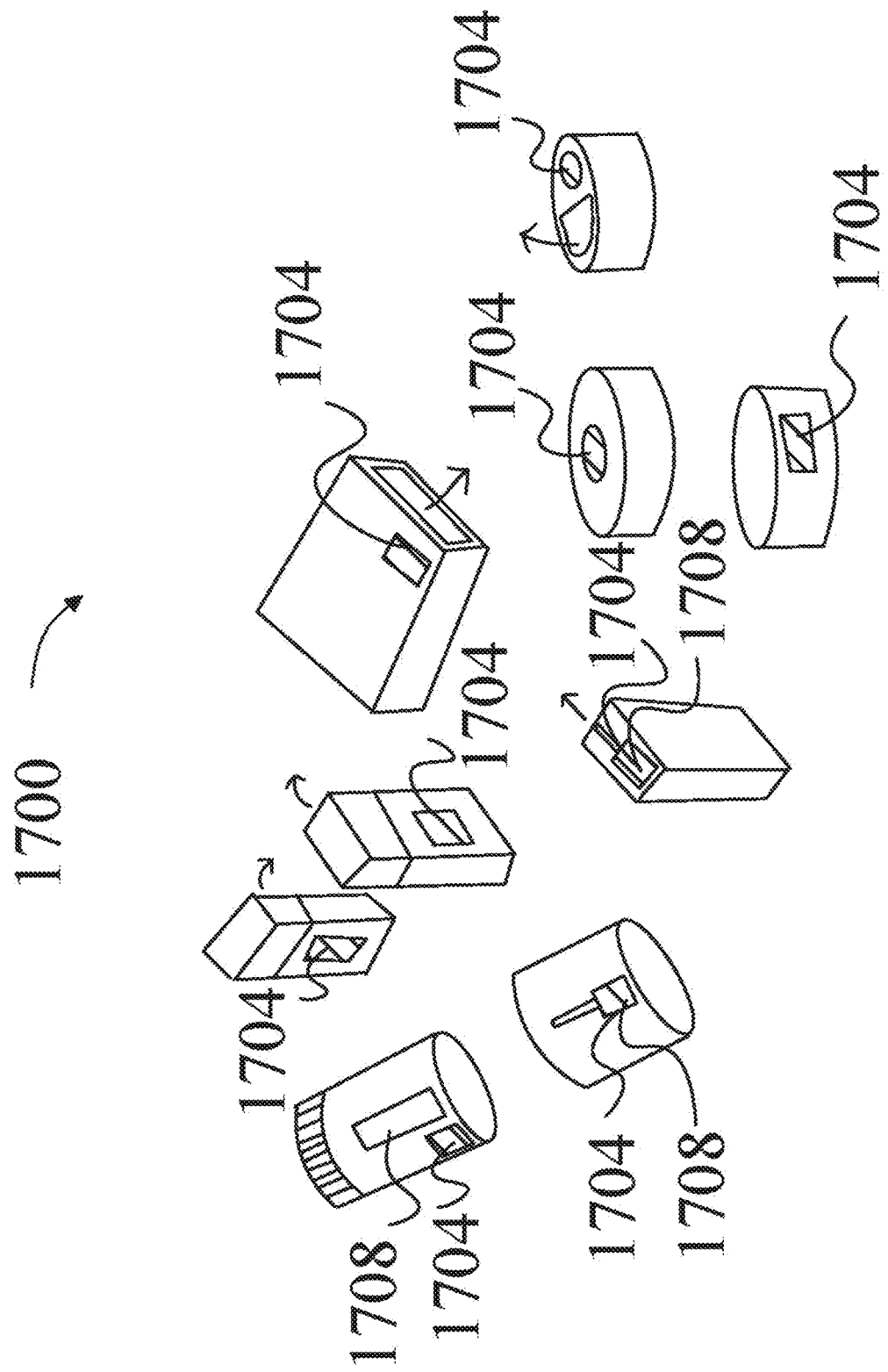
FIG. 17 is an exemplary illustration of a plurality of user interface layouts.

Now referring to FIG. 17 is an exemplary illustration, 1700, of a plurality of user interface layouts. Without limitation, the user interface layout may include an activation button 1704 and or the fingerprint scanner 1708. As used in this disclosure, an "activation button" is user operated control that, when pressed or engaged, initiates the mechanism within the apparatus to unlock and dispense the oral nicotine. In a non-limiting example, the apparatus may be designed with various activation button 1704 configurations to suit different user preferences and ergonomic needs. One embodiment features a button 1704 on the outer diameter (OD) of a long cylinder, allowing for easy thumb activation. In another embodiment, the apparatus may have a design that places the button 1704 on top of a short cylinder, ideal for direct downward pressure. A similar short cylinder model has the button 1704 on the side, providing an alternative grip option. In another embodiment, the apparatus may include, for a more substantial feel, a large rotary sleeve on the OD of a cylinder may be used to activate the mechanism by twisting. Additionally and or alternatively, a short rotary sleeve on the OD of a short cylinder offers a compact, twist-to-activate option. In another embodiment, the apparatus may include a flat pack cuboid design with a button 1704 in a top corner for convenient fingertip activation, or a button 1704 on the front side for easy access. In another embodiment, the apparatus may include a long tube or cuboid model that may have button 416 on the top, side, or front, or even in a corner, providing multiple activation methods based on user preference and the apparatus's form factor. Without limitation, each configuration may ensure the secure and controlled release of the at least a pod from the apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 18:
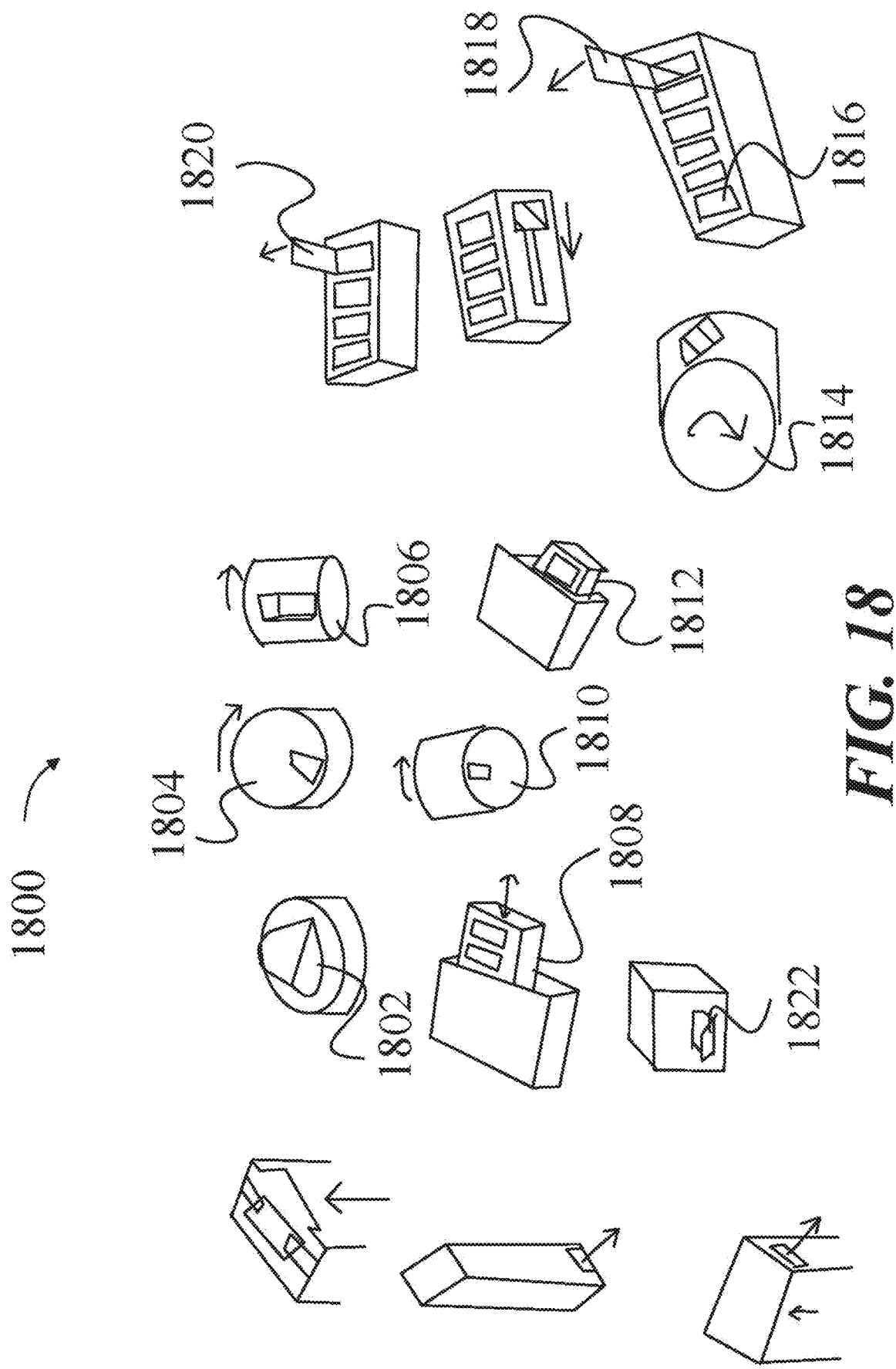
FIG. 18 is an exemplary illustration of a plurality of at least a pod dispensing methods.

Now referring to FIG. 18 is an exemplary illustration, 1800, of a plurality of at least a pod dispensing methods. Without limitation, the drive mechanism may be configured to provide access to the at least a pod using one or more of a linear tray configuration 1808, a drop down tray configuration 1822, and a revolver configuration 1810. As used in this disclosure, a "linear tray configuration" is a mechanism where pods are arranged in a straight line within a tray, and the drive mechanism moves the tray linearly to position the next pod for dispensing. In a non-limiting example, the linear tray configuration 1808 may permit straightforward access to the at least a pod in sequence. In a non-limiting example, the linear tray configuration 1808 may be useful for the apparatus where space is limited in one dimension. For example, without limitation, the linear tray configuration 1808 may be employed by aligning the at least a pod horizontally within a tray inside the apparatus. Continuing, when the user activates the drive mechanism, the tray slides horizontally, positioning the next at least a pod directly under the dispensing mechanism. Continuing, this setup may ensure that each pod is dispensed in a precise and orderly fashion.

With continued reference to FIG. 18, as used in this disclosure, a "drop down tray configuration" is a mechanism where the tray holding the pods is elevated and, upon activation, drops down to align a pod with the dispensing opening. Without limitation, the drop down tray configuration 1822 may use gravity to assist in the movement of the tray. For example, without limitation, the at least a pod may be stored in a vertically aligned tray within the apparatus. Continuing, when the user presses a button, the tray may drop down, positioning the next at least a pod at the bottom, ready for dispensing. Without limitation, the drop down tray configuration 1822 may leverage gravity to ensure a smooth and consistent movement of the at least a pod.

With continued reference to FIG. 18, as used in this disclosure, a "revolver configuration" is a mechanism where pods are loaded into a rotating cylinder. In a non-limiting example, the revolver configuration 1810 may be similar to the chamber of a revolver. Without limitation, the drive mechanism may rotate the cylinder to position the next pod in line with the dispensing opening. Without limitation, the revolver configuration 1810 may permit compact storage of the plurality of pods and quick access by rotating the cylinder. For example, without limitation, the revolver configuration 1810 may be implemented by loading the at least a pod into a rotating cylinder within the apparatus. Continuing, each time the user activates the drive mechanism, the cylinder may rotate, bringing the next at least a pod into alignment with the dispensing opening. Continuing, the revolver configuration 1810 may add a fun and dynamic element to the dispensing process but also ensures that each at least a pod is quickly and efficiently positioned for dispensing.

With continued reference to FIG. 18, other embodiments may include a flat rotation configuration 1804, a side rotation configuration 1806, an auto select configuration 1820, a pill pocket configuration 1816, a preset and tear configuration 1814, an advance one tray at a time configuration 1812, and the like. As used in this disclosure, a "flat rotation configuration" is a design where the dispensing mechanism rotates on a flat plane to dispense the oral nicotine products. As used in this disclosure, a "side rotation configuration" is a design where the dispensing mechanism rotates on its side or a vertical plane to dispense the oral nicotine products. As used in this disclosure, an "auto select configuration" is a feature that automatically selects and dispenses a specific oral nicotine product based on predetermined criteria or user preference. As used in this disclosure, a "pill pocket configuration" is a design where the oral nicotine products are stored in individual compartments or pockets, similar to pill organizers, for easy dispensing. As used in this disclosure, a "preset and tear configuration" is a design where the amount of oral nicotine product to be dispensed is preset, and the user can tear or remove the exact amount needed. As used in this disclosure, an "advance one tray at a time configuration" is a design where the dispenser advances one tray or compartment at a time to dispense the oral nicotine products in a sequential manner. In an embodiment, the flat rotation configuration 1804 is implemented within the apparatus where the mechanism rotates on a horizontal plane to release oral nicotine products. For instance, without limitation, the user may place at least a pod of nicotine on the drive mechanism, and by rotating a flat disk at the base, the at least a pod may be dispensed one at a time through an opening. This configuration ensures an even distribution of the at least a pod and prevents jamming. Similarly, a side rotation configuration 1806 might be used in a cylindrical shaped apparatus where the apparatus rotates vertically. In another non-limiting example, the auto select configuration can be seen in advanced dispensers where the system automatically chooses the appropriate nicotine product based on user preferences or preset criteria. For example, a user might input their desired nicotine strength or flavor through a digital interface, and the dispenser will automatically select and release the corresponding product. This feature may add convenience and personalization to the dispensing process. Meanwhile, the pill pocket configuration 1816 may offer a practical solution for organizing and dispensing oral nicotine products. Each product is stored in a separate pocket or compartment, similar to a daily pill organizer, which can be particularly useful for users who prefer a structured and organized method of nicotine consumption. This design ensures that each dose is kept secure and easily accessible.

Without limitation, with continued reference to FIG. 18, other embodiments may include different configurations for holding and dispensing the at least a pod. For instance, a large pocket/cavity embodiment may feature a spacious compartment that may hold the at least a pod, allowing users to access several of the at least a pods simultaneously. In another embodiment, the apparatus may include a flat short cylinder cavity embodiment. Continuing, this may include a cavity on the flat side of a short cylinder, sized to hold the at least a pod, with the at least a pod oriented lengthwise along the radial line for easy access and neat storage. In another embodiment, the flat long cylinder cavity embodiment may include a cavity on the flat side of a long cylinder, also designed to hold one pouch, but oriented lengthwise along the cylinder's height, ensuring efficient use of space and convenient dispensing. Similarly, the radial outside long cylinder cavity embodiment features a cavity on the radial outside of a long cylinder, with the at least a pod oriented lengthwise along the cylinder's height, providing a streamlined appearance and easy access. In another embodiment, the bottom flat short cylinder cavity embodiment positions the cavity on the bottom flat side of a short cylinder, with the at least a pod oriented lengthwise along the radial line, allowing straightforward dispensing from the bottom. In another non-limiting embodiment, the side short cylinder cavity embodiment may include a cavity on the side of a short cylinder with the at least a pod oriented lengthwise along the radial line for easy side access. In another non-limiting example, the tray-extending cavity embodiment may include a cavity within a tray that extends from the apparatus, with the at least a pod oriented flat and lengthwise along one edge for easy retrieval when the tray is extended. In another non-limiting example, the top side long tube/cuboid cavity embodiment may include a cavity on the top side of a long tube or cuboid, while the bottom side long tube/cuboid cavity has the cavity on the bottom side, both providing accessible dispensing from different angles. The short side long tube/cuboid cavity has a compact and accessible design with the cavity on the short side. In another non-limiting embodiment, the multiple cavities long tube/cuboid embodiment may include several cavities along a long tube or cuboid, similar to a daily pill organizer, with each cavity holding individual pouches for an organized and segmented dispensing approach.

Without limitation, with continued reference to FIG. 18, other embodiments for holding and dispensing the at least a pod may include a linear path dispenser, a rotating dial dispenser, a spiral path dispenser, a spiral wire dispenser, an individual at least a pod storage dispenser, an individual cavity dispenser, and the like. As used in this disclosure, a "linear path mechanism" embodiment organizes and moves the oral nicotine at least a pod along a straight, linear path. This design may feature a track or rail system within the apparatus where at least a pod are aligned and pushed forward either mechanically or manually. Continuing, as each at least a pod reaches the end of the path, it is dispensed through an exit opening. This approach may ensure that at least a pod is dispensed in a sequential and controlled manner, minimizing the risk of jamming or misalignment. As used in this disclosure, a "rotating dial mechanism" utilizes a rotating dial mechanism combined with gravity to agitate and filter the at least a pod towards the exit. Continuing, as the dial rotates, it may stir the at least a pod within the apparatus, guiding them towards the dispensing chute. The motion of the dial, along with the assistance of gravity, may ensure that the at least a pod are evenly distributed and delivered one at a time. This method may be effective in preventing clumping and ensures a consistent flow of the at least a pod. As used in this disclosure, a "spiral path mechanism" employs a spiral path that moves the at least a pod from the center of the mechanism outwards. This path may be driven by a spring mechanism or user action, such as turning a knob. Continuing, as the at least a pod travel along the spiral path, they are guided towards the dispensing point. Continuing, this design may maximize the use of space within the apparatus and provide a visually engaging method of delivering the at least a pod. As used in this disclosure, a "spiral wire mechanism" features a spiraling wire, similar to those found in traditional vending machines, to move the at least a pod. Continuing, as the wire rotates, it may push the at least a pod along its coils towards the exit. Continuing, this method may ensure that the at least a pod are dispensed one at a time in a controlled manner. Continuing, the spiral wire design may be effective in preventing the at least a pod from becoming stuck and may ensure a steady supply. As used in this disclosure, an "individual the at least a pod storage mechanism" organizes each at least a pod in its own storage environment, created by sandwiching the at least a pod between layers of plastic and foil, much like pill pouches. Continuing, this method may protect each at least a pod from external elements, maintaining their freshness and integrity until dispensed. Continuing, each pod may be released individually, ensuring precise and hygienic dispensing. As used in this disclosure, an "individual cavity mechanism" features a design where each oral nicotine at least a pod is stored in its own individual cavity. Continuing, this method may allow for each of the at least a pod to be isolated, preventing contact with other at least a pod and ensuring they remain intact and uncontaminated. Continuing, when the at least a pod is needed, it may be dispensed from its dedicated cavity, providing a neat and organized dispensing method.

With continued reference to FIG. 18, other embodiments for dispensing the at least a pod may include pouches organized and moved along linear path, rotating dial that agitates/filters pouches along with gravity to the exit, a spiral path from center out that moves pouches along path. likely spring or user driven, a spiraling wire moves pouches along like a vending machine dispenses, individual storage environment for each pouch made by sandwiching them between plastic and foil (much like pill pouches), individual cavities to store each pouch individually, and the like.

With continued reference to FIG. 18, other embodiments for dispensing the at least a pod may include a simple in/out button press, a slider button over a short throw distance, a slider button which pivots around a point (likely used with cylindrical embodiments), a hinge like feature which is flexed by the user (likely used with a long tube/cuboid embodiment), a flip top mechanism (much light a lighter or Pez dispenser), a lever on the side of some shape embodiment (likely long cuboid), a wheel "within" the tube shape, partially exposed out of body sidewall, rotary turn of full body (likely long tube/cylinder/cuboid), axial extension of the device body (likely long tube/cylinder/cuboid), flip top cover, slider on side that can be translated by thumb, rotary turn of full body (likely short cylinder), single hand squeeze of device/lever to drive motion, and the like. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 19:
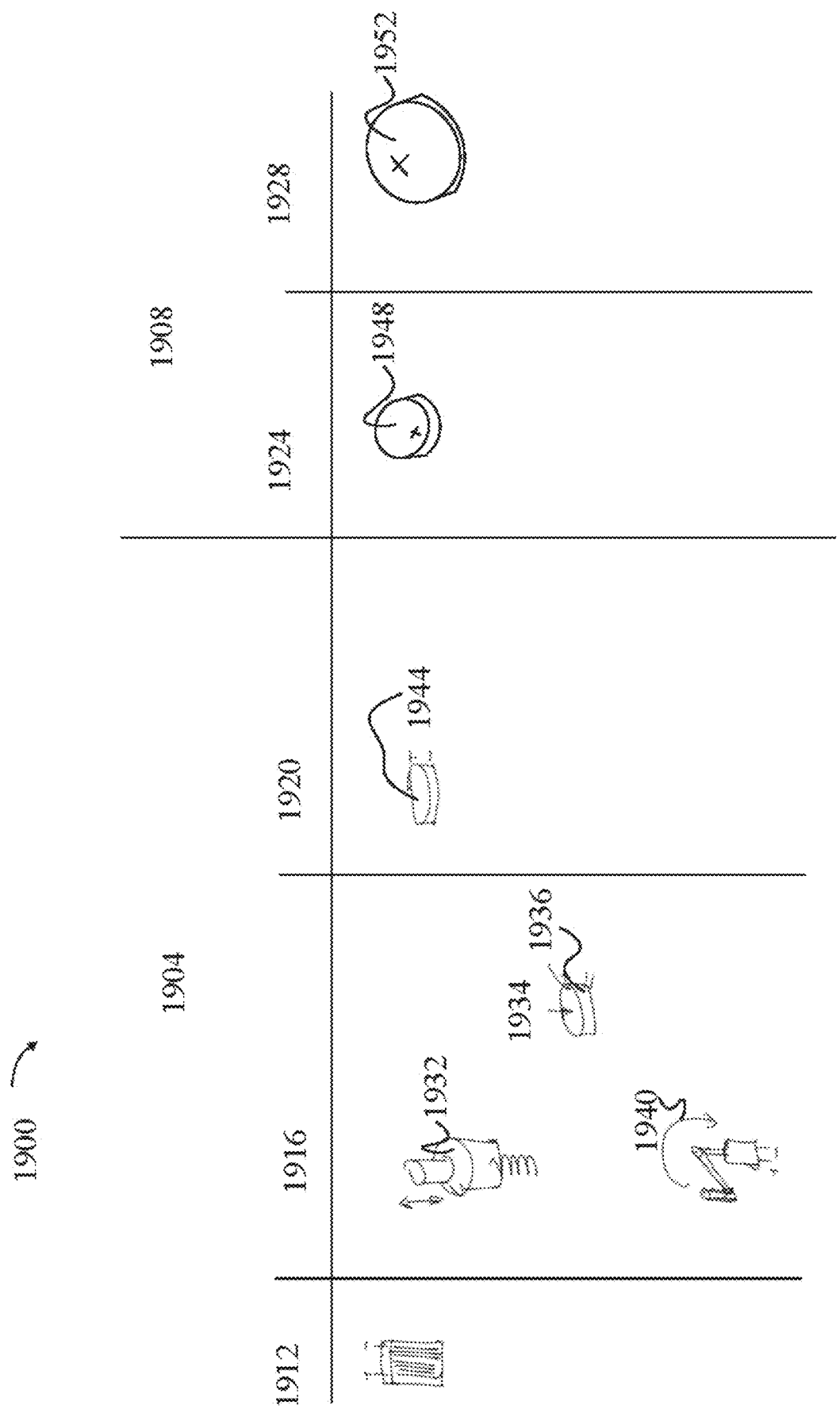
FIG. 19 is an exemplary illustration of a plurality of methods of powering an apparatus.

Now referring to FIG. 19 is an exemplary illustration of a plurality of methods of powering an apparatus. For example, without limitation, the apparatus may be powered using one or more rechargeable power sources 1904 and or one or more disposable power sources 1908. Without limitation, one or more rechargeable power sources 1904 may involve a wire battery 1912, a button press generator 1916, a passive source 1920, and the like. Without limitation, the one or more disposable power sources 1908 may involve in disposable sources 1924 and or in reusable power sources 1928. Without limitation, the button press generator 1916 may include a piezoelectric (crystal) hammer starter 1932, a piezoelectric transducer 1936, a user rotate system 1940, and the like. Without limitation, the passive source 1920 may include a passive system 1944, wherein the passive system 1944 stores energy in the apparatus which is generated during normal movement of the product owner. Without limitation, the in disposable sources 1924 may include a button cell battery pressed into the magazine. Without limitation the in reusable power sources 1928 may include a coin cell 1952 which may be swapped in for a new charge by a user.

With continued reference to FIG. 19, the at least a power source may include at least a piezoelectric hammer starter 1932. As used in this disclosure, a "piezoelectric hammer starter" is a type of power source that generates an electric charge through the mechanical impact on a piezoelectric material. In a non-limiting example, when the hammer strikes the piezoelectric element, it produces an electric charge due to the piezoelectric effect. Without limitation, this electric charge may be used to power certain components of the apparatus, such as creating a spark for ignition purposes or providing a short burst of electrical energy. For example, the piezoelectric hammer starter 1932 may be used to power the drive mechanism that dispenses the at least a pod. For instance, without limitation, when the user presses the button, the mechanical action may trigger the hammer to strike the piezoelectric element, generating an electric charge. Continuing, this charge may be used to activate a solenoid or motor within the drive mechanism, causing it to advance the at least a pod to the dispensing position. Additionally and or alternatively, the piezoelectric hammer starter 1932 may be used to power the locking mechanism. For example, without limitation, upon successful fingerprint authentication, the mechanical impact on the piezoelectric material may generate the necessary electric charge to release a latch or activate a solenoid, allowing the user to access the at least a pod. In another non-limiting example, the piezoelectric hammer starter 1932 may be employed to power indicator lights or small display screens that provide user feedback. For instance, without limitation, the electric charge generated by the piezoelectric effect may be used to illuminate an LED light indicator, signaling to the user that the apparatus is ready for use or that a pod has been successfully dispensed. In another non-limiting example, the piezoelectric hammer starter 1932 may be used to power a small speaker that provides auditory feedback. For example, without limitation, when the hammer strikes the piezoelectric element, the resulting electric charge may be used to produce a sound, such as a beep or chime, to notify the user of successful authentication or completion of the dispensing process.

With continued reference to FIG. 19, the at least a power source may include a piezoelectric transducer 1936. As used in this disclosure, a "piezoelectric transducer" is a device that converts mechanical energy into electrical energy, or vice versa, using the piezoelectric effect. Without limitation, the piezoelectric effect is the ability of certain materials to generate an electric charge in response to applied mechanical stress. In a non-limiting example, the piezoelectric transducer 1936 may consist of a piezoelectric material, such as quartz or certain ceramics, that produces an electric charge when subjected to mechanical pressure or vibration. Conversely, when an electric field is applied to the piezoelectric material, it may induce mechanical deformation or movement. Without limitation, piezoelectric transducer 1936 may be used in applications requiring precise control of mechanical and electrical energy conversion, such as sensors, actuators, and energy harvesting devices. In a non-limiting example, the piezoelectric transducer 1936 may be pressed by the user to initiate a specific function, while simultaneously generating the necessary power to drive the locking mechanism.

With continued reference to FIG. 19, the drive mechanism within the apparatus may utilize various types of batteries to dispense the at least one pod. In a non-limiting example, the battery may include one or more of a wire battery 1912, a rechargeable battery, a passive battery, a disposable battery, and a reusable battery. As used in this disclosure, a "wire battery" is a type of flexible battery that can be shaped and stretched while still providing power. In a non-limiting example, the wire battery 1912 may be useful in applications where space constraints or flexible configurations are required. The drive mechanism may incorporate a wire battery 1912 to ensure that the power source can adapt to the form factor of the apparatus, allowing for an ergonomic design. As used in this disclosure, a "rechargeable battery" is a type of battery that can be recharged and used multiple times. Without limitation, the rechargeable battery may use chemistries such as lithium-ion or nickel-metal hydride (NiMH). Without limitation, the drive mechanism may include a rechargeable battery to provide a sustainable and cost-effective power solution. Without limitation, the user may recharge the battery using a USB port or a dedicated charging dock. As used in this disclosure, a "passive battery" is a type of battery that provides power without requiring an active charging circuit. Without limitation, a passive battery may rely on chemical reactions to generate electricity and may be used in low-power applications. The drive mechanism may use a passive battery to ensure a continuous and reliable power source with minimal maintenance. As used in this disclosure, a "disposable battery" is a single-use battery that is discarded after it is depleted. In a non-limiting example, the disposable battery may include a button cell battery 1948. As used in this disclosure, a "button cell battery" is a small, round battery. Without limitation, the button cell battery 1948 may be used in small electronic devices. The drive mechanism may be designed to accept a button cell battery 1948 pressed into the magazine, providing a simple and convenient power solution. Without limitation, this allows users to quickly replace the battery when it runs out, ensuring uninterrupted operation of the apparatus. As used in this disclosure, a "reusable battery" is a type of battery that can be replaced and used multiple times. For example, a coin cell battery 1952 may be a reuseable battery. As used in this disclosure, a "coin cell battery" is a small, round battery that can be easily swapped by the user. The drive mechanism may be configured to accept a reusable coin cell battery 1952, allowing users to replace the battery as needed. Continuing, the coin cell battery 1952 may offer a balance between convenience and sustainability, as users can keep spare batteries on hand and replace them as required. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 20:
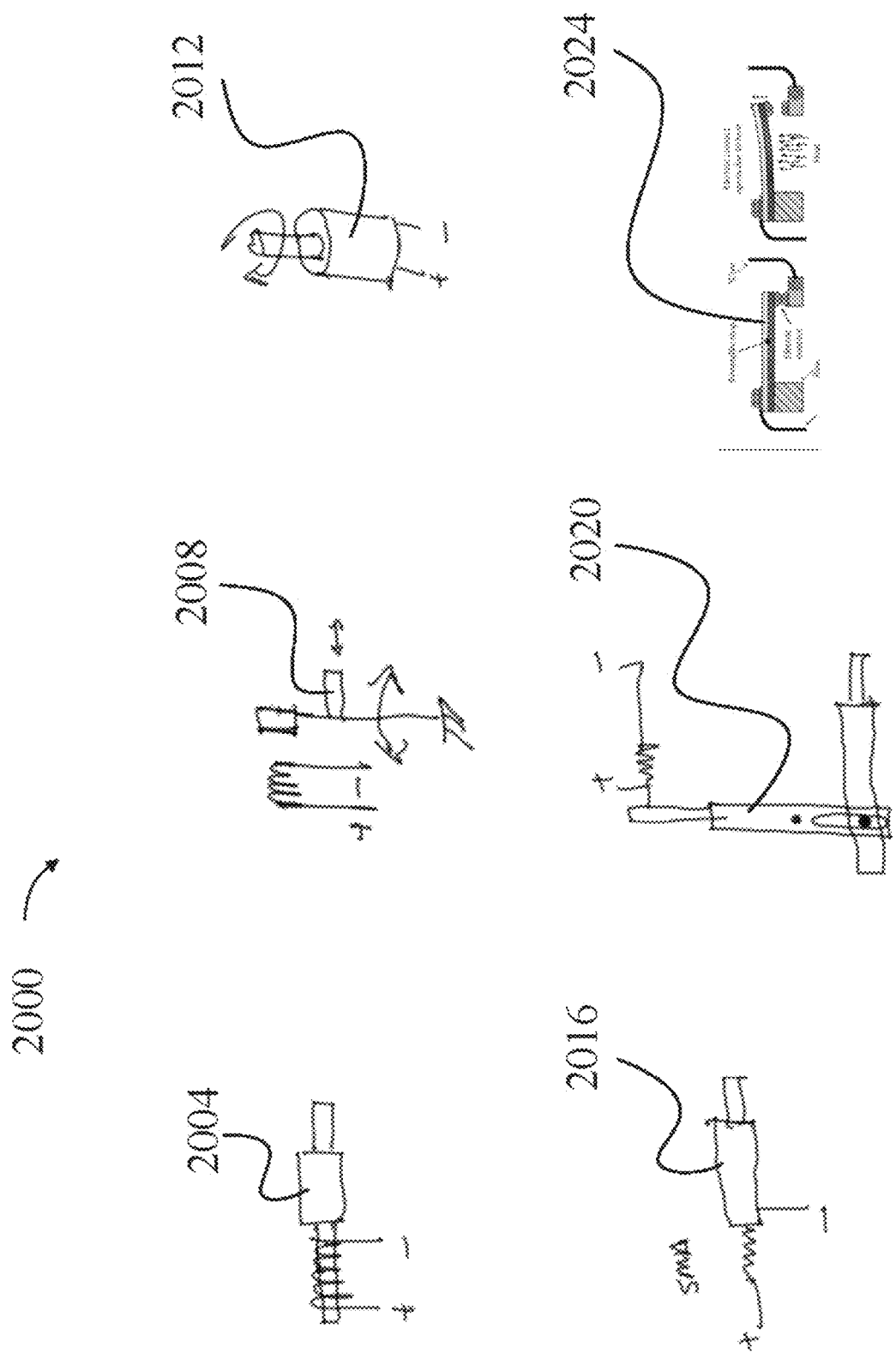
FIG. 20 is an exemplary illustration of a plurality of designs used to convert electricity to mechanical movement.

Now referring to FIG. 20 is an exemplary illustration, 2000, of a plurality of designs used to convert electricity to mechanical movement. In a non-limiting example, the drive mechanism may be configured to utilize one or more of at least a solenoid 2004 and at least a shape memory alloy actuator 2016. As used in this disclosure, a "solenoid" is an electromechanical device that converts electrical energy into linear mechanical motion. In a non-limiting example, the solenoid 2004 may consist of a coil of wire that generates a magnetic field when an electric current passes through it, and a movable metal core or plunger that is drawn into the coil by the magnetic field. In a non-limiting example, the solenoid 2004 may be used to create linear motion to push or pull components within the apparatus, such as advancing a pod to the dispensing position. Solenoid 2004 may provide precise and rapid linear movement. As used in this disclosure, a "shape memory alloy actuator" is a device made from a special type of metal alloy that can return to a pre-defined shape when subjected to a specific thermal condition. Without limitation, shape memory alloys (SMAs) 2016 may exhibit unique properties that allow them to change shape in response to temperature changes. For example, without limitation, when heated, the alloy 2016 "remembers" its original shape and returns to it, generating mechanical motion. In a non-limiting example, the shape memory alloy actuator 2016 may be used to move or position components within the apparatus, such as pushing the at least a pod into the dispensing position. SMAs 2016 may be particularly useful as they are compact, lightweight, and thermally activated actuation mechanisms. Without limitation, the drive mechanism may employ a variety of elements to effectively dispense at least a pod, allowing for flexibility and precision in operation. For instance, without limitation, the solenoid 2004, either off-the-shelf (OTS) or custom-designed, may be used to create linear motion, pushing the at least a pod into the dispensing position. Continuing, when enhanced with mechanical advantage, the solenoid 2008 may leverage levers or gears to amplify its force, ensuring reliable operation even with minimal power input. Additionally and or alternatively, a motor 2012 may be incorporated into the drive mechanism, providing rotational or linear motion to dispense the at least a pod. Without limitation, the motor 2012 may be versatile and may be paired with gears, cams, or belts to translate their motion into the precise movement needed for dispensing the at least a pod. In a non-limiting example, the drive mechanism may utilize one or more shape memory alloy (SMA) actuators 2016. Without limitation, SMAs 2016 may provide change shape in response to temperature changes, allowing them to push or pull the at least a pod into position. When combined with mechanical advantage, SMA actuators 2020 may use levers or other mechanisms to amplify their movement, ensuring sufficient force is applied to dispense the at least a pod. In a non-limiting example, the drive mechanism may utilize a bimetallic switch 2024. For example, the bimetallic switch 2024 may be integrated into the drive mechanism to control the dispensing process. Bimetallic switches 2024 may bend when exposed to temperature changes, which may be harnessed to trigger the movement of the at least a pod. Continuing, this method may provide a reliable, thermally activated solution that can be particularly useful in specific environmental conditions or designs requiring temperature sensitivity. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Referring now to FIG. 21, an exemplary illustration, 2100, of a plurality of unlocking mechanism. Without limitation, the locking mechanism may include one or more of a screw drive mechanism 2104, a rotary cam and slider pin 2108, a rack and pinion 2112, a two bar linkage 2116, a train wheel mechanism 2120, a cam follower 2124, a scotch yoke 2128, a scotch yoke and lever arm 2132, a double direction slider crank 2136, a continuous spin linkage to geared linear actuator 2140, a radially aligned pin/slot in shear 2144, a padlock 2148, an in and over button/slider mechanism 2152, a flip lock slider 2156, and the like. As used in this disclosure, a "screw drive" is a locking mechanism that utilizes a threaded screw to engage or disengage components through rotational movement. In an embodiment, the screw drive mechanism 2104 may be used to secure the magazine in place. Continuing, when the user rotates the screw, it threads into a corresponding hole, locking the magazine securely to prevent accidental opening and spillage of the at least a pod. Conversely, rotating the screw in the opposite direction would disengage the lock, allowing the user to access the magazine for refilling or cleaning purposes. As used in this disclosure, a "rotary cam and slider pin" is a locking mechanism where a cam rotates to move a pin along a designated path, facilitating the locking or unlocking process. In an embodiment, the rotary cam and slider pin 2108 may be employed to control the release of the at least a pod. When the cam rotates, it moves the slider pin into a position that either blocks or allows the at least a pod to be dispensed, providing precise control over the dispensing process. As used in this disclosure, a "rack and pinion" is a mechanism consisting of a circular gear (pinion) engaging a linear gear (rack), converting rotational motion into linear motion to lock or unlock components. In an embodiment, rack and pinion 2112 may be used to advance the at least a pod towards the dispensing point by rotating the pinion gear to move a rack and push the at least a pod forward in a controlled and orderly manner. As used in this disclosure, a "two bar linkage" is a locking mechanism composed of two rigid bars connected by pivots, which translate motion to achieve locking or unlocking. In an embodiment, the two bar linkage 2116 may be used to control the opening and closing of the dispensing chute. For instance, without limitation, when the user activates the mechanism, the linkage may move, allowing the chute to open for dispensing and then close to secure the remaining pods. As used in this disclosure, a "train wheel mechanism" is a locking mechanism that uses a series of interlocking wheels or gears, similar to a train's wheels, to facilitate controlled movement for locking or unlocking. In an embodiment, the train wheel mechanism 2120 may be used to advance the at least a pod 408 towards the dispensing slot. Continuing, the interlocking gears may ensure smooth and precise movement, reducing the risk of jams and ensuring a consistent dispensing process. As used in this disclosure, a "cam follower" is a mechanism where a follower rides on a cam profile, translating the cam's rotational motion into linear or reciprocating motion to engage or disengage the lock. In an embodiment, the cam follower 2124 may be used to control the dispensing action. As the cam rotates, the follower may move in a linear path, pushing the at least a pod out for dispensing. Additionally and or alternatively, the cam follower 2124 may be employed to secure the lid of the apparatus. For example, without limitation, when the cam rotates, the follower may move into a locking position, securing the lid and preventing unauthorized access. As used in this disclosure, a "scotch yoke" is a mechanism that converts rotational motion into linear motion using a yoke and a pin on a rotating component, useful for locking or unlocking. In an embodiment, the scotch yoke 2128 may drive the movement of a sliding door that covers the dispensing opening. In a non-limiting example, rotating the yoke may move the door linearly, allowing access to the at least a pod 408 or sealing them inside the apparatus. As used in this disclosure, a "scotch yoke and lever arm" is a combination mechanism where a scotch yoke is used alongside a lever arm to enhance the conversion of rotational motion into linear motion for locking or unlocking. In an embodiment, the scotch yoke and lever arm 2132 may be employed to control both the opening of the dispensing slot and the advancement of pouches simultaneously. Continuing, the combined motion may ensure that when the slot opens, at least a pod is automatically positioned for dispensing. As used in this disclosure, a "double direction slider crank" is a mechanism that converts rotational motion into linear motion in two directions, typically involving a crank and a sliding component, for locking or unlocking purposes. In an embodiment, the double direction slider crank 2136 may be used to control a dual-action dispensing system where at least a pod is moved in two directions before being released. Continuing, this may ensure precise positioning and smooth dispensing. Additionally and or alternatively, the double direction slider crank may be utilized to secure and release the magazine. The crank's motion may allow the magazine to be locked in place or released for refilling, providing a secure and efficient mechanism for managing the pods. As used in this disclosure, a "continuous spin linkage to geared linear actuator" is a mechanism where continuous rotational motion is translated into linear motion via a geared linkage, facilitating locking or unlocking. In an embodiment, the continuous spin linkage to geared linear actuator 2140 this mechanism may be employed to advance the at least a pod towards the dispensing point with continuous rotation, ensuring a steady and controlled flow of the at least a pod. As used in this disclosure, a "radially aligned pin/slot in shear" is a mechanism where a pin aligned radially interacts with a slot to provide shear force, achieving locking or unlocking. In an embodiment, the radially aligned pin/slot in shear 2144 may be used to lock the dispensing slot securely. Continuing, the pin and slot may engage to prevent the slot from opening unintentionally, ensuring the at least a pod is dispensed only when intended. As used in this disclosure, a "padlock" is a locking mechanism inspired by or similar to those used in traditional padlocks. In a non-limiting example, the padlock 2148 may include components such as shackle, body, and locking mechanism to secure or release. In an embodiment, the padlock 2148 may involve a miniature padlock mechanism to secure the lid or access panel. Continuing, the user may need to unlock the padlock to access the at least a pod, providing a high level of security. As used in this disclosure, an "in and over button/slider mechanism" is a locking mechanism where a button or slider moves in a specific path, typically involving an in-and-over motion, to lock or unlock components. In an embodiment, the in and over button/slider mechanism 2152 may be used to control the dispensing slot. For example, the user may press the button in and slide it over to open the slot, allowing at least a pod to be dispensed.

With continued reference to FIG. 21, the locking mechanism may include one or more of a sheer lock slider, a flip lock slider 2156, and a padlock 2148. As used in this disclosure, a "sheer lock slider" is a type of locking mechanism that operates by aligning two or more sliding components, which must be moved into a specific position to release the lock. In a non-limiting example, the sheer lock slider may involve a sliding component on the exterior shell of the apparatus that, when aligned with internal components, allows the user to dispense the at least a pod. As used in this disclosure, a "flip lock slider" is a locking mechanism that uses a flipping motion to engage or disengage the lock. In a non-limiting example, the flip lock slider 2156 may be implemented in the apparatus with a small lever or switch that the user flips to unlock the apparatus. Once flipped, the internal components align, allowing the at least a pod to be dispensed. Without limitation, the flip lock slider 2156 may provide an intuitive and user-friendly way to secure the at least a pod, making it easy to operate while still providing robust security. This may be implemented as described and with reference any embodiment as described herein.

Figure 22B:
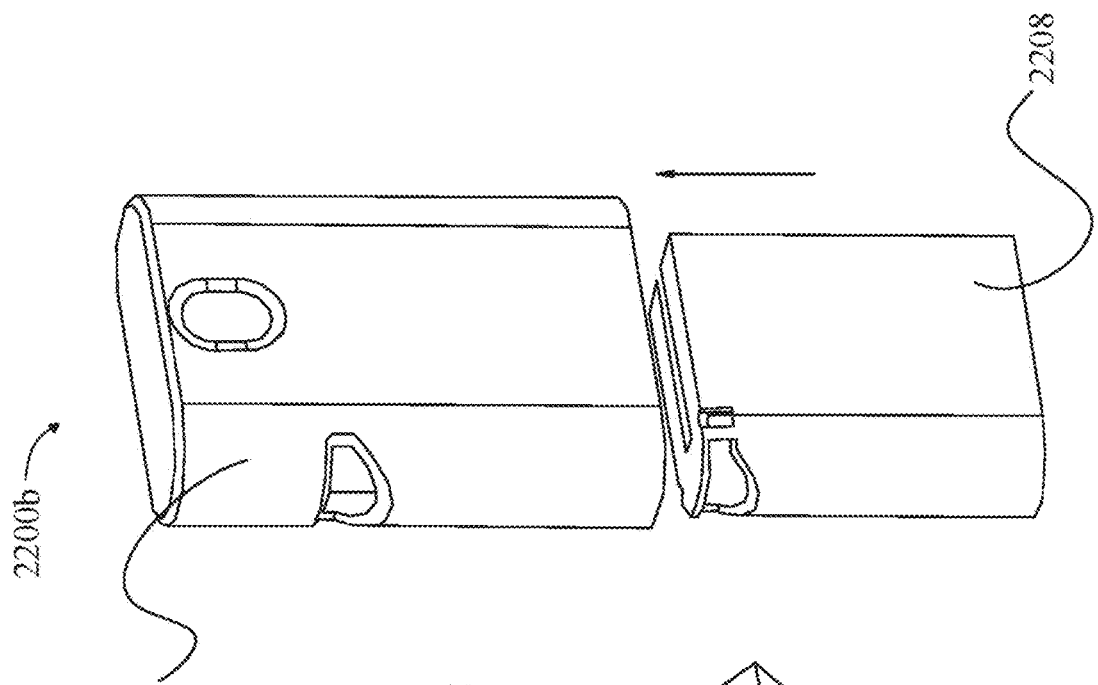
FIG. 22B is an exemplary illustration of a magazine in position to be loaded into an apparatus.
Figure 22A:
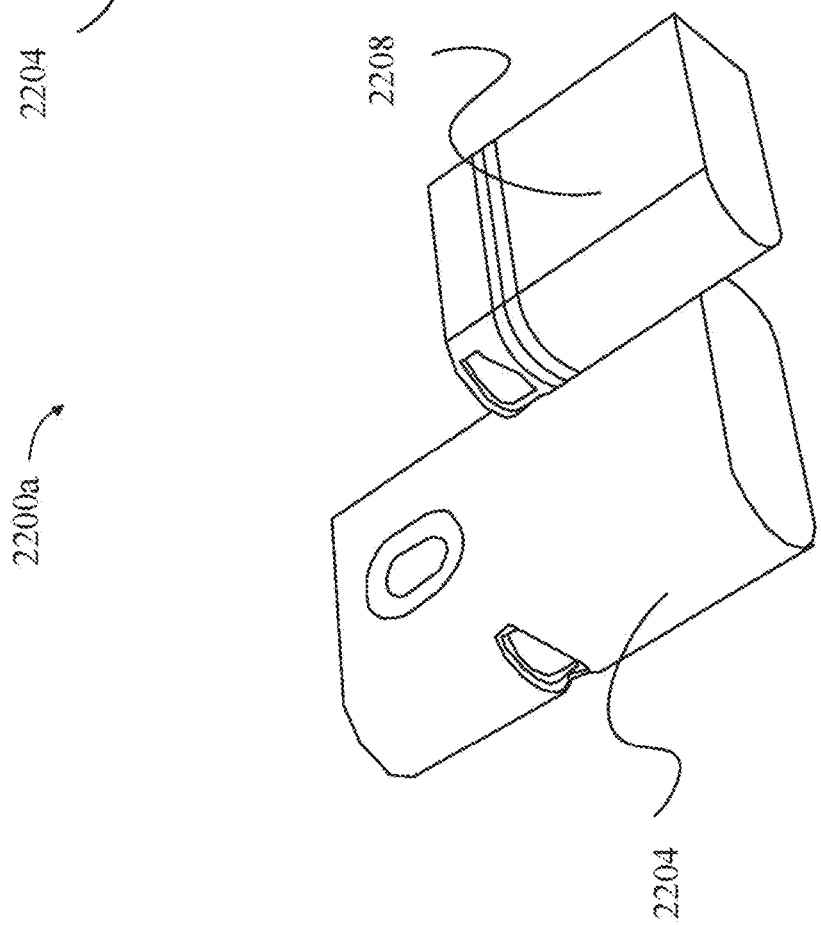
FIG. 22A is an exemplary illustration of a magazine and an apparatus.

Referring now to FIG. 22A, an exemplary illustration 2200a of a magazine and an apparatus. In an embodiment, FIG. 22A may include an apparatus housing 2204 and a magazine 2208. In an embodiment, the apparatus housing 2204 may be designed to securely hold and protect the internal components of the apparatus, including the magazine 2208. In an embodiment, the magazine 2208 may be configured to store a plurality of pods and guide them into a dispensing position using a drive mechanism. In an embodiment, the magazine 2208 may be designed to be removable and replaceable, allowing users to quickly and efficiently reload the apparatus with a new or refilled magazine. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Referring now to FIG. 22B, an exemplary illustration 2200b of a magazine in position to be loaded into an apparatus is shown. In an embodiment, the magazine 2208 may be positioned at the bottom of the apparatus housing 2204, ready to be inserted. In an embodiment, the bottom-loading design of the apparatus allows for a straightforward and user-friendly reloading process. In an embodiment, the to load the magazine 2208, the user may align the magazine with the opening at the bottom of the apparatus housing 2204. In an embodiment, the magazine 2208 may then be pushed upward into the housing until it clicks into place, ensuring a secure fit. In an embodiment, the design may include alignment guides or tracks within the housing to facilitate smooth and accurate insertion of the magazine. In an embodiment, once the magazine 2208 is securely loaded into the apparatus housing 2204, the drive mechanism may engage with the magazine 2208 to advance the at least a pod into the dispensing position. In an embodiment, the bottom-loading design not only simplifies the reloading process but also helps maintain the compact and ergonomic form factor of the apparatus. In an embodiment, the design ensures that the magazine 2208 is held securely in place during operation, preventing any accidental dislodging or misalignment of the at least a pod. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 23:
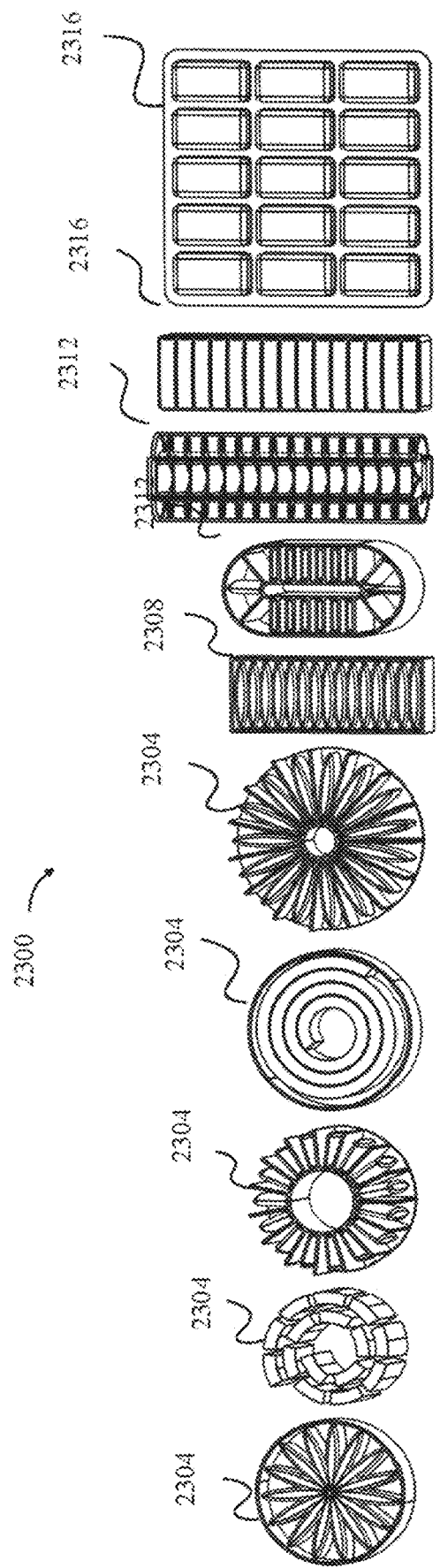
FIG. 23 is an exemplary illustration of a plurality of magazines featuring various designs.

Referring now to FIG. 23, an exemplary illustration 2300 of a plurality of magazines featuring various designs. In an embodiment, the illustration 2300 includes a circular apparatus 2304, a spring loaded apparatus 2308, a conveyor apparatus 2312, and other apparatus 2316. In an embodiment, the circular apparatus 2304 may feature a design that allows for the organization and alignment of multiple pods in a radial pattern. In an embodiment, the circular apparatus 2304 may facilitate efficient storage and dispensing of the at least a pod, ensuring that each pod is securely held in place and easily accessible for dispensing. In an embodiment, the spring loaded apparatus 2308 may include a mechanism that uses a spring to advance the pods to the dispensing position. In an embodiment, the spring loaded apparatus 2308 may ensure that the pods are held securely and are properly aligned for dispensing, providing a smooth and reliable operation. In an embodiment, the conveyor apparatus 2312 may incorporate a conveyor belt mechanism to move the pods to the dispensing position. In an embodiment, the conveyor apparatus 2312 may ensure that the pods are advanced smoothly and reliably, providing a consistent and controlled dispensing process. In an embodiment, the other apparatus 2316 may include various designs that may feature different mechanisms for storing and dispensing the pods. In an embodiment, the other apparatus designs may ensure that the pods are held securely and are easily accessible for dispensing, providing flexibility in the dispensing process. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 24:
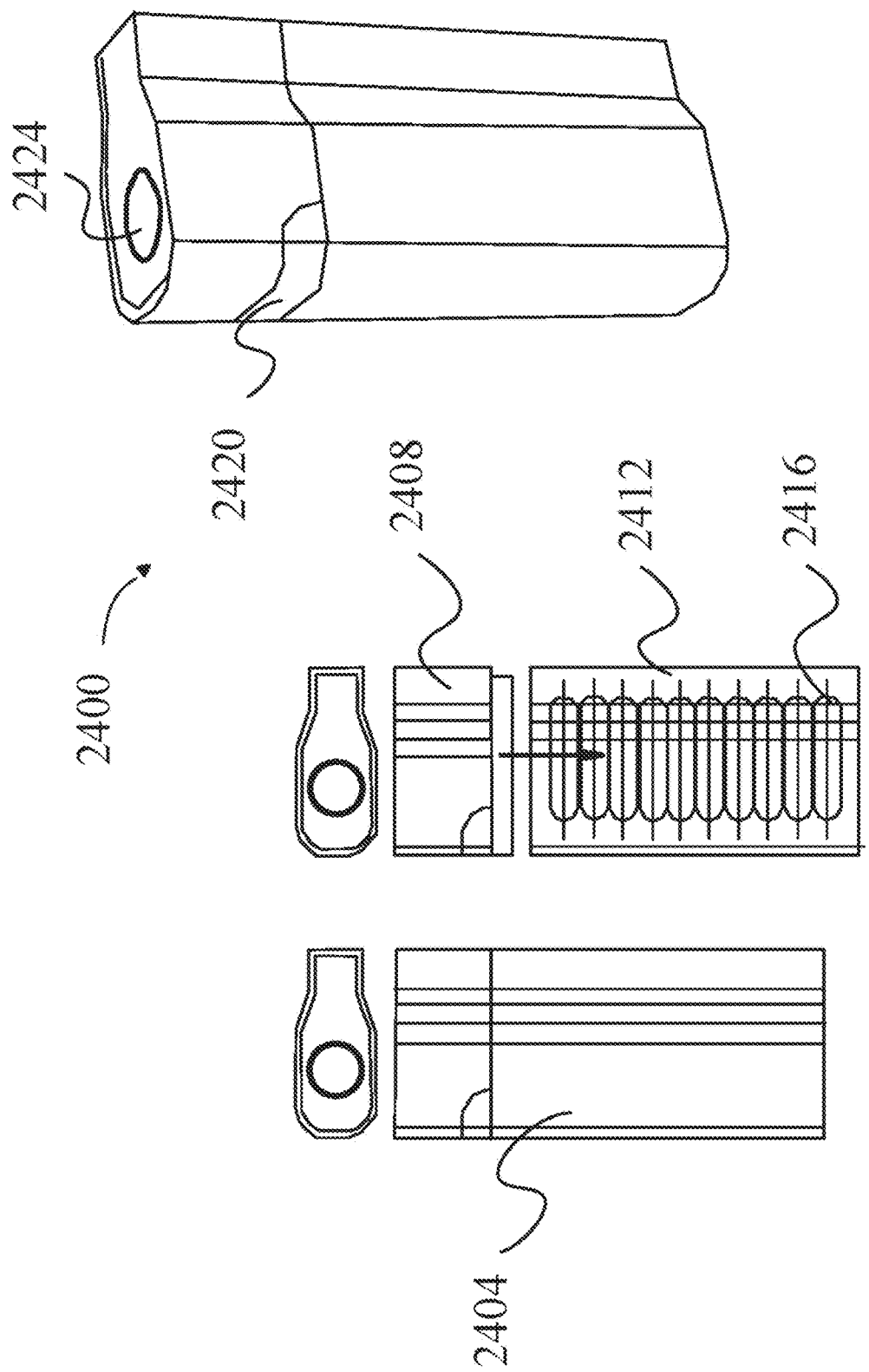
FIG. 24 is an exemplary illustration of a top view and a side view of a magazine coupled with an apparatus.

Referring now to FIG. 24, an exemplary illustration 2400 of a top view and a side view of a magazine coupled with an apparatus. In an embodiment, the illustration 2400 may include an apparatus housing 2404, an apparatus housing cover 2408, a refill cartridge 2412, at least a pod 2416, an aperture 2420, and a finger scanner 2424. In an embodiment, the apparatus housing 2404 may serve as the main body of the apparatus, providing structural support and protection for the internal components. In an embodiment, the apparatus housing 2404 may be designed to securely hold the refill cartridge 2412 and the at least a pod 2416 within the structure. In an embodiment, the apparatus housing cover 2408 may couple to the apparatus housing 2404. In an embodiment, the apparatus housing cover 2408 may be designed to be removable, allowing access to the refill cartridge 2412 for replacement or refilling. In an embodiment, the apparatus housing cover 2408 may ensure that the internal components are protected from external elements when closed. In an embodiment, the refill cartridge 2412 may be located within the apparatus housing 2404 and may be configured to store a plurality of at least a pod 2416. In an embodiment, the refill cartridge 2412 may guide the at least a pod 2416 into the dispensing position, ensuring a smooth and controlled dispensing process. In an embodiment, the at least a pod 2416 may store within the refill cartridge 2412. In an embodiment, the at least a pod 2416 may be designed for oral nicotine delivery and is dispensed through the aperture 2420 upon successful authentication by the user. In an embodiment, the aperture 2420 may be located on the exterior of the apparatus housing 2404. In an embodiment, the aperture 2420 may allow the at least a pod 2416 to move from within the apparatus housing 2404 to the exterior environment, facilitating the dispensing process. In an embodiment, the finger scanner 2424 may be coupled to the apparatus housing 2404 and may be configured to authenticate the user. In an embodiment, the finger scanner 2424 may ensure that only authorized users can access and dispense the at least a pod 2416, enhancing the security and safety of the apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 25C:
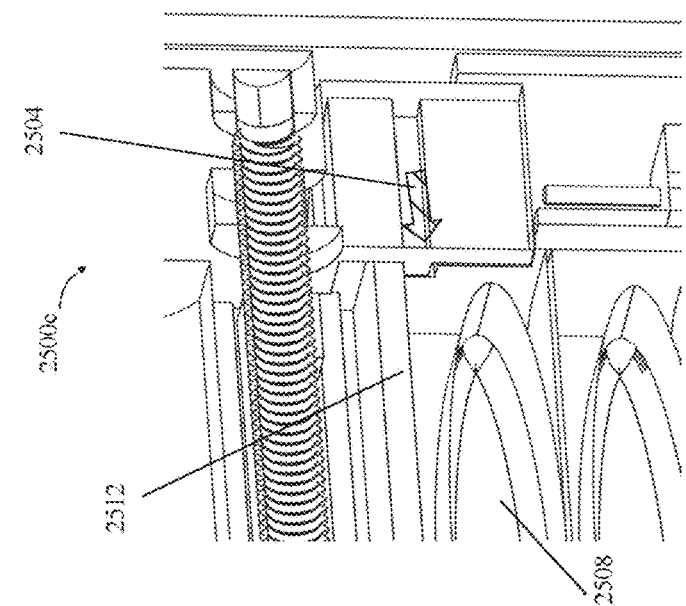
FIG. 25C is an exemplary illustration of an apparatus in a second position locking in a magazine.
Figure 25B:
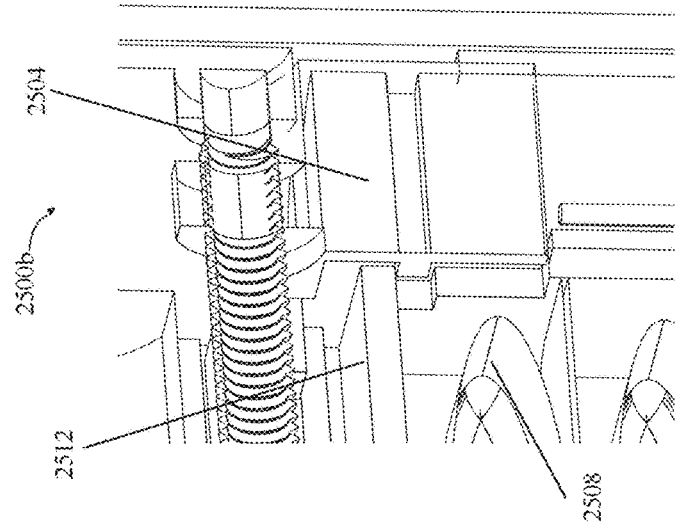
FIG. 25B is an exemplary illustration of an apparatus in a first position locking in a magazine.
Figure 25A:
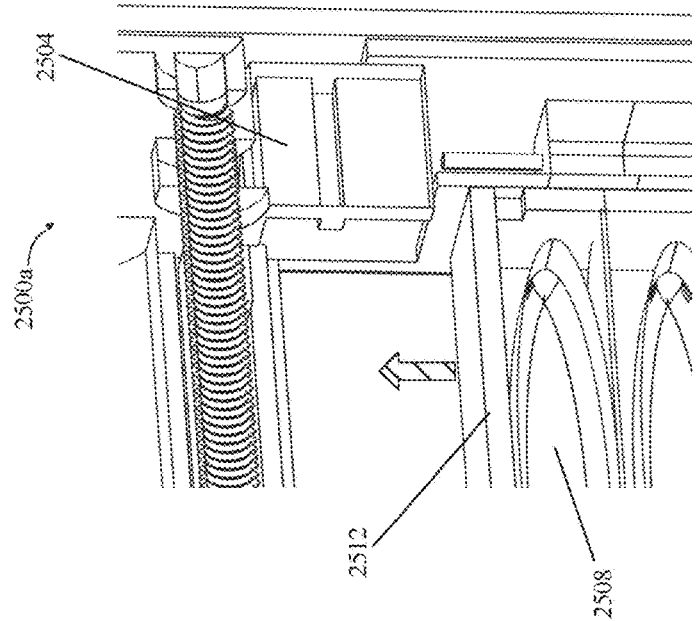
FIG. 25A is an exemplary illustration of an apparatus locking in a magazine.

Referring now to FIG. 25A, an exemplary illustration 2500a of an apparatus locking in a magazine. In an embodiment, the illustration 2500a may include a slider 2504, at least a pod 2508, and a magazine 2512. In an embodiment, the slider 2504 may be coupled to the apparatus and may be configured to move linearly to lock or unlock the magazine. In an embodiment, the slider 2504 may interact with the internal components of the apparatus to ensure secure locking and precise alignment of the magazine. In an embodiment, the at least a pod 2508 may be positioned within the magazine and is guided by the slider 2504 into the dispensing position. In an embodiment, the at least a pod 2508 is securely held in place until the slider 2504 moves to release the at least a pod 2508 for dispensing. In an embodiment, the apparatus may engage with the magazine when the magazine is sensed by the apparatus or when the user indicates that the magazine is fully inserted. In an embodiment, the slider 2504, which may be green, may translate when the motor turns the lead screw. In an embodiment, the slider 2504 may move into a groove in the magazine and retain it on a ledge. In an embodiment, during each dispensing cycle, the slider 2504 may return to a locked location, referred to as position B, and prepare for the next dispense. In an embodiment, when the magazine is empty, as determined by a sensing mechanism, or when the user decides to eject the magazine, the user may interact with the Fingerprint scanner and complete a specific button press sequence. In an embodiment, the interaction may move the slider 2504 back to position A, allowing the magazine to fall freely from the apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Referring now to FIG. 25B, an exemplary illustration 2500b of an apparatus in a first position locking in a magazine. In an embodiment, the illustration 2500a may include a slider 2504, at least a pod 2508, and a magazine 2512.

Referring now to FIG. 25C, an exemplary illustration 2500c of an apparatus in a second position locking in a magazine. In an embodiment, the illustration 2500c may include a slider 2504, at least a pod 2508, and a magazine 2512.

Referring now to FIG. 25D, an exemplary illustration 2500d of a magazine door locked into a stored state. In an embodiment, the illustration 2500d may include a magazine 2512, a dispenser frame 2516, a metal snap arm 2520, and a magazine door 2524.

Referring now to FIG. 25E, an exemplary illustration 2500e of an interaction between a metal snap arm and a magnet as a magazine is loaded into the dispenser. In an embodiment, the illustration 2500e may include a magazine 2512, a dispenser frame 2516, a metal snap arm 2520, and a magazine door 2524. In an embodiment as the magazine 2512 is loaded into the dispenser, the metal snap arm 2520 passes by a magnet affixed to the inner wall of the housing. In an embodiment, as the metal snap arm 2520 approaches the magnet, it flexes away from the magazine door 2524, clearing the ledge and allowing the magazine door 2524 to translate freely. In an embodiment, although the metal snap arm 2520 is no longer obstructing the magazine door 2524, the magazine door 2524 remains in its stored position due to the tension from the magazine door spring. In an embodiment, in the final millimeters of the magazine's travel, the magazine door 2524 encounters the dispenser frame 2516, securing it while the magazine 2512 completes its transition to the engaged position. In an embodiment, the magazine door 2524 remains open whenever the magazine 2512 is engaged. In an embodiment, a mechanism may be linked to the slider that opens and closes the magazine door 2524 as needed during dispensing, which may be beneficial in minimizing moisture vapor transmission.

Figure 26:
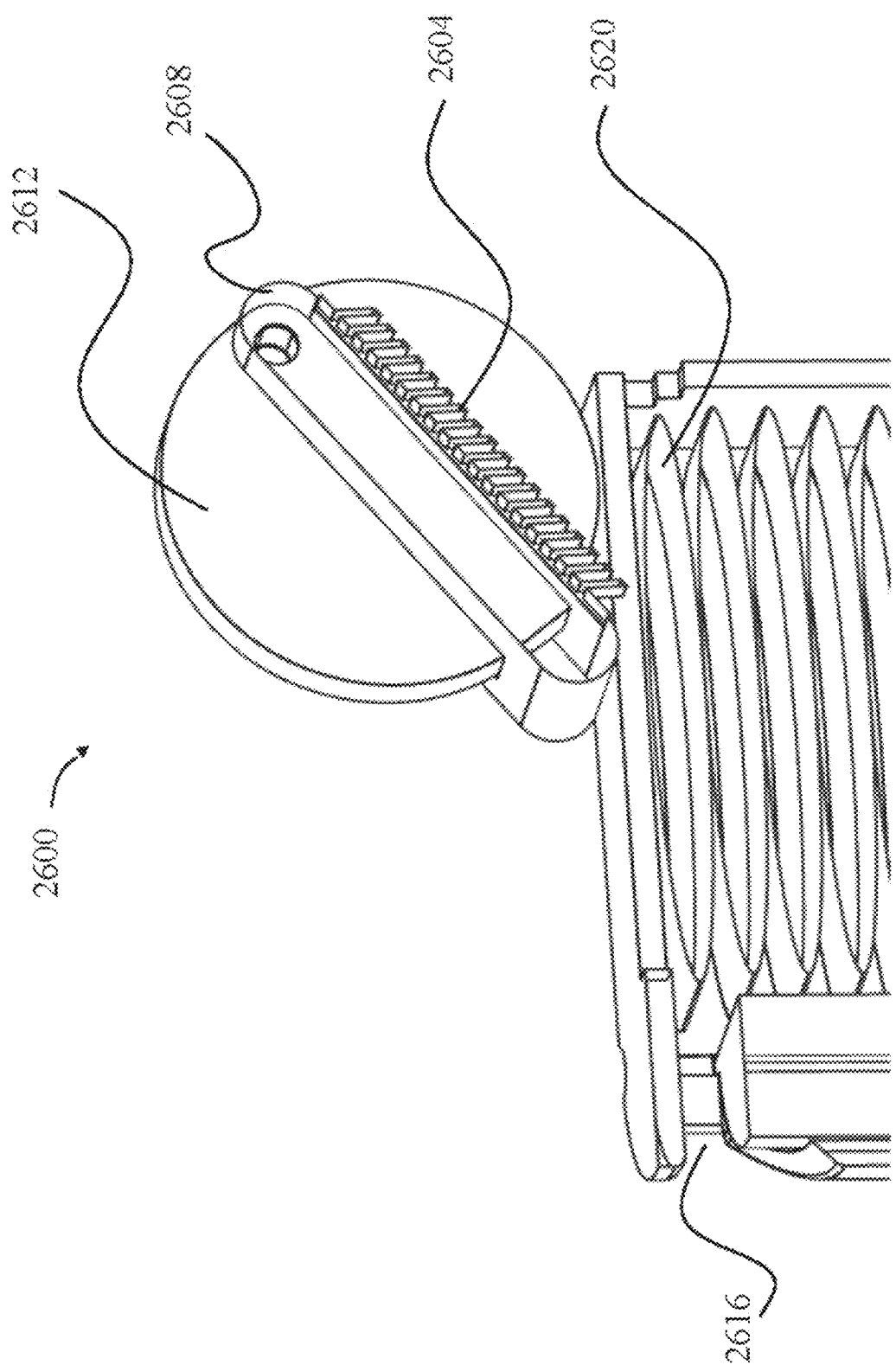
FIG. 26 is an exemplary illustration of a cross section view of a drive wheel apparatus with a linkage.

Referring now to FIG. 26, an exemplary illustration 2600 of a cross section view of a drive wheel apparatus with a linkage. In an embodiment, the illustration 2600 may include a drive wheel 2612, fins 2604, linkage 2608, aperture 2616, and at least a pod 2620. In an embodiment, the drive wheel 2612 may be a component of the apparatus, responsible for the rotational movement that facilitates the dispensing process. In an embodiment, the drive wheel 2612 may interact with other components to ensure the smooth operation of the apparatus. In an embodiment, the fins 2604 may be coupled to the drive wheel 2612. In an embodiment, the fins 2604 may provide structural support and assist in the alignment and movement of the at least a pod 2620 within the apparatus. In an embodiment, the fins 2604 may ensure that the at least a pod 2620 is guided accurately towards the dispensing position. In an embodiment, the linkage 2608 may connect the drive wheel 2612 to other internal mechanisms of the apparatus. In an embodiment, the linkage 2608 may translate the rotational motion of the drive wheel 2612 into linear motion, which is necessary for advancing the at least a pod 2620 towards the aperture 2616. In an embodiment, the aperture 2616 may be located on the exterior of the apparatus. In an embodiment, the aperture 2616 may allow the at least a pod 2620 to move from within the apparatus to the exterior environment, facilitating the dispensing process.

In an embodiment, the aperture 2616 may be designed to ensure that the at least a pod 2620 is dispensed smoothly and accurately. In an embodiment, the at least a pod 2620 may be stored within the apparatus and is guided by the fins 2604 and linkage 2608 towards the aperture 2616. In an embodiment, the at least a pod 2620 may be securely held in place until the drive wheel 2612 and linkage 2608 work together to dispense the at least a pod 2620 through the aperture 2616. In an embodiment, a motor may spin the drive wheel 2612, which may cause the linkage 2608 to pivot from a fixed point on the drive wheel 2612. In an embodiment, the other end of the linkage 2608 may ride along a track in the housing. In an embodiment, the track may ensure this end of the linkage 2608 always moves in a linear motion to dispense the at least a pod 2602. In an embodiment, the end of the linkage 2608 may be attached to the drive wheel 2612 where in the drive wheel 2612 may move in a rotary motion and may therefore have either contact or clearance with the at least a pod 2620. In an embodiment, the fins 2604 of the linkage may first dig into the soft at least a pod 2620 and may advance it. In an embodiment, as the drive wheel 2612 turns, more of the fins 2604 may come into contact with the at least a pod 2620 and may advance it further out of the apparatus. In an embodiment, as the drive wheel 2612 continues to rotate, the at least a pod 2620 may be dispensed, and the fins 2604 may then lose contact with the at least a pod 2620 as the drive wheel 2612 returns to the start position. In an embodiment, the rotary motion may ensure the next at least a pod 26020 in the magazine is not affected by contact in the reverse direction. In an embodiment, the drive wheel 2612 may only spin clockwise. In an embodiment, this configuration may be used in the launchpad concept as described herein. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 27:
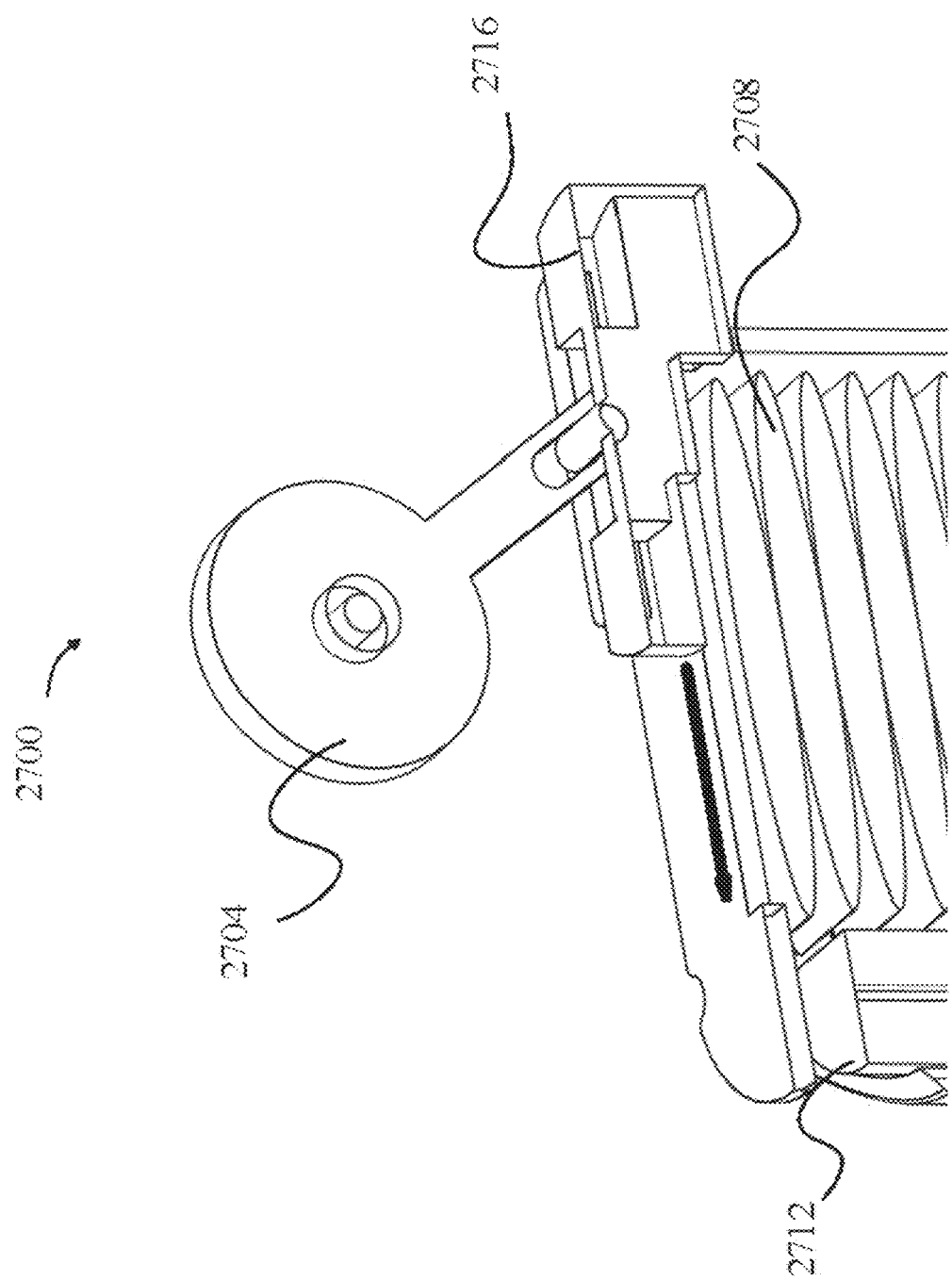
FIG. 27 is an exemplary illustration of a cross section view of a drive wheel apparatus.

Referring now to FIG. 27, an exemplary illustration 2700 of a cross section view of a drive wheel apparatus. In an embodiment, the illustration 2700 may include a drive wheel 2704, at least a pod 2708, an aperture 2712, and a slider 2716. In an embodiment, the drive wheel 2704 interacts with the at least a pod 2708 to facilitate the dispensing process through the aperture 2712. In an embodiment, the drive wheel 2704 may be a component responsible for the rotational movement that aids in the dispensing of the at least a pod 2708. In an embodiment, the drive wheel 2704 may be designed to interact with other components to ensure the smooth operation of the apparatus. In an embodiment, the at least a pod 2708 may be positioned within the apparatus and is guided by the drive wheel 2704 towards the aperture 2712. In an embodiment, the at least a pod 2708 may be securely held in place until the drive wheel 2704 advances the at least a pod 2708 to the dispensing position. In an embodiment, the aperture 2712 may be located on the exterior of the apparatus. In an embodiment, the aperture 2712 may allow the at least a pod 2708 to move from within the apparatus to the exterior environment, facilitating the dispensing process. In an embodiment, the aperture 2712 may be designed to ensure that the at least a pod 2708 is dispensed smoothly and accurately. In an embodiment, the slider 2716 may be coupled to the apparatus and is configured to move linearly to assist in the dispensing process. In an embodiment, the slider 2716 may interact with the drive wheel 2704 and the at least a pod 2708 to ensure precise alignment and secure dispensing of the at least a pod 2708. In an embodiment, the extended arm off the drive wheel 2704 may translate the slider 2716 backward and forward as a motor may spin the drive wheel 2704 clockwise and counterclockwise. In an embodiment, this may create a rotary to linear motion mechanism. In an embodiment, the slider 2716 may be configured so that it does not extend too far, allowing the next at least a pod 2708 in the magazine to position itself behind it. In an embodiment, the slider 2716 motion may end right in the middle of the at least a pod 2708 stack. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 28:
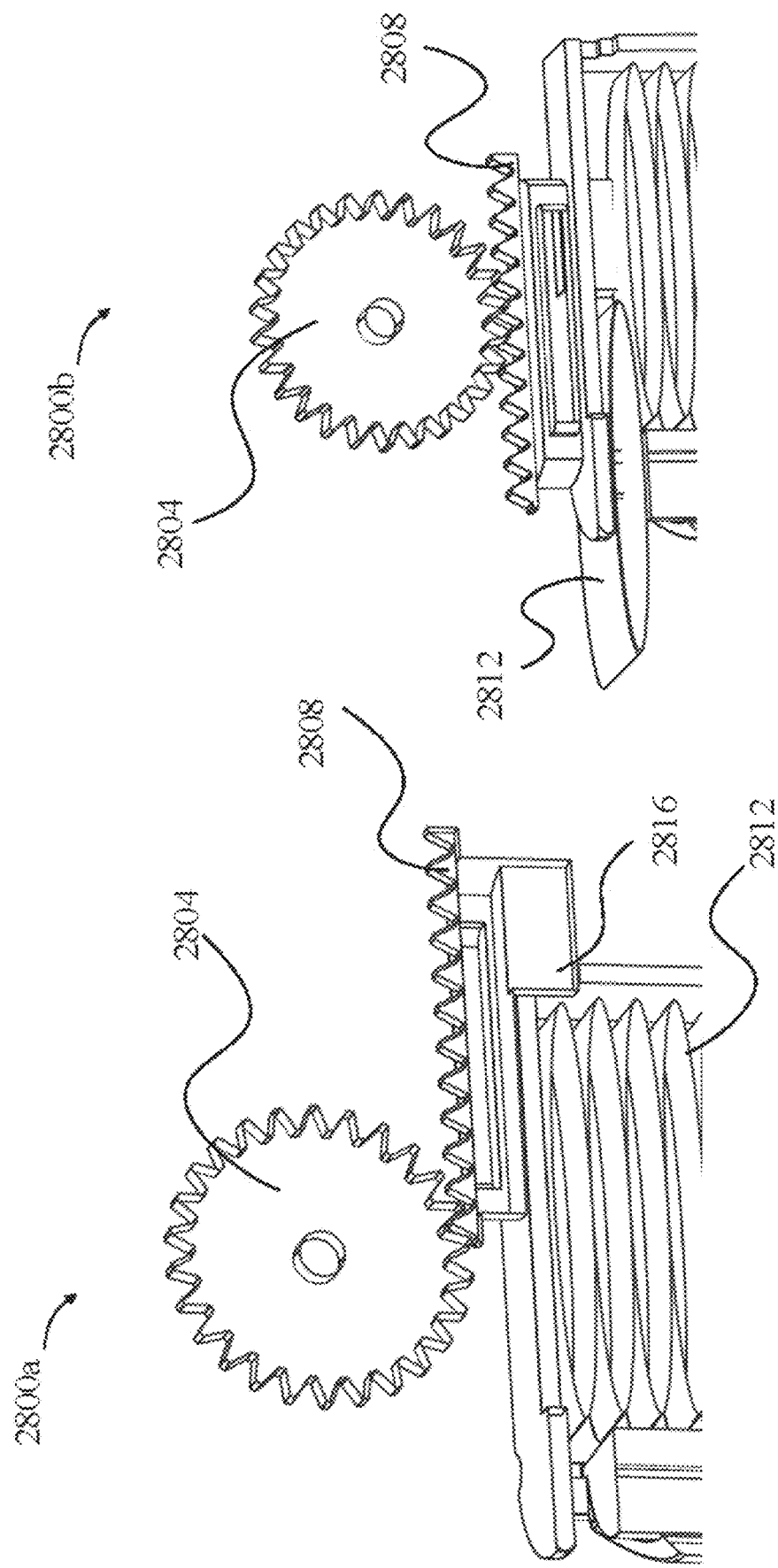
FIG. 28A is an exemplary illustration of a cross section view of a geared drive wheel apparatus.
FIG. 28B is an exemplary illustration of a cross section view of a geared drive wheel apparatus dispensing at least a pod.

Referring now to FIG. 28A, an exemplary illustration 2800a of a cross section view of a geared drive wheel apparatus. FIG. 28B, an exemplary illustration 2800b of a cross section view of a geared drive wheel apparatus dispensing at least a pod. In an embodiment, FIG. 28A-B the illustration 2800a-b may include a geared wheel drive 2804, a geared rack 2808, at least a pod 2812, and a slider 2816. In an embodiment, the geared wheel drive 2804 may interact with the geared rack 2808 to facilitate the movement and dispensing of the at least a pod 2812. In an embodiment, the geared wheel drive 2804 may be a component responsible for the rotational movement that drives the dispensing mechanism. In an embodiment, the geared wheel drive 2804 may engage with the geared rack 2808 to convert rotational motion into linear motion, advancing the at least a pod 2812 towards the dispensing position. In an embodiment, the geared rack 2808 may be coupled to the geared wheel drive 2804 and translates the rotational motion of the geared wheel drive 2804 into linear motion. In an embodiment, this linear motion may move the at least a pod 2812 into the correct position for dispensing. In an embodiment, the at least a pod 2812 may be stored within the apparatus and may be guided by the geared rack 2808 towards the dispensing position. In an embodiment, the at least a pod 2812 is securely held in place until the geared wheel drive 2804 and geared rack 2808 work together to advance the at least a pod 2812 for dispensing. In an embodiment, the slider 2816 may be a component that assists in the precise alignment and secure dispensing of the at least a pod 2812. In an embodiment, the slider 2816 ensures that the at least a pod 2812 is correctly positioned and moves smoothly through the dispensing process. In an embodiment, the motor may turn the geared Drive Wheel, which may, in turn, act upon the geared rack 2808. In an embodiment, the slider 2816 may translate and advance the at least a pod 2812. In an embodiment, the motor may turn clockwise to advance the slider 2816 and counterclockwise to retract the slider 2816. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 29:
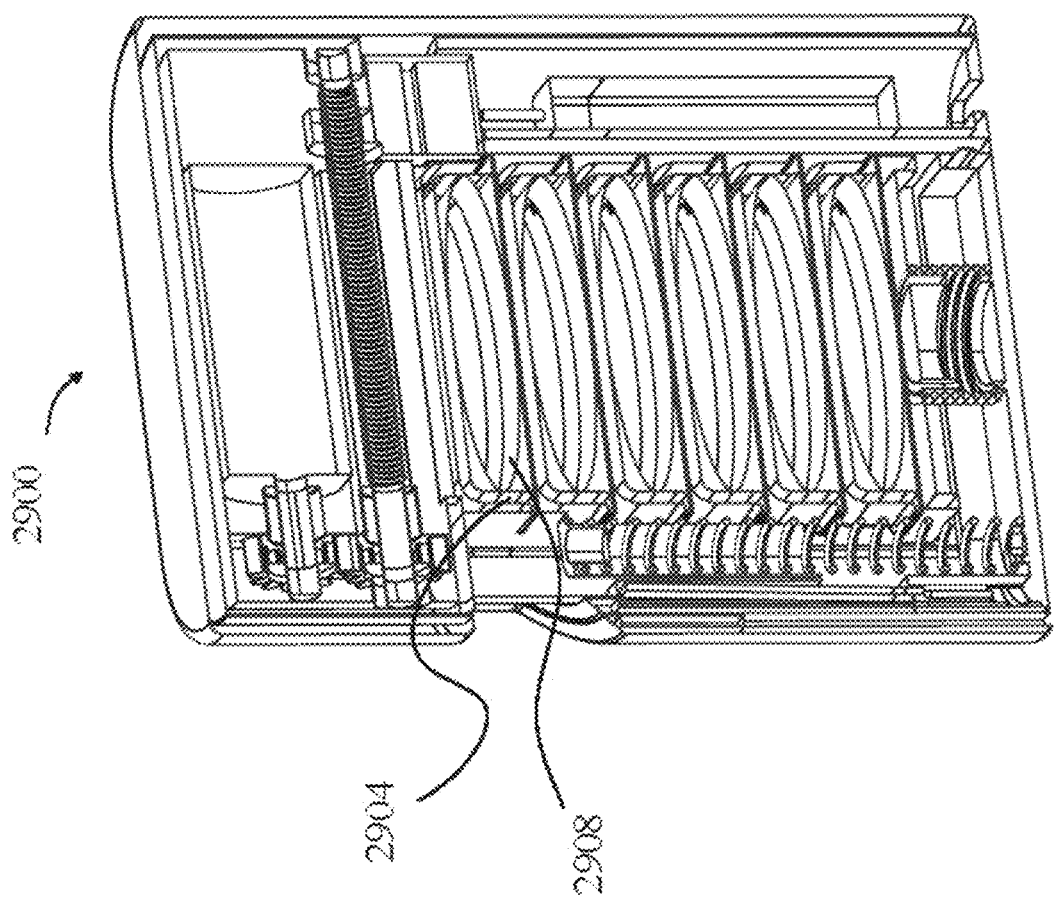
FIG. 29 is an exemplary illustration of a cross section view of a launchpad concept for an apparatus with a plurality of containerized pods.

Referring now to FIG. 29, an exemplary illustration 2900 of a cross section view of a launchpad concept for an apparatus with a plurality of containerized pods. In an embodiment, the illustration 2900 may include at least a container 2904 and at least a pod 2908. In an embodiment, the at least a container 2904 may be designed to house and manage the at least a pod 2908. In an embodiment, the at least a pod 2908 may be positioned within the at least a container 2904. In an embodiment, illustration 2900 may show how the at least a pod is arranged and prepared for deployment from the launchpad apparatus as previously described herein. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 30B:
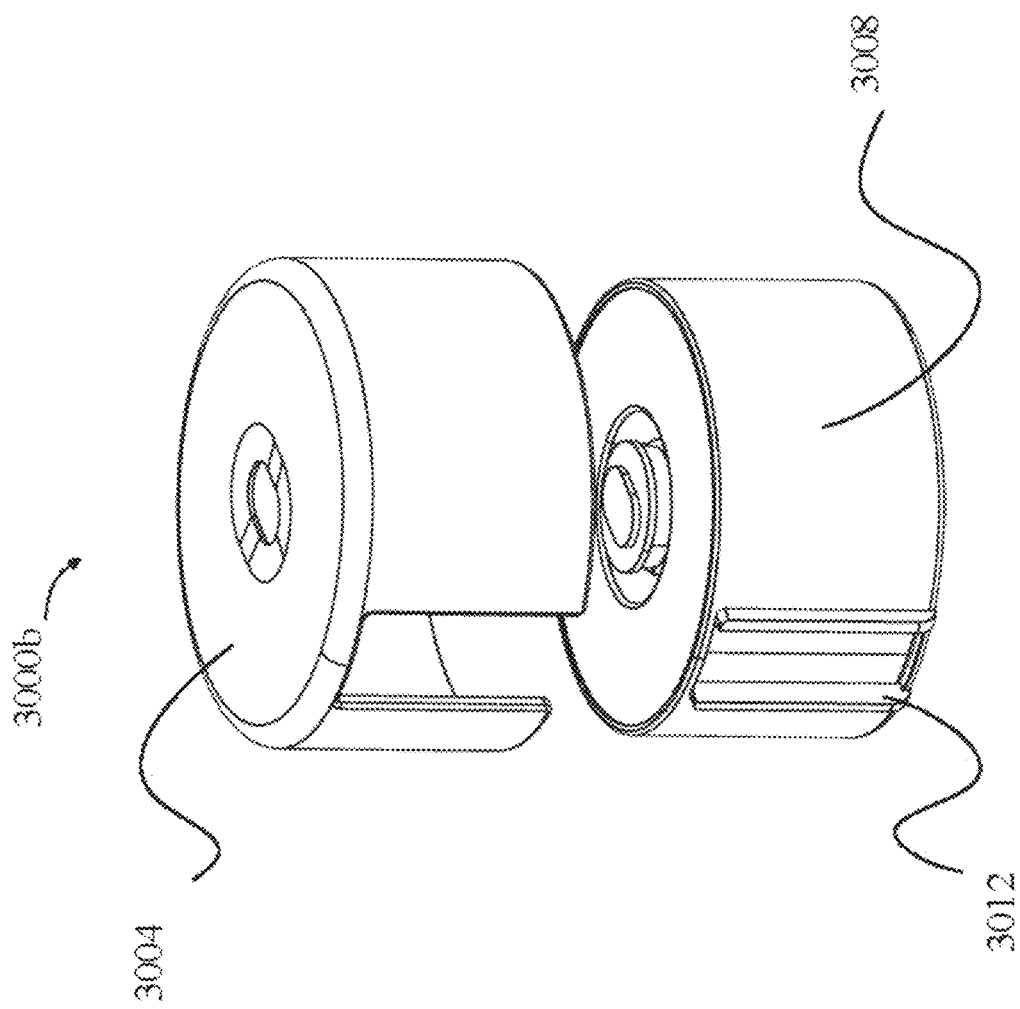
FIG. 30B is an exemplary illustration of an exploded view of a magazine and an apparatus housing.
Figure 30A:
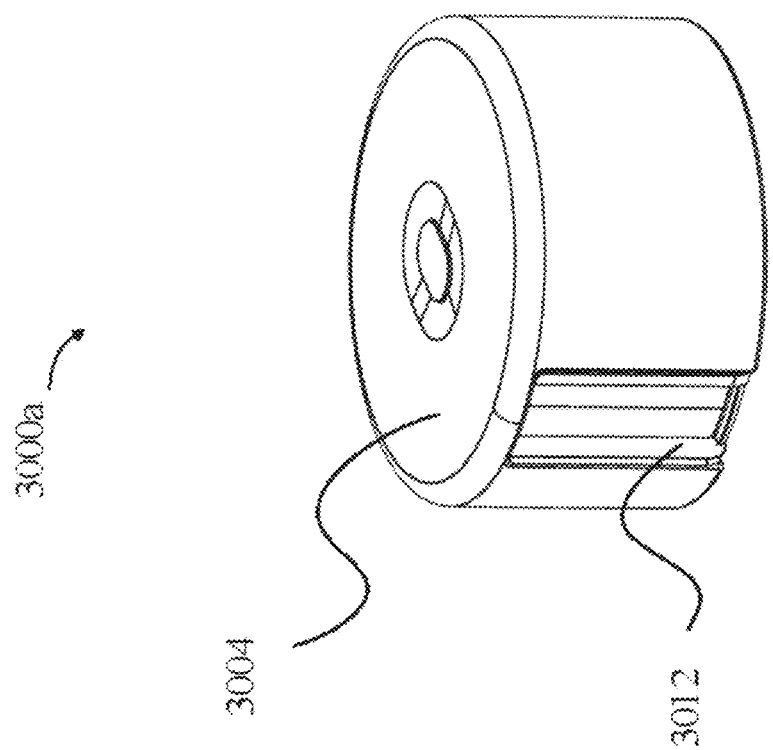
FIG. 30A is an exemplary illustration of an isometric view of a magazine in an apparatus housing.

Referring now to FIG. 30A, an exemplary illustration 3000*a* of an isometric view of a magazine in an apparatus housing. FIG. 30B is an exemplary illustration 3000*b* of an exploded view of a magazine and an apparatus housing. In an embodiment, FIG. 30A-B may include an apparatus housing 3004, a magazine 3008, and an alignment feature 3012. In an embodiment, the alignment feature 3012 may ensure proper positioning and secure attachment of the magazine 3008 within the apparatus housing 3004. In an embodiment, the apparatus housing 3004 may serve as the main body of the apparatus, providing structural support and protection for the internal components. In an embodiment, the apparatus housing 3004 may be designed to securely hold the magazine 3008 and ensure that the magazine 3008 is properly aligned for dispensing the at least a pod. In an embodiment, the alignment feature 3012 may be integrated into the apparatus housing 3004 to facilitate accurate positioning of the magazine 3008, ensuring smooth and reliable operation. In an embodiment, the magazine 3008 may be configured to store a plurality of pods and guide them into the dispensing position. In an embodiment, the magazine 3008 may interact with the alignment feature 3012 to ensure that the magazine 3008 is securely held in place within the apparatus housing 3004. Continuing, this design may ensure that the magazine 3008 remains stable during operation, preventing any accidental dislodging or misalignment of the at least a pod. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 31B:
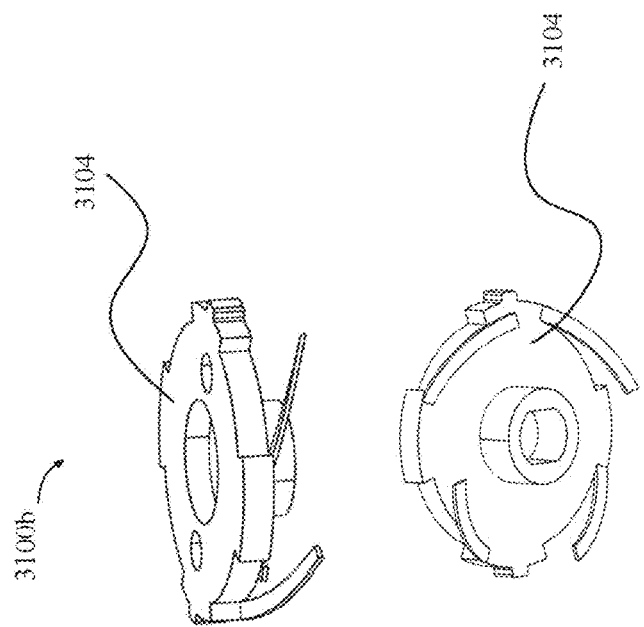
FIG. 31B is an exemplary illustration of an isometric top view of a lock disk and an isometric bottom view of the lock disk.
Figure 31A:
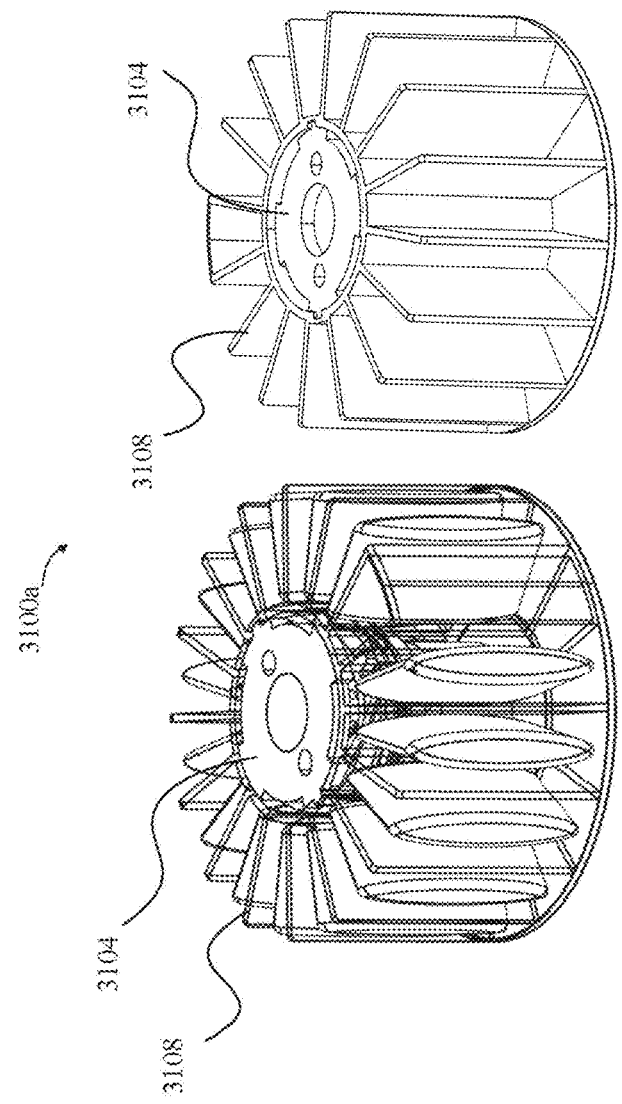
FIG. 31A is an exemplary illustration of an isometric view of a magazine assembly with a lock disk and a plurality of pods and an isometric view of a magazine assembly with a lock disk.

Referring now to FIG. 31A, an exemplary illustration 3100*a* of an isometric view of a magazine assembly with a lock disk and a plurality of pods and an isometric view of a magazine assembly with a lock disk. FIG. 31B is an exemplary illustration 3100*b* of an isometric top view of a lock disk and an isometric bottom view of the lock disk. In an embodiment, FIG. 31A-B may include a lock disk 3104 and a magazine 3108. In an embodiment, the illustration 3100*a* depicts the magazine 3108, which is designed to store and organize a plurality of pods for dispensing. In an embodiment, the magazine 3108 includes compartments or slots to hold individual pods in place and guide them into the dispensing position. In an embodiment, the lock disk 3104 is positioned on top of the magazine 3108, ensuring that the pods are securely held and properly aligned for dispensing. In an embodiment, the illustration 3100*b* provides detailed views of the lock disk 3104. In an embodiment, the top view of the lock disk 3104 shows the structural design. In an embodiment, the lock disk may include features that interact with the magazine 3108 to secure the pods. In an embodiment, the bottom view of the lock disk 3104 highlights the components that engage with the magazine 3108, ensuring that the pods are held securely and are properly aligned for dispensing.

In an embodiment, the lock disk 3104 may be contained within the magazine 3108 assembly between the cover and the basket. In an embodiment, the lock disk 3104 may be biased "up" in this view by the slight flexing of four spring arms. In an embodiment, in the center of the lock disk 3104, there may be a piece of ferrous metal. In an embodiment, the lock disk 3104 may serve two purposes: it may prevent rotation of the cover when the magazine 3108 is not in the apparatus, and it may translate the drive torque from the apparatus to rotate the basket. In an embodiment, in the stored state, the lock disk 3104 may be in contact with two pins in the cover. In an embodiment, during operation, the lock disk 3104 may be pulled "down" axially in this view and may disengage from the cover. In an embodiment, the lock disk 3104 may be keyed to the basket in both the stored and operation states. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 32A:
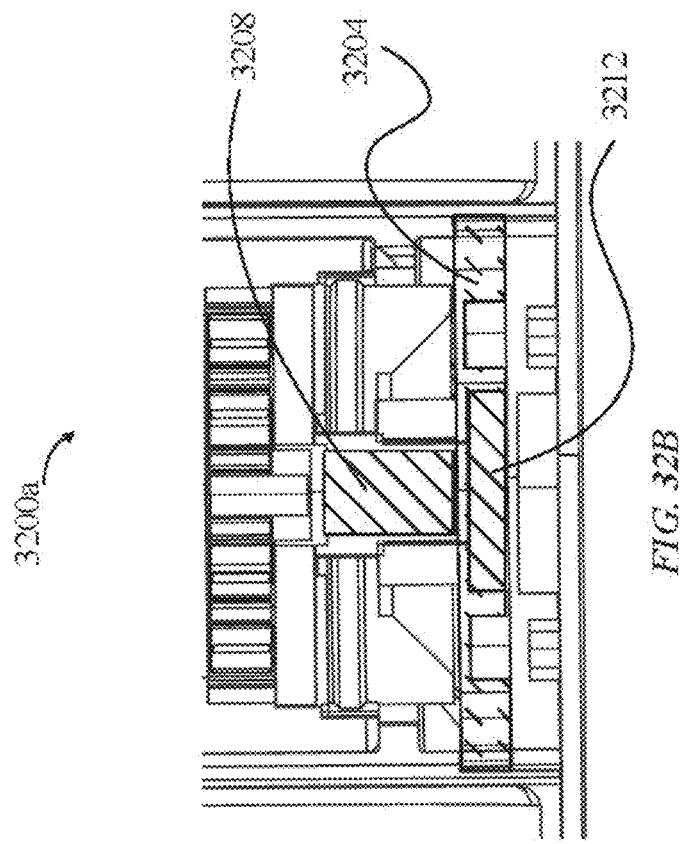
FIG. 32A is an exemplary illustration of a cross section view of a magazine in an apparatus with a magnetic locking mechanism in a locked position.
Figure 32B:
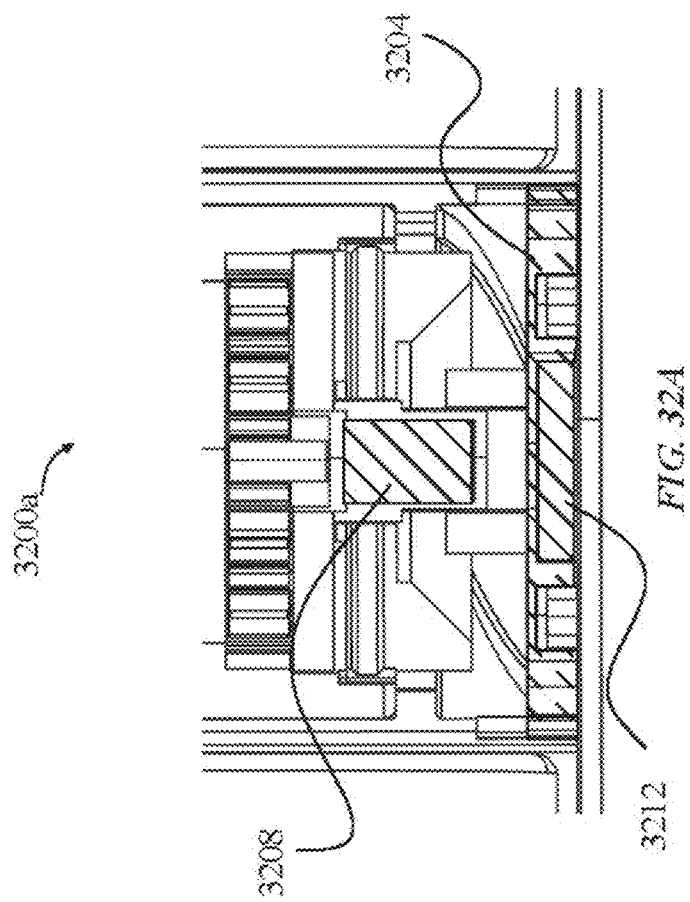
FIG. 32B is an exemplary illustration of a cross section view of a magazine in an apparatus with a magnetic locking mechanism in an unlocked position.

Referring now to FIG. 32A, an exemplary illustration 3200*a* of a cross section view of a magazine in an apparatus with a magnetic locking mechanism in a locked position. FIG. 32B is an exemplary illustration 3200*b* of a cross section view of a magazine in an apparatus with a magnetic locking mechanism in an unlocked position. In an embodiment, FIG. 32A-B includes a lock disk 3204, a cylindrical magnet 3208, and a ferrous component 3212. In an embodiment, the lock disk 3204 may be positioned within the magazine and interact with the cylindrical magnet 3208 and the ferrous component 3212 to control the locking and unlocking mechanism. In an embodiment, the lock disk 3204 may ensure that the pods are securely held and properly aligned for dispensing. In an embodiment, the cylindrical magnet 3208 may be located above the lock disk 3204 and may be responsible for engaging and disengaging the lock disk 3204 by attracting the ferrous component 3212. In an embodiment, the cylindrical magnet 3208 may provide the necessary magnetic force to control the locking mechanism. In an embodiment, the ferrous component 3212 may be situated below the lock disk 3204 and may interact with the cylindrical magnet 3208 to facilitate the locking and unlocking process. In an embodiment, the ferrous component 3212 may ensure that the lock disk 3204 remains in the desired position, either locked or unlocked, depending on the magnetic force applied by the cylindrical magnet 3208. In an embodiment, when the magazine may be inserted into the apparatus, the cylindrical magnet 3208 may pull the ferrous component 3212 towards it to enable movement. In an embodiment, the purpose of the cylindrical magnet 3208 may be to cause a state change in the apparatus without allowing the user to drive the change directly. In an embodiment, this design may add security to the magazine when it is not in use with the apparatus. In an embodiment, the user may be unaware that the magazine could potentially be unlocked manually with a magnet.

In an embodiment, the drive system may incorporate a PCB, a coin cell battery, a motor, a planetary gear system, and a keyed output shaft. Additionally or alternatively, the planetary gear systems may be added along the axis, potentially doubling the current system, to increase the torque generated.

In an embodiment, a radially extending feature on the apparatus may engage with a notch and lip in the basket as a means of retaining the magazine in the apparatus during operation. In an embodiment, the user may insert the magazine, allowing the feature to pass through the notch. In an embodiment, upon a button press or the device sensing the presence of the magazine, the motor may rotate slightly, engaging the radial feature with the lip to prevent axial movement. In this embodiment, ejecting the magazine may require rotating the basket back to its initial position. In other embodiments, a simple snap may be used to retain the magazine. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 32E:
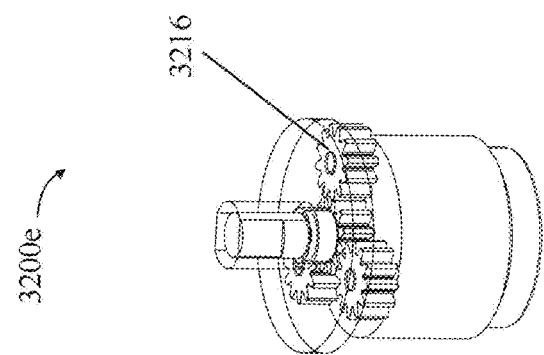
FIG. 32E is an exemplary illustration of an isometric isolated view of a spoke apparatus with a planetary gear system.
Figure 32D:
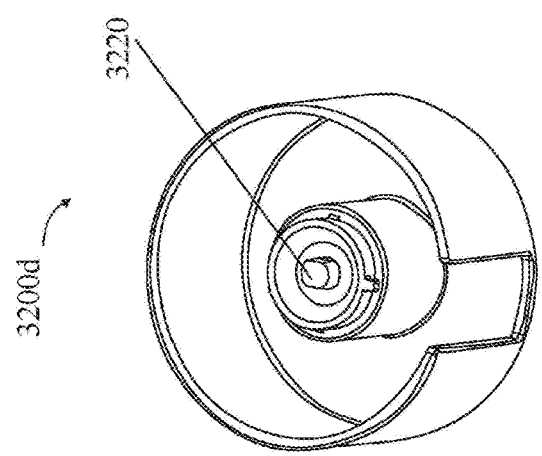
FIG. 32D is an exemplary illustration of an isometric isolated view of a spoke apparatus without the magazine with a keyed output shaft.
Figure 32C:
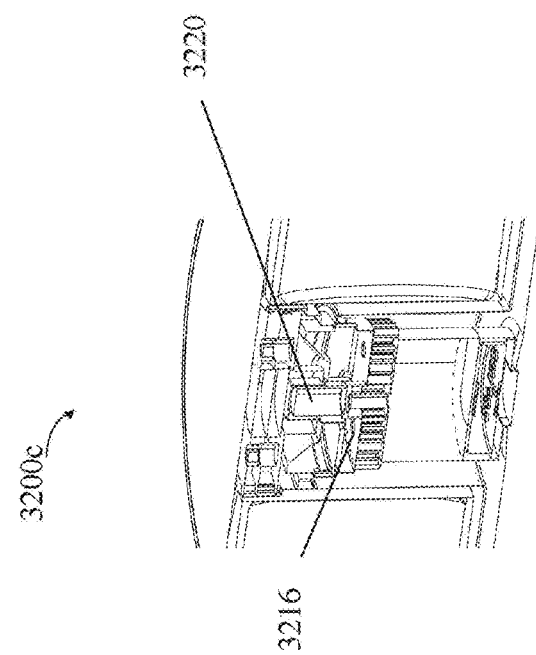
FIG. 32C is an exemplary illustration of an isometric section view of a spoke apparatus with a planetary gear system and a keyed output shaft.

Referring now to FIG. 32C, an exemplary illustration 3200c of an isometric section view of a spoke apparatus with a planetary gear system and a keyed output shaft. In an embodiment, the illustration 3200c includes a PCB, coin cell battery, motor, planetary gear system 3216, and a keyed output shaft 3220. In an embodiment, the illustration 3200c may include additional planetary gear systems to enhance torque generation. In an embodiment, the additional planetary gear systems may be integrated along the same axis by simply doubling the existing configuration.

Referring now to FIG. 32D, an exemplary illustration 3200d of an isometric isolated view of a spoke apparatus without the magazine with a keyed output shaft. In an embodiment, the illustration 3200c includes a keyed output shaft 3220.

Referring now to FIG. 32E, an exemplary illustration 3200e of an isometric isolated view of a spoke apparatus with a planetary gear system. In an embodiment, the illustration 3200c includes a planetary gear system 3216.

Figure 32H:
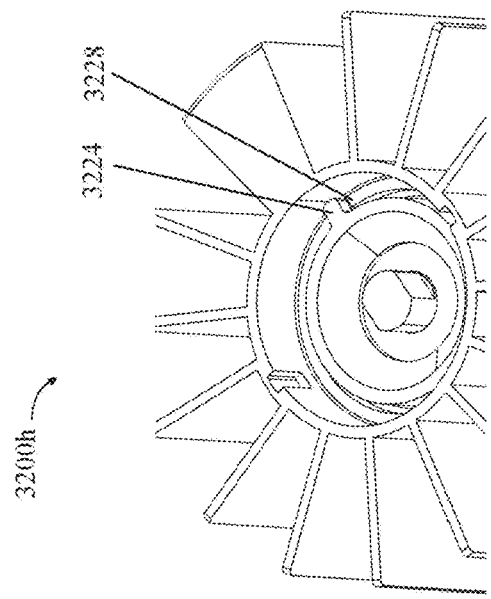
FIG. 32H is an exemplary illustration of an isometric isolated view of a spoke apparatus with a radial feature and a notch feature.
Figure 32G:
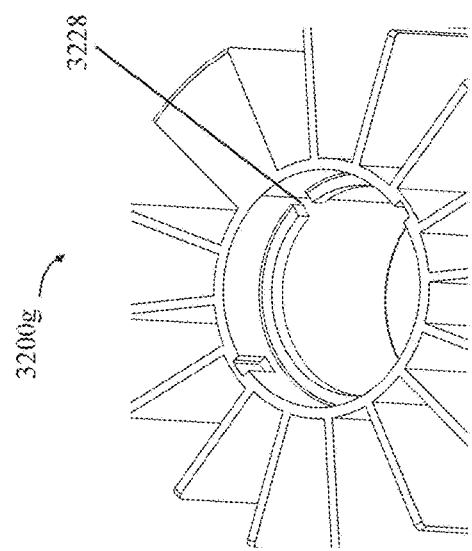
FIG. 32G is an exemplary illustration of an isometric isolated view of a spoke apparatus with a notch feature.
Figure 32F:
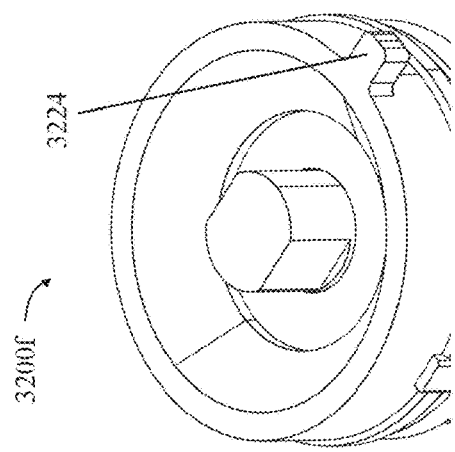
FIG. 32F is an exemplary illustration of an isometric isolated view of a spoke apparatus with a radial feature.

Referring now to FIG. 32F, an exemplary illustration 3200f of an isometric isolated view of a spoke apparatus with a radial feature. In an embodiment, the illustration 3200f includes a radial feature 3224.

Referring now to FIG. 32G, an exemplary illustration 3200g of an isometric isolated view of a spoke apparatus with a notch feature. In an embodiment, the illustration 3200g includes a notch feature 3228.

Referring now to FIG. 32H, an exemplary illustration 3200h of an isometric isolated view of a spoke apparatus with a radial feature and a notch feature. In an embodiment, the illustration 3200h includes a radial feature 3224 engaged with a notch feature 3228. In an embodiment, the radial feature 3224 on the dispenser engages with the notch feature 3228 and lip on the basket to secure the magazine within the dispenser during operation. In an embodiment, when the user inserts the magazine, the radial feature 3224 passes through the notch feature 3228. In an embodiment, upon a button press or automatic detection of the magazine, the motor rotates slightly, aligning the radial feature 3224 with the lip to prevent axial movement. In an embodiment, ejecting the magazine requires rotating the basket back to its initial position. In an embodiment, a simple snap mechanism could be used to retain the magazine.

Figure 33B:
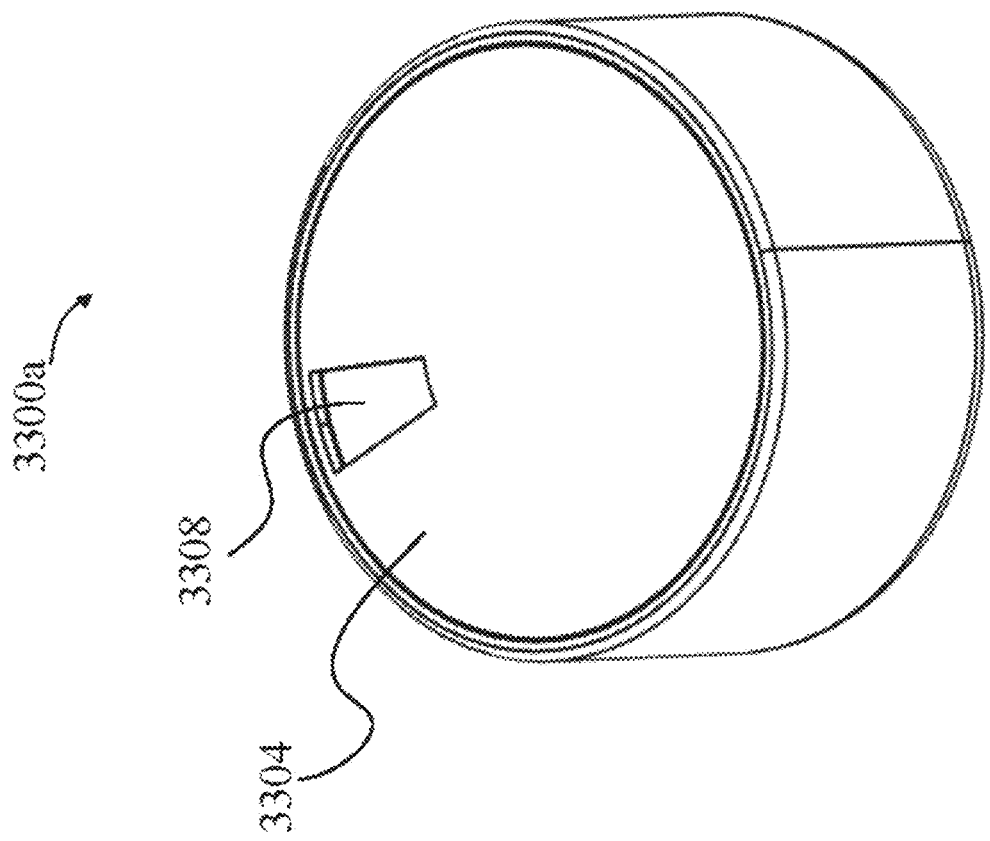
FIG. 33B is an exemplary illustration of an isometric view of a spoke pod apparatus with a bottom dispenser in a closed state.
Figure 33A:
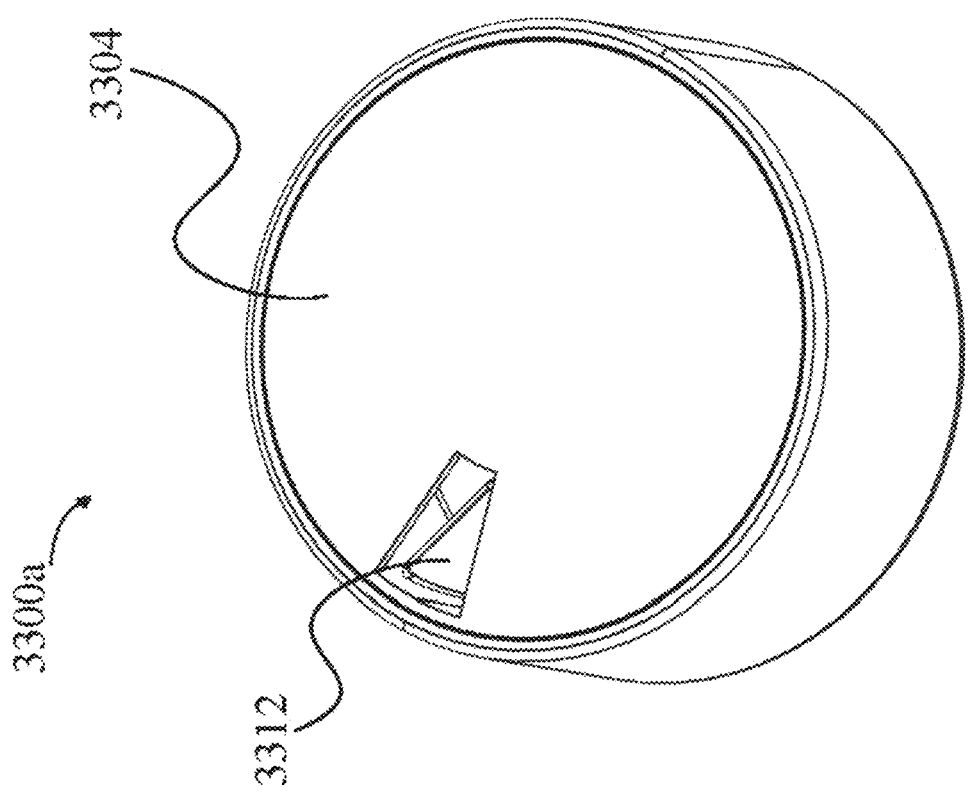
FIG. 33A is an exemplary illustration of an isometric view of a spoke pod apparatus with a bottom dispenser in an open state.

Referring now to FIG. 33A, an exemplary illustration 3300a of an isometric view of a spoke pod apparatus with a bottom dispenser in an open state. FIG. 33B is an exemplary illustration 3300b of an isometric view of a spoke pod apparatus with a bottom dispenser in a closed state. In an embodiment, FIG. 33A-B includes a spoke housing 3304, an aperture 3308, and at least a pod 3312. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 34:
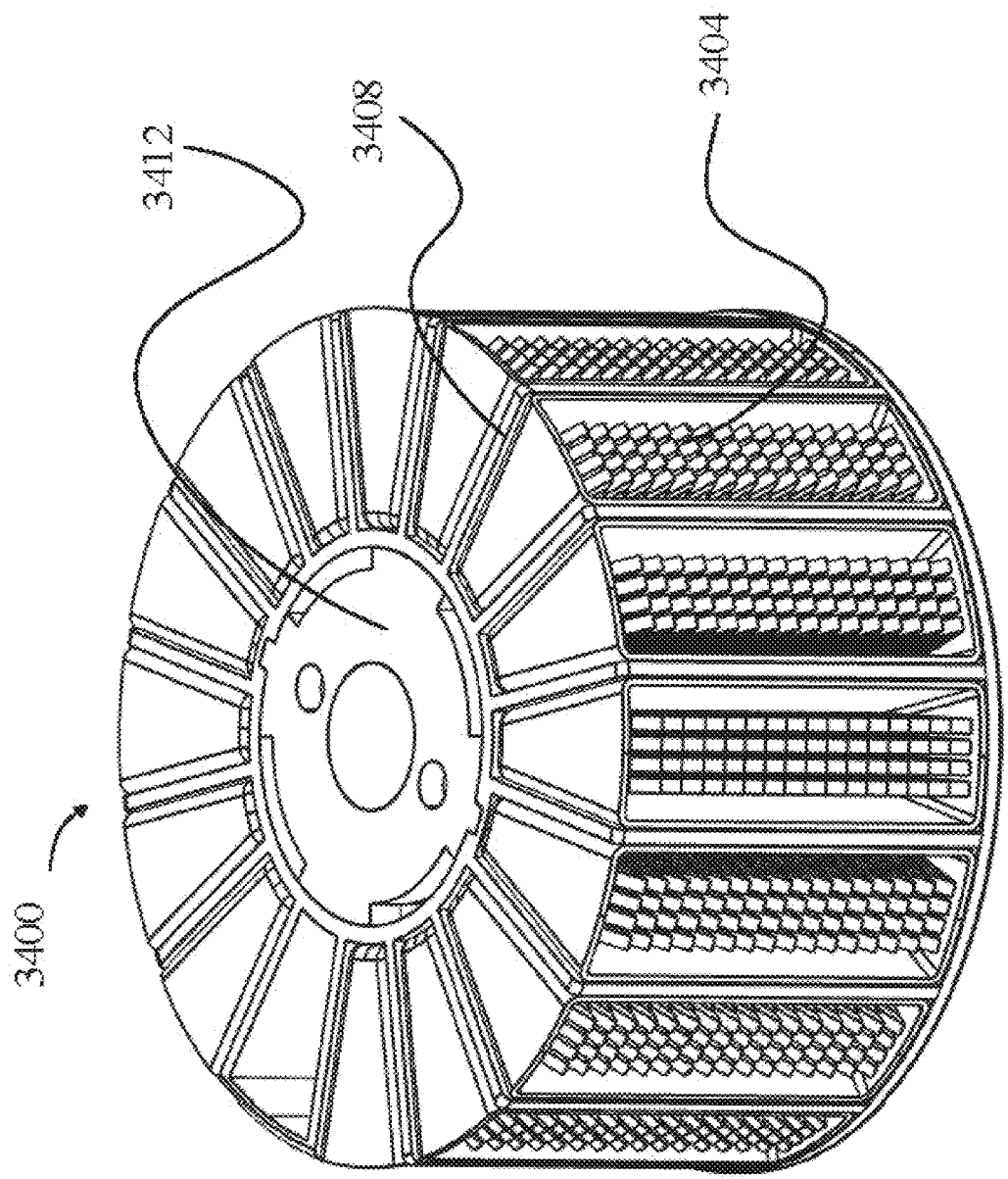
FIG. 34 is an exemplary illustration of an isometric view of a magazine with loose leaf nicotine.

Referring now to FIG. 34, an exemplary illustration 3400 of an isometric view of a magazine with loose leaf nicotine. In an embodiment, FIG. 34 includes loose leaf nicotine 3404, a magazine 3408, and a lock disk 3412. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Referring now to FIG. 35A, an exemplary illustration 3500a of an exploded view of a pod-guidance channel concept for an apparatus with a detent feature. FIG. 35B is an exemplary illustration 3500b of an exploded view of a pod-guidance channel concept for an apparatus with an idler gear and a magnetic locking mechanism. FIG. 35C is an exemplary illustration of a conveyor magazine in a pod-guidance channel concept of an apparatus. In an embodiment, FIG. 35A-C includes a magazine housing 3504, an apparatus housing 3508, a magazine detent feature 3512, an apparatus housing detent feature 3516, and an idler gear 3520, a ferrous component 3524, and a conveyor magazine 3528. In an embodiment, the magazine housing 3504 may insert from the front face of the apparatus housing 3508 and may "click" into place by means of the magazine detent feature 3512 and the apparatus housing detent feature 3516 on each side. In an embodiment, a fingerprint reader may be positioned on the front face of the apparatus housing 3508, with at least a pod being dispensed directly below it. In an embodiment, once the magazine housing 3504 is inserted, it may interface with the apparatus in three ways. First, the magazine detent feature 3512 may snap into place as previously mentioned. Second, a magnet in the apparatus may act upon the ferrous component 3524 in the magazine housing 3504, which may "unlock" the movement of the conveyor magazine 3528. Third, the idler gear 3520 may engage with the conveyor belt drive gear of the conveyor magazine 3528. In an embodiment, the drive system may utilize a fingerprint scanner, PCB, rechargeable battery, gearbox (which may be a planetary gear train in this case), and an output shaft gear. In an embodiment, the rotation of the drive system may translate to an idler gear. In an embodiment, the magazine may include an internal conveyor belt that is flexible around the central profile, similar to a nylon drive belt, and may have ridged external fins that separate the pouches within the magazine housing. In an embodiment, as the main drive gear turns, it may act upon the belt to rotate. In an embodiment, the belt may remain flexible around the drive gear and idler, with the fins following the belt and staying perpendicular to it. In an embodiment, the belt may be shaped to form any continuous profile that is desirable. For example, without limitation, it may take the shape of a triangle, diamond, or teardrop (with one end being a larger circle). Adding at least the pod to this design may simply increase the length of this inner belt profile and expand the design accordingly.

In an embodiment, the magazine may remain "locked" in the stored state and when it is not engaged with the dispenser. In an embodiment, the ferrous component 3524 may engage with the belt and may be keyed to a part of the housing. In an embodiment, the keyed feature and engagement with the belt may prevent any rotation. In an embodiment, the external housing may have two thin snap arms that ensure the disk is biased to the engaged condition during storage. In an embodiment, once the magazine is placed in the dispenser, a magnet in the dispenser may engage with this piece of metal, translating it axially and causing disengagement with the conveyor belt. In an embodiment, once disengaged from the belt, the belt may be free to turn as powered by the drive gear. In an embodiment, if the magazine is removed from the dispenser, the magnet may lose contact, and the snap arms may push the disk back into the locked storage position. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Referring now to FIG. 35D, an exemplary illustration 3500*d* of a disk and one or more snap arms in the locked state and FIG. 35E, an exemplary illustration 3500*e* of a disk and one or more snap arms in the unlocked state. In an embodiment, the magazine remains locked in the stored state and when it is not engaged with the dispenser. In an embodiment, a disk 3536 engages with the belt. In an embodiment, the disk 3536 is made of a ferrous metal composition. In an embodiment, the disk 3536 is keyed to a part of the housing. In an embodiment, the keyed feature and the engagement with the belt prevents any rotation. In an embodiment, the external housing has one or more snap arms 3532. In an embodiment, the external housing includes two snap arms 3532 located opposite from each other. In an embodiment, the one or more snap arms 3532 ensure the disk 3536 is biased to the engaged condition during storage. In an embodiment, once the magazine is placed in the dispenser a magnet in the dispenser engages with the disk 3536 and translates it axially causing disengagement with the conveyor belt. In an embodiment, once the disk 3536 disengages from the belt the belt is free to turn as powered by the drive gear. In an embodiment, if the magazine is removed from the dispenser the magnet will lose contact and the one or more snap arms 3532 will push the disk 3536 back into the locked storage position.

Referring now to FIG. 36A, an exemplary illustration 3600*a* of a launchpad concept for an apparatus. FIG. 36B is an exemplary illustration 3600*b* of a spoke concept for an apparatus. FIG. 36C is an exemplary illustration of a conveyor concept for an apparatus. FIG. 36A-C may illustrate the relative size comparison of each kind of apparatus. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 37:
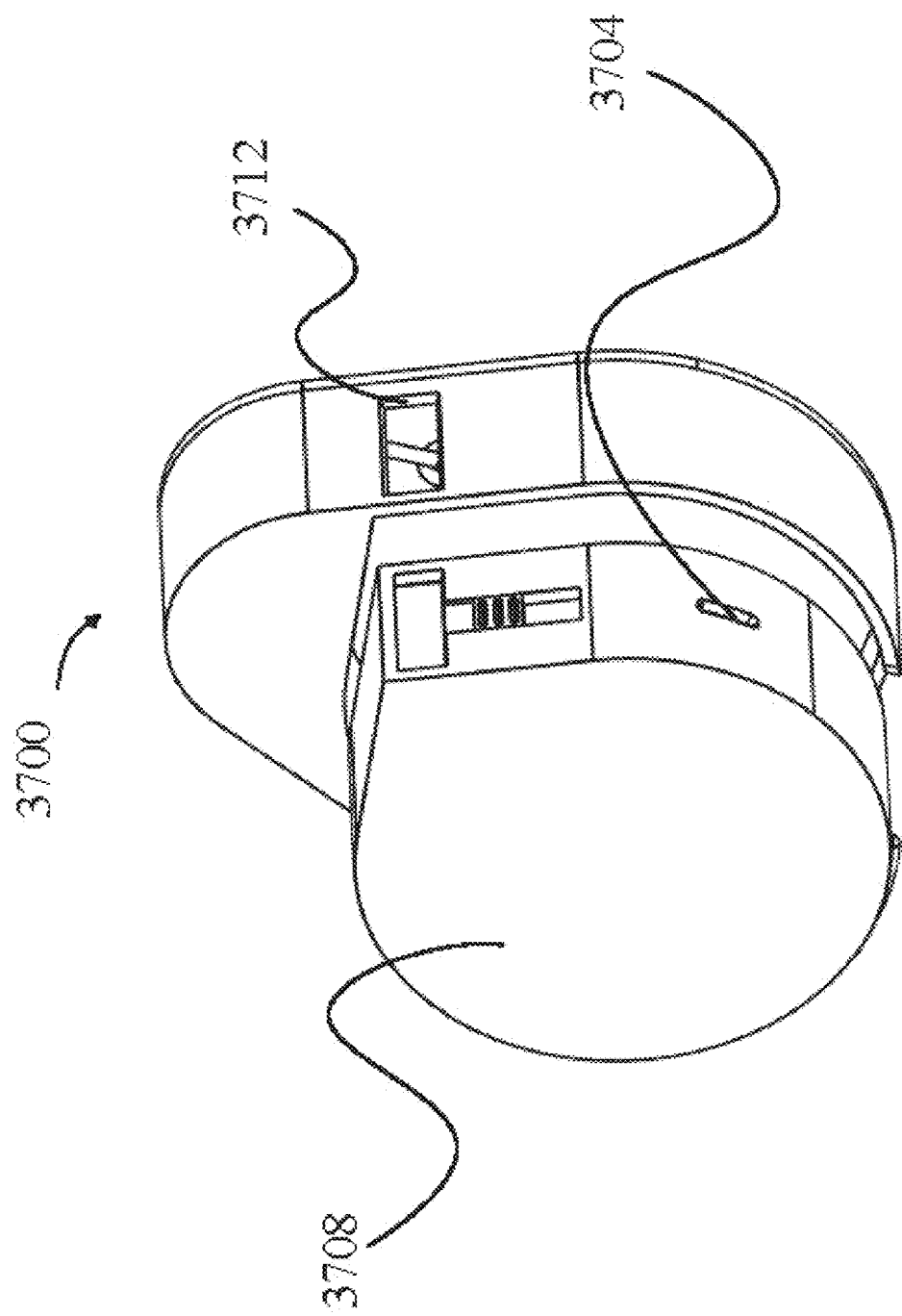
FIG. 37 is an exemplary illustration of a nebula concept for an apparatus with a detent feature.

Referring now to FIG. 37, an exemplary illustration 3700 of a nebula concept for an apparatus with a detent feature. In an embodiment, FIG. 37 includes a detent feature 3704, a magazine housing 3708, and an aperture. In an embodiment, the magazine housing 3708 may insert from the back face of the apparatus and may "click" into place by means of the detent feature 3704 on each side. In an embodiment, a may be dispensed from the aperture 3712 on the side. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 38B:
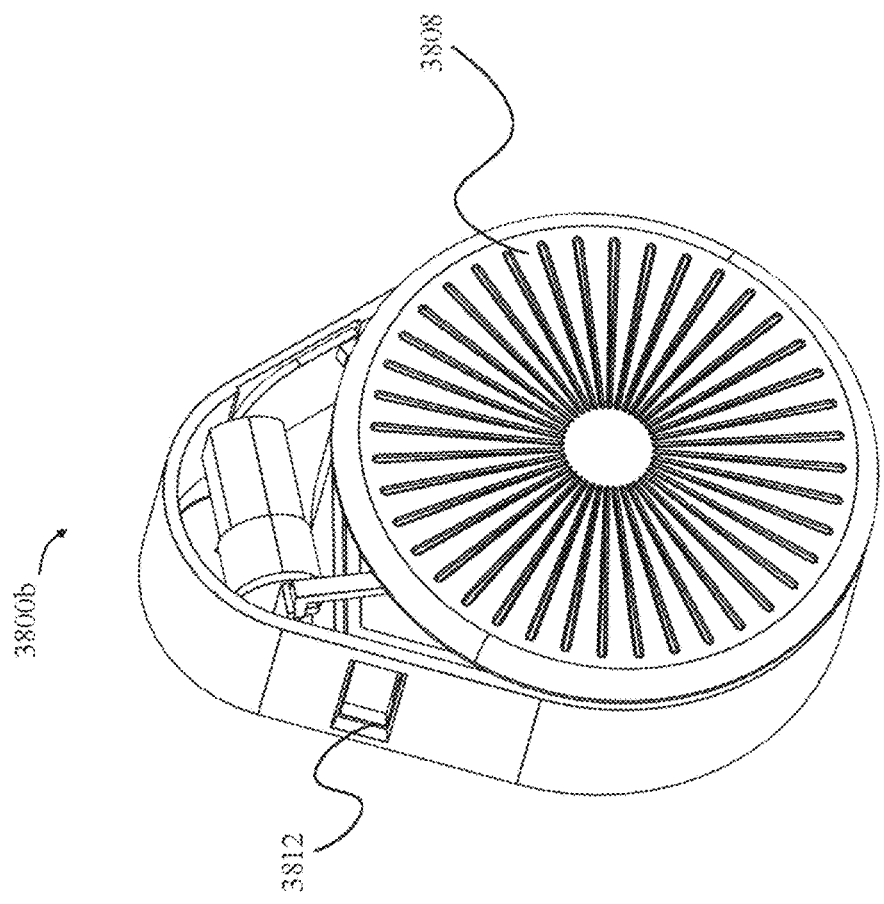
FIG. 38B is an exemplary illustration of an apparatus with a thumb wheel and an aperture.
Figure 38A:
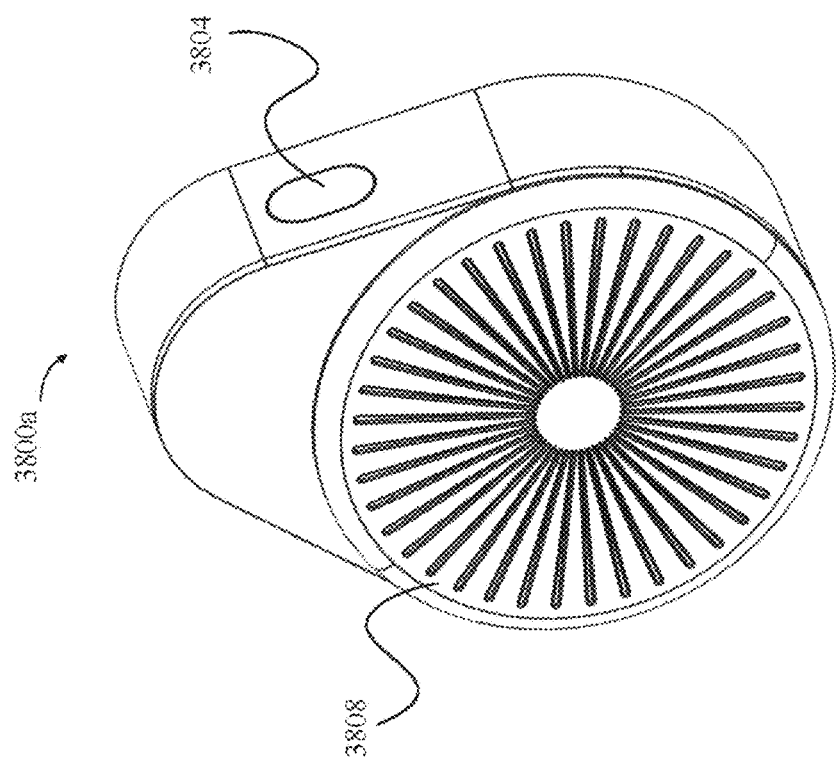
FIG. 38A is an exemplary illustration of an apparatus with a thumb wheel and a finger scanner.

Referring now to FIG. 38A, an exemplary illustration 3800*a* of an apparatus with a thumb wheel and a finger scanner. FIG. 38B is an exemplary illustration 3800*b* of an apparatus with a thumb wheel and an aperture. In an embodiment, FIG. 38A-B includes a fingerprint scanner 3804, a thumb wheel 3808, and an aperture. In an embodiment, the user may initiate the fingerprint scanner 3804, which may unlock the movement of the thumb wheel 3808. In an embodiment, this may allow the user to spin the thumb wheel 3808 in a counterclockwise direction. In an embodiment, the thumb wheel 3808 may only need to be rotated approximately 60 degrees to dispense at least a pod. In an embodiment, the thumb wheel 3808 may rotate 360 degrees to dispense at least a pod before re-locking and preventing further rotation or dispensing. This may be implemented as described and with reference any embodiment as described herein.

In an embodiment, the inside of the thumb wheel 3808 may include an encoder ring or intermittent magnets that may interact with a hall sensor on the backside of the electronics board, which may be positioned close enough to sense the signal. In this embodiment, the thumb wheel 3808 sensing may indicate to the device that the user has initiated the dispensing of at least a pod, which may allow the unlock mechanism to release and permit lock re-engagement. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 38D:
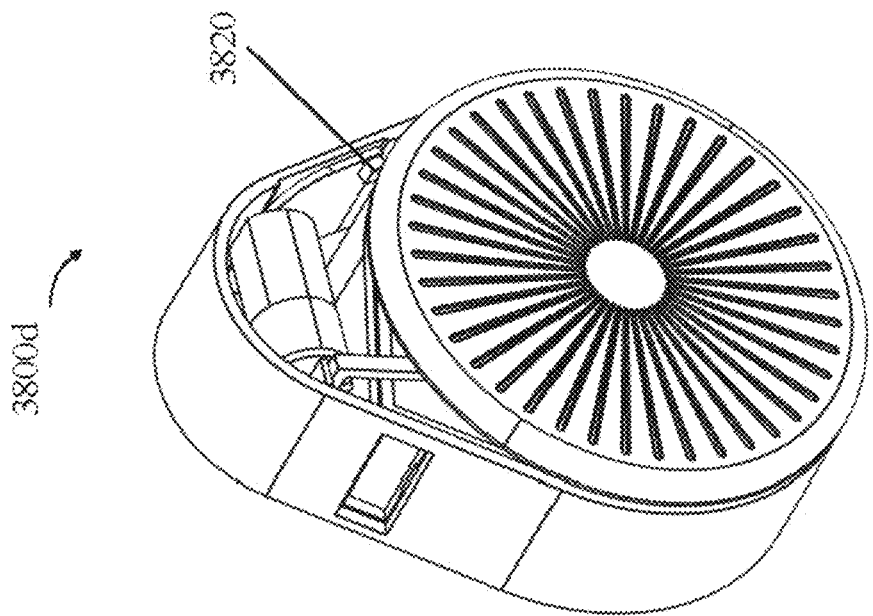
FIG. 38D is an exemplary illustration of an isometric view of a nebula concept with a locking mechanism.
Figure 38C:
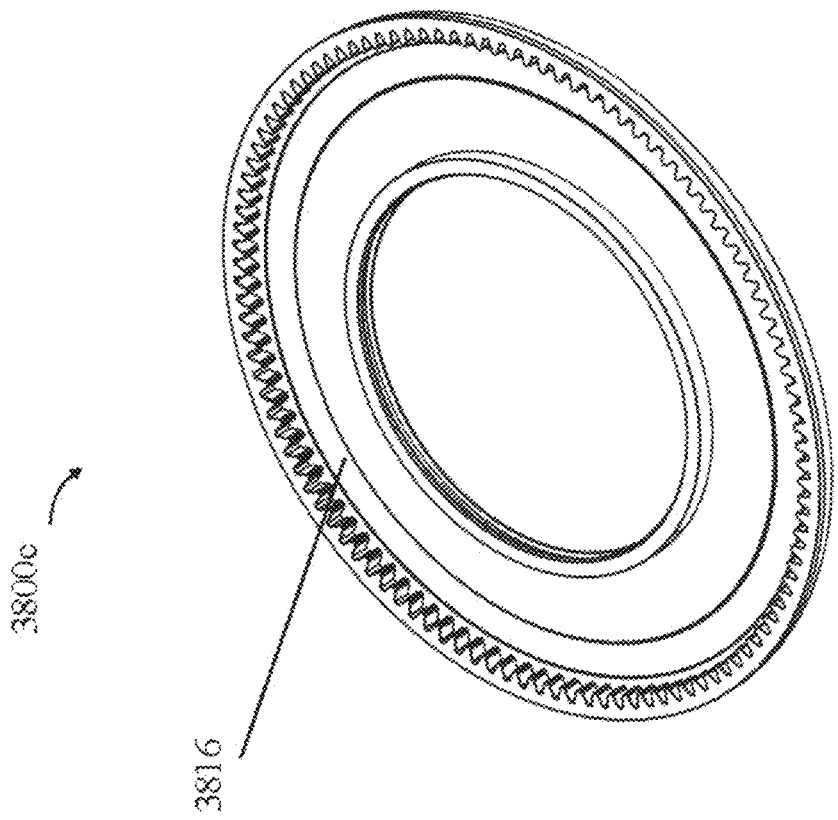
FIG. 38C is an exemplary illustration of an isometric view of the inside of a thumbwheel with an encoder ring.

Referring now to FIG. 38C, an exemplary illustration 3800*c* of an isometric view of the inside of a thumbwheel with an encoder ring. In an embodiment, the encoder ring includes intermittent magnets. In an embodiment, the encoder ring interacts with a hall sensor. In an embodiment, the hall sensor is located on the backside of the electronics board, close enough to sense the signal. In an embodiment, the thumb wheel indicates to the device that the user has started to dispense a pouch and the unlock mechanism may release and allow for lock re-engagement. As used in this disclosure, a "hall sensor" is a device that detects the presence, strength, or direction of a magnetic field. In an embodiment, the hall sensor may operate based on a Hall effect. In an embodiment, the Hall effect occurs when a current-carrying conductor is exposed to a magnetic field, generating a voltage perpendicular to both the current and the magnetic field.

Referring now to FIG. 38D, an exemplary illustration 3800d of an isometric view of a nebula concept with a locking mechanism. In an embodiment, the nebula concept includes the locking mechanism 3820.

Figure 39B:
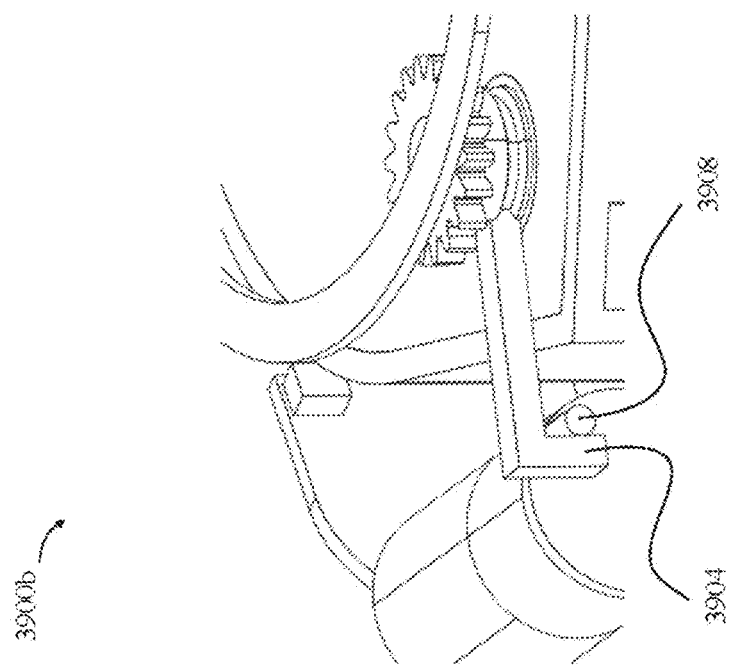
FIG. 39B is an exemplary illustration of an isometric interior view of a locking mechanism of an apparatus with a cam wheel.
Figure 39A:
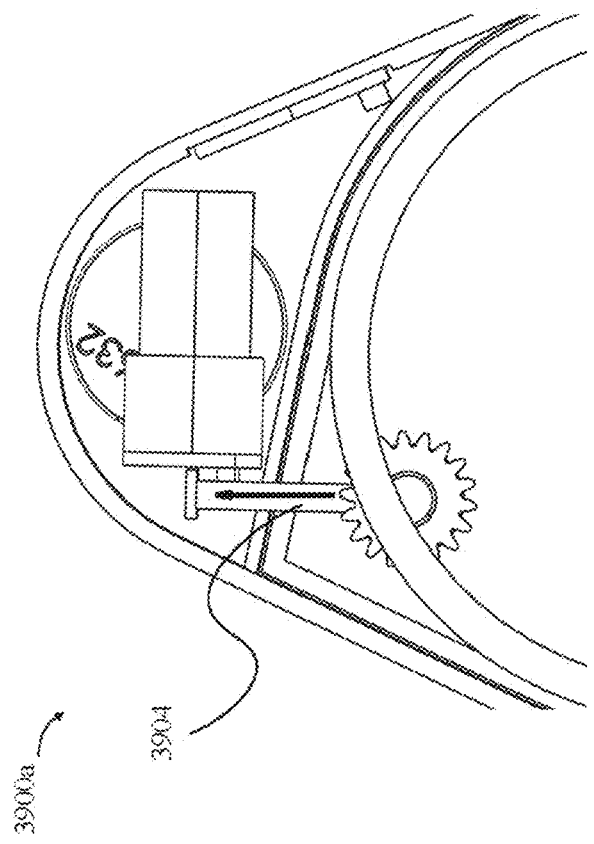
FIG. 39A is an exemplary illustration of a top down view of a locking mechanism of an apparatus with a cam wheel.

Referring now to FIG. 39A, an exemplary illustration 3900a of a top down view of a locking mechanism of an apparatus with a cam wheel. FIG. 39B is an exemplary illustration 3900b of an isometric interior view of a locking mechanism of an apparatus with a cam wheel. In an embodiment, FIG. 39A-B includes a metal L-shaped component 3904 and a cam wheel 3908. In an embodiment, the lock mechanism may work by rotating a motor with a gearbox, which may be a planetary type, and a cam wheel 3908 positioned at the end. In an embodiment, the metal L-shaped component 3904 may be situated within a track in the housing. In an embodiment, the cam wheel 3908 may rotate counterclockwise, pulling the metal L-shaped component 3904 out of the drive wheel, allowing the drive wheel to rotate. In an embodiment, once rotation begins, the motor may then turn clockwise back to its starting position. In an embodiment, the metal L-shaped component 3904 may rest on the drive wheel until the slotted opening aligns with the metal L-shaped component 3904, at which point the metal L-shaped component 3904 may reinsert itself and resist further rotation of the drive wheel.

In an embodiment, the metal L-shaped component 3904 may translate to the unlocked state by means of a motor. The motor may also charge a snap arm in the housing, which may act as a spring to return the metal L-shaped component 3904. In an embodiment, the flexed snap arm may provide the force required to re-insert the metal lock into the drive wheel.

In this embodiment, the magazine may have a door that can be opened by the user prior to insertion into the dispensing device. In an embodiment, the door may be part of a long flexible piece of material that translates in a track within the Magazine housing/body. In an embodiment, a tab extruded from the surface of the flexible piece may be translated by the user's finger/thumb to open the door and provide access to the pouches. In an embodiment, this covering may also be accomplished by some form of removable cover, tape, or label. In an embodiment, the cover could be permanent or replaceable. Additionally and or alternatively, the cover could be designed into the Dispenser and be opened and closed with each use, such as a sliding door, a cap, a plug, or other mechanisms. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 39D:
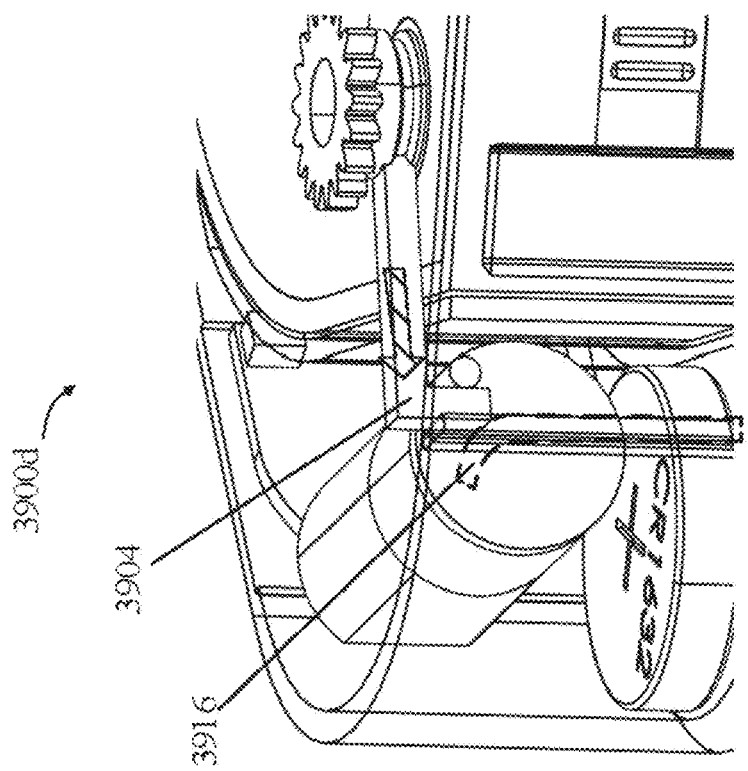
FIG. 39D is an exemplary illustration of a side view of an apparatus with a metal L-shaped component and a flexed snap arm.
Figure 39C:
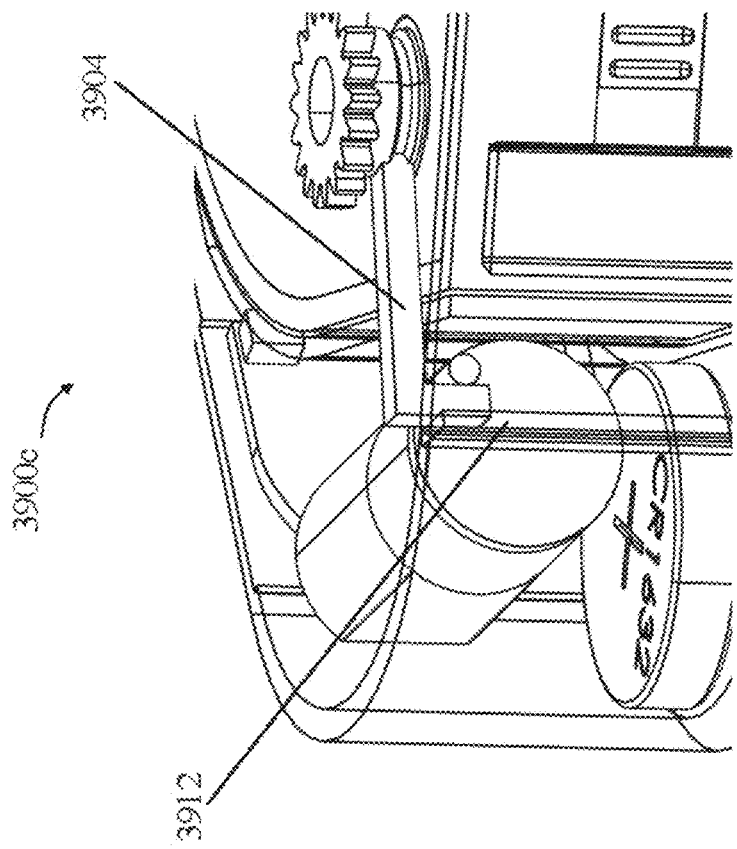
FIG. 39C is an exemplary illustration of a side view of an apparatus with a metal L-shaped component and a snap arm.

Referring now to FIG. 39C, an exemplary illustration 3900c of a side view of an apparatus with a metal L-shaped component and a snap arm and FIG. 39D, an exemplary illustration 3900d of a side view of an apparatus with a metal L-shaped component and a flexed snap arm. In an embodiment, the apparatus includes a metal L-shaped component 3904 and a snap arm 3912. In an embodiment, the metal L-shaped component 3904 translates to the un-locked state by means of the motor. In an embodiment, the motor charges a snap arm 3912 in the housing which acts as a spring to return the metal L-shaped component 3904. In an embodiment, the flexed snap arm 3916 provides the force required to re-insert the metal L-shaped component 3904 into the drive wheel.

Figure 40B:
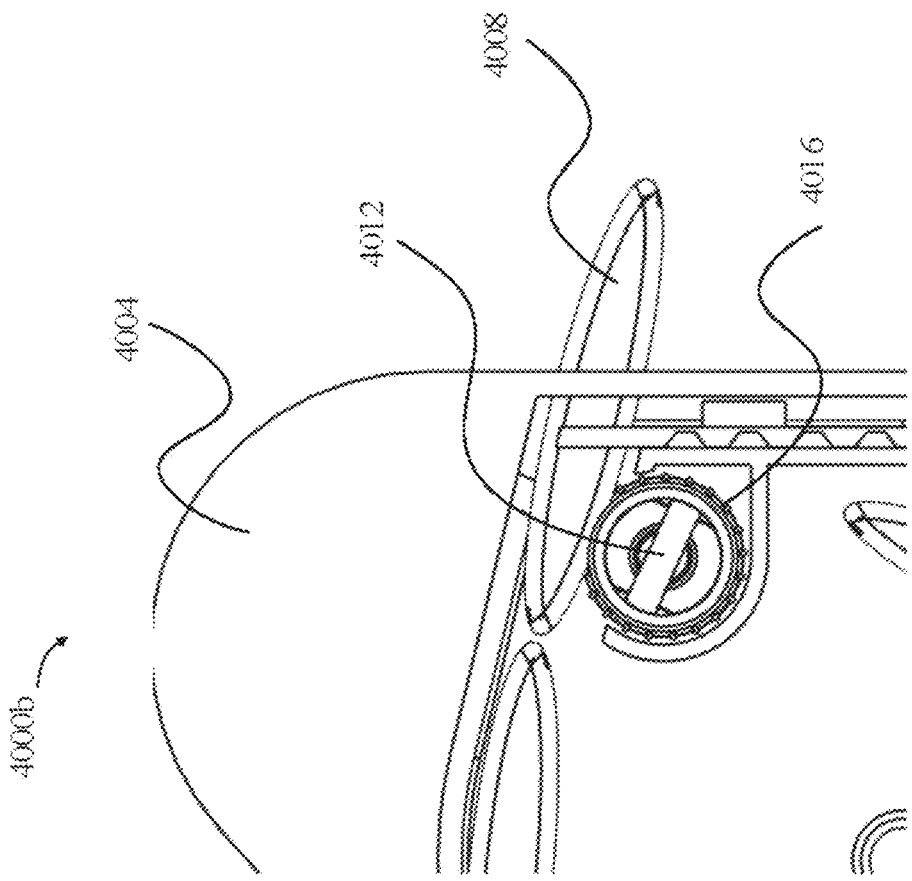
FIG. 40B is an exemplary illustration of a close up top down interior view of an apparatus with a dispensing mechanism with a barrel axle and a plurality of prongs dispensing at least a pod.
Figure 40A:
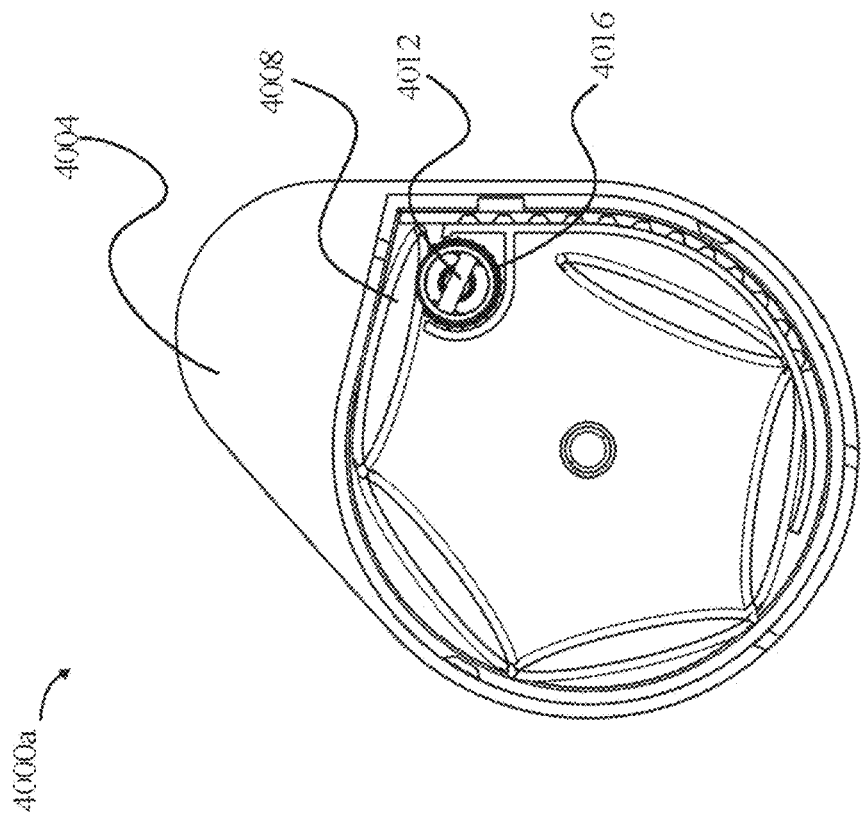
FIG. 40A is an exemplary illustration of a top down interior view of an apparatus with a dispensing mechanism with a barrel axle and a plurality of prongs.

Referring now to FIG. 40A, an exemplary illustration 4000a of a top down interior view of an apparatus with a dispensing mechanism with a barrel axle and a plurality of prongs. FIG. 40B is an exemplary illustration 4000b of a close up top down interior view of an apparatus with a dispensing mechanism with a barrel axle and a plurality of prongs dispensing at least a pod. In an embodiment, FIG. 40A-B includes an apparatus housing 4004, at least a pod 4008, a barrel axle 4012, and a plurality of prongs 4016. In an embodiment, the at least a pod 4008 dispensing may be driven by the rotation of the barrel axle 4012. In an embodiment, this rotation may be facilitated by the apparatus. In an embodiment, as the barrel axle 4012 rotates, a thin metal pronged cylinder, keyed to the barrel, may also rotate. In an embodiment, this pronged or rough high-friction surface may be designed to drag, pull, or slide the at least a pod 4008 along through the chute or passage. In an embodiment, the plurality of prongs 40 may engage with the soft material of the at least a pod 4008 or compliant features of another body being dispensed. In another aspect, an added security feature may be that if a user attempts to grab and pull the at least a pod 4008 out of the magazine that is not being dispensed, they may end up damaging the at least a pod 4008 by ripping or tearing it during the dispense, potentially dissuading malicious use.

In an embodiment, the at least a pod 4008 may be connected end to end with some form of connection material. For example, partial cuts in the at least a pod 4008 material between the at least a pod 4008 may ensure they are not fully separated, with perhaps a small bit of material at each corner or a full perforation through the ends of the at least a pod 4008. Additionally and or alternatively, there may be a carrier material connecting the at least a pod 4008, similar to a bandolier. Additionally and or alternatively, the carrier material may be a blister material with perforation between each pod that is dispensed.

In an embodiment, in the stored state, the magazine may prevent the rotation of the barrel axle 4012 and barbed cylinder by means of a locking mechanism. In an embodiment, a ferrous piece of metal may be keyed to the barrel axle and sprung towards the magazine body. In an embodiment, the ferrous metal piece may have a separate key feature that interacts with a mating feature in the magazine body. In an embodiment, this interlocking mechanism may secure the housing, the ferrous metal piece, and the barrel axle 4012, preventing rotation unless unlocked by the magazine. In an embodiment, the unlocking method may utilize a small magnet in the drive gear of the dispenser, which pulls the ferrous key feature away from the magazine body, allowing free rotation. In an embodiment, the magnet may drive the motion of the ferrous metal locking piece, which is sprung outwards in the magazine. In an embodiment, the disengagement of the lock from the magazine housing wall may be visible in the unlocked state. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 40D:
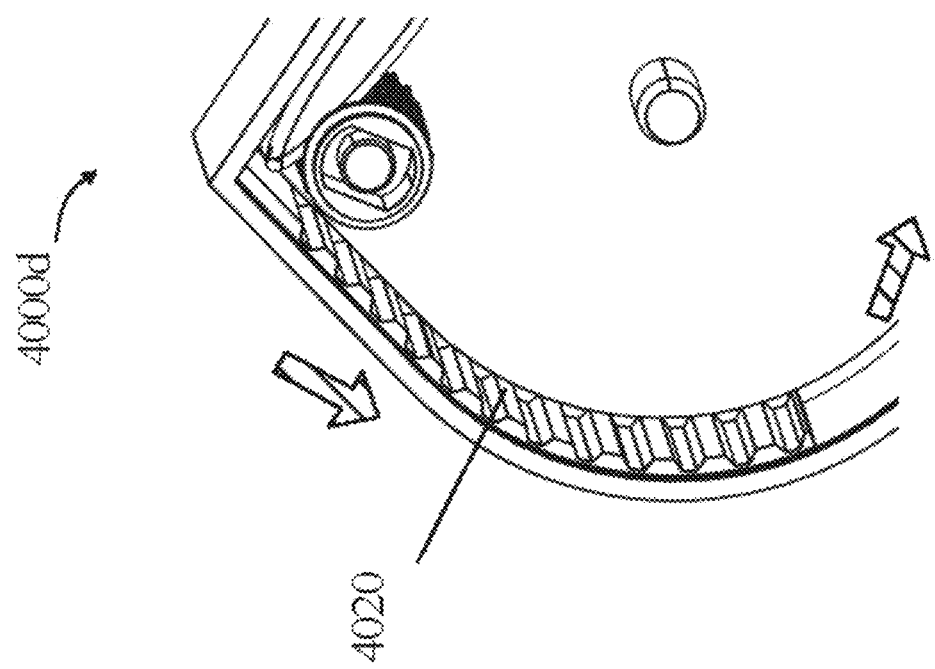
FIG. 40D is an exemplary illustration of an isometric view of a housing of a nebula concept with a track for translating at least a pod.
Figure 40C:
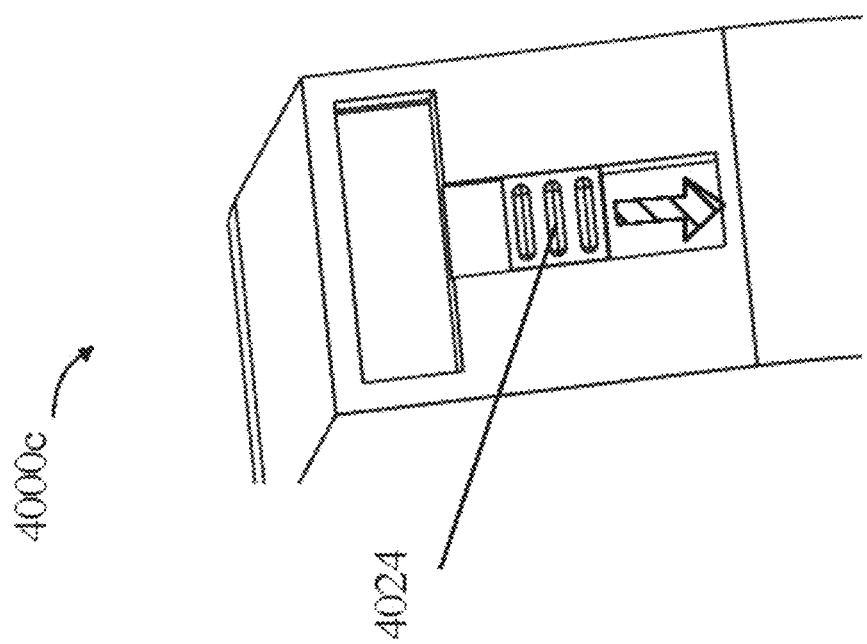
FIG. 40C is an exemplary illustration of a side view of the exterior of a nebula concept with a tab for opening a door and providing access to at least a pod.

Referring now to FIG. 40C, an exemplary illustration 4000c of a side view of the exterior of a nebula concept with a tab for opening a door and providing access to at least a pod and FIG. 40D, an exemplary illustration 4000d of an isometric view of a housing of a nebula concept with a track for translating at least a pod. In an embodiment, the magazine has a door that can be opened by the user prior to insertion into the dispensing device. In an embodiment, the door is part of a long flexible piece of material that translates in the track within the magazine housing. In an embodiment, the tab 4024 extrudes from the surface of the flexible piece can be translated by the user's finger and/or thumb to open the door and provide access to the at least a pod. In an embodiment, the covering may also be accomplished by some form of removable cover/tape/label. In an embodiment, the cover may be permanent or replaceable. In an embodiment, the cover could also be designed into the dispenser and be opened and closed with each use for example, without limitation, a sliding door, a cap, a plug, and the like.

Figure 40G:
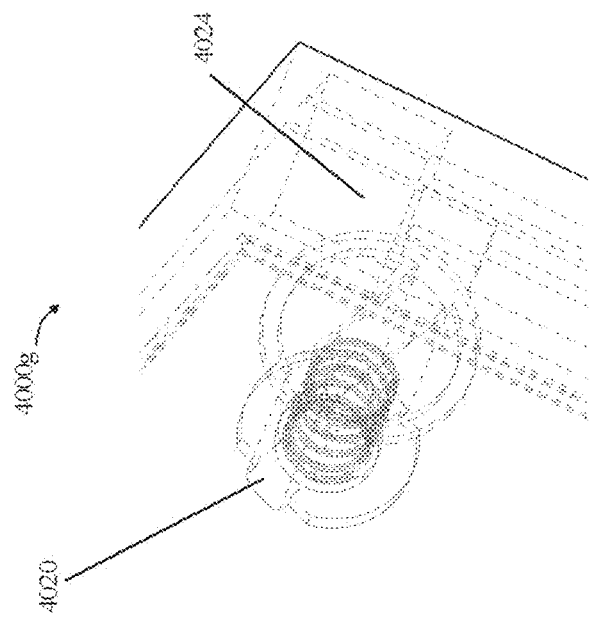
FIG. 40G is an exemplary illustration of an isometric view of an apparatus with a barrel axle with a keyed feature.
Figure 40F:
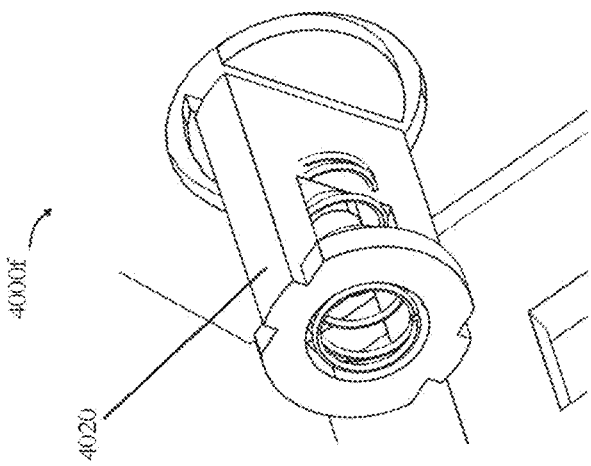
FIG. 40F is an exemplary illustration of an isometric view of an apparatus with a barrel axle with a keyed feature.
Figure 40E:
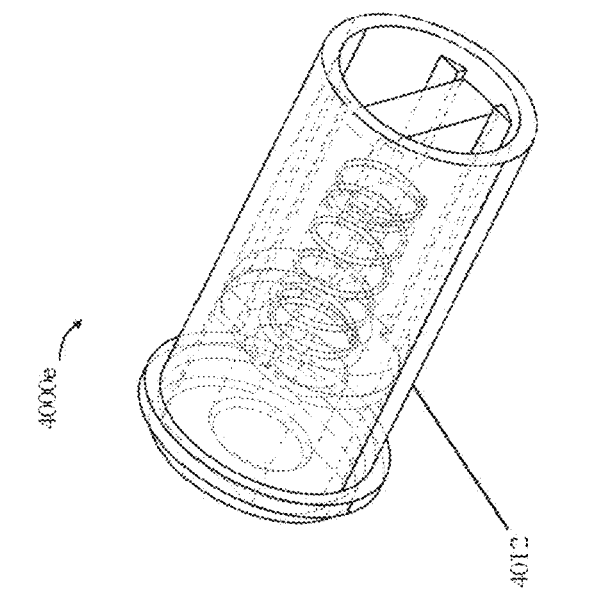
FIG. 40E is an exemplary illustration of an isometric view of an apparatus with a barrel axle with a keyed feature.

Referring now to FIG. 40E, an exemplary illustration 4000e of an isometric view of an apparatus with a barrel axle with a keyed feature, FIG. 40F, an exemplary illustration 4000f of an isometric view of an apparatus with a barrel axle with a keyed feature, and FIG. 40G, an exemplary illustration 4000g of an isometric view of an apparatus with a barrel axle with a keyed feature. In an embodiment, in the stored state the magazine prevents the rotation of the barrel axle 4012 and barbed cylinder by means of a locking mechanism. In an embodiment, the keyed feature 4020 is a ferrous piece of metal that is keyed to the barrel axle and sprung towards the magazine body. In an embodiment, the keyed feature 4020 has a separate key feature that interacts with a mating feature 4024 in the magazine body. In an embodiment, this interlocks the housing, to the keyed feature 4020, to the barrel axle 4012 and prevents rotation unless unlocked by the magazine. In an embodiment, the unlock method uses a small magnet in the drive gear of the dispenser which "pulls" the keyed feature 4020 away from the magazine body and allows free rotation.

Figure 40H:
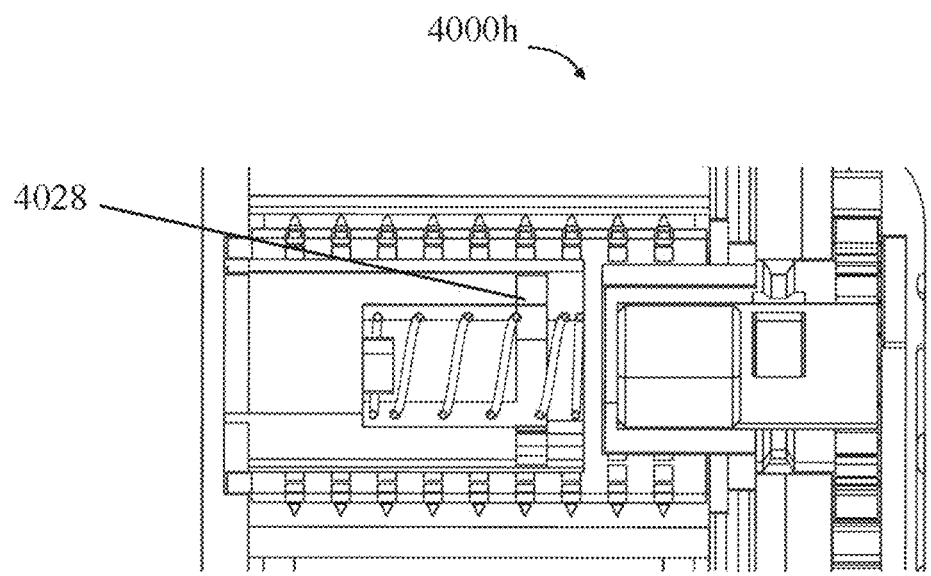
FIG. 40H is an exemplary illustration of a cross sectional view of an apparatus showing a ferrous metal locking system engaged with a magazine housing wall.
Figure 40I:
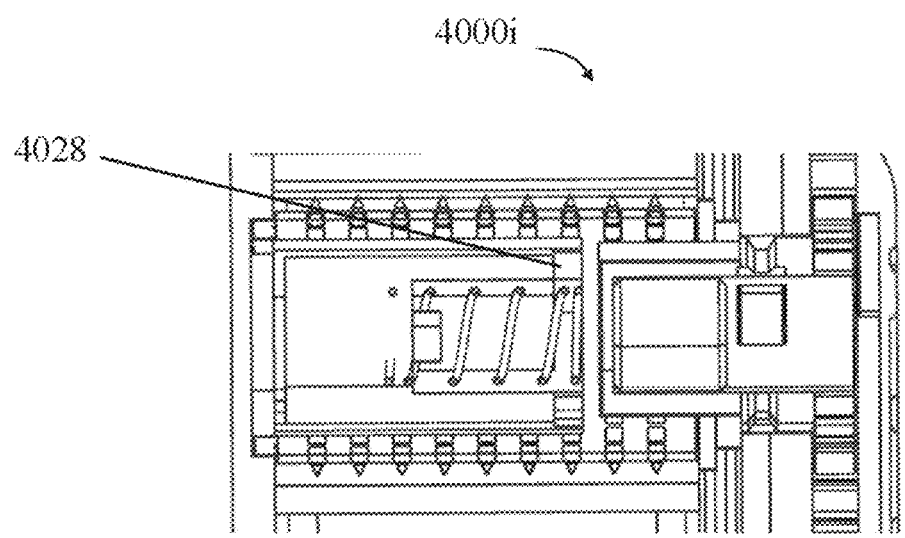
FIG. 40I is an exemplary illustration of a cross sectional view of an apparatus showing a ferrous metal locking system disengaged with a magazine housing wall.

Referring now to FIG. 40H, an exemplary illustration 4000h of a cross sectional view of an apparatus showing a ferrous metal locking system engaged with a magazine housing wall and FIG. 40I, an exemplary illustration 4000i of a cross sectional view of an apparatus showing a ferrous metal locking system disengaged with a magazine housing wall. In an embodiment, the magnet drives the motion of the ferrous metal locking system 4028 present and sprung outwards in the magazine. In an embodiment, the lock disengagement with the magazine housing wall can be seen in the unlocked state in illustration 4000i.

Figure 41B:
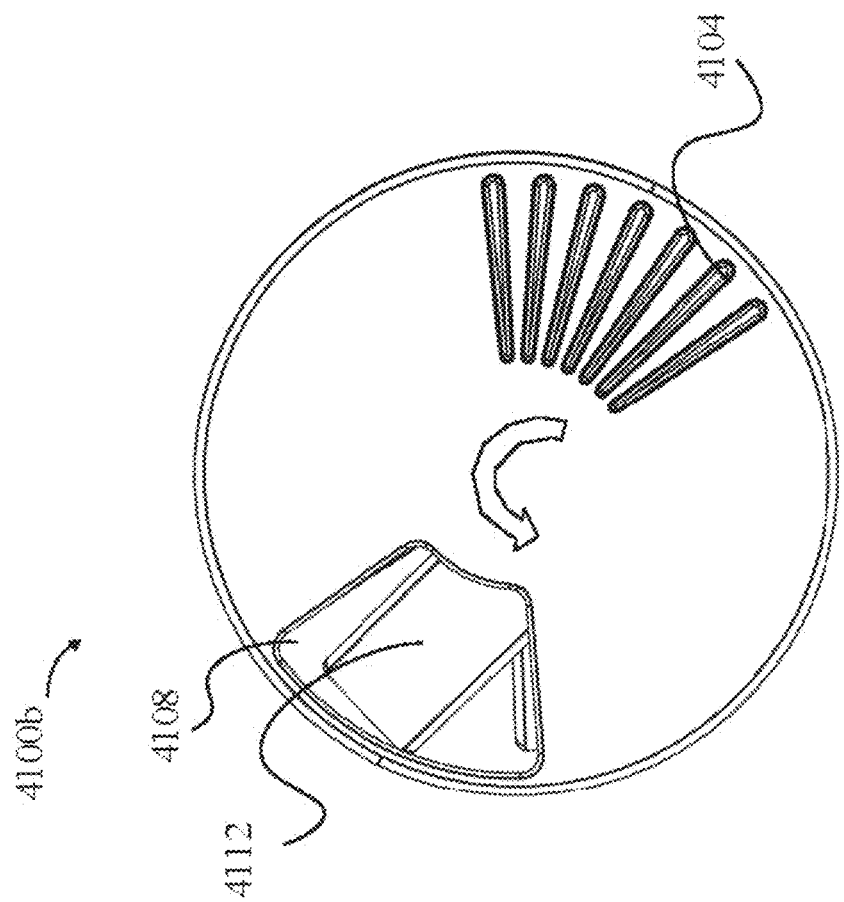
FIG. 41B is an exemplary illustration of a top down view of a meta concept for an apparatus in an open position.
Figure 41A:
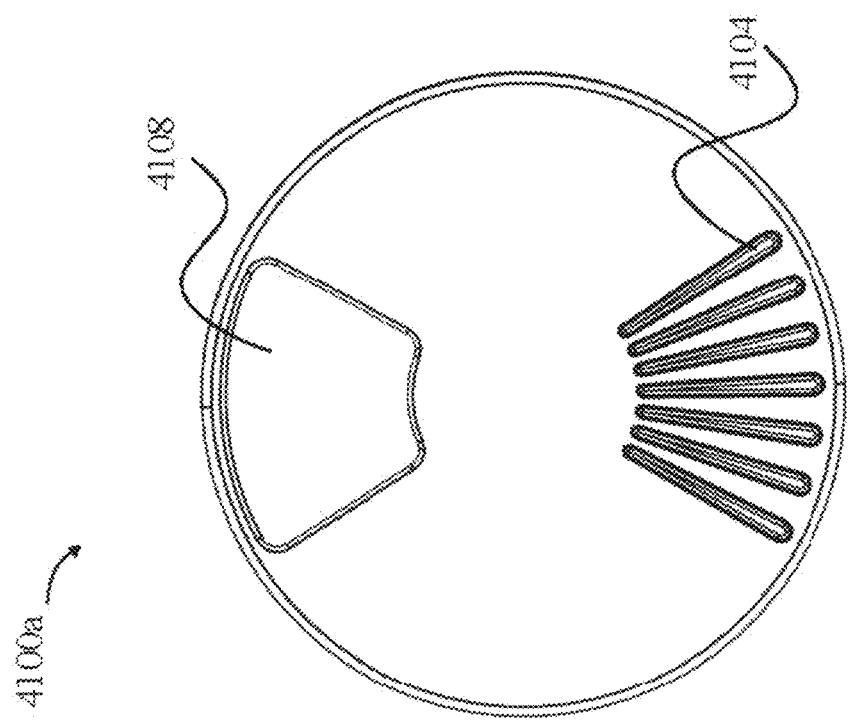
FIG. 41A is an exemplary illustration of a top down view of a meta concept for an apparatus in a closed position.

Referring now to FIG. 41A, an exemplary illustration 4100a of a top down view of a meta concept for an apparatus in a closed position. FIG. 41B is an exemplary illustration 4100b of a top down view of a meta concept for an apparatus in an open position. In an embodiment, FIG. 41A-B includes a thumb wheel 4104, an aperture 4108, and at least a pod 4112. In an embodiment, a user may rotate, using the thumb wheel 4104, the apparatus cover counter clockwise to expose the at least a pod 4112. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 42B:
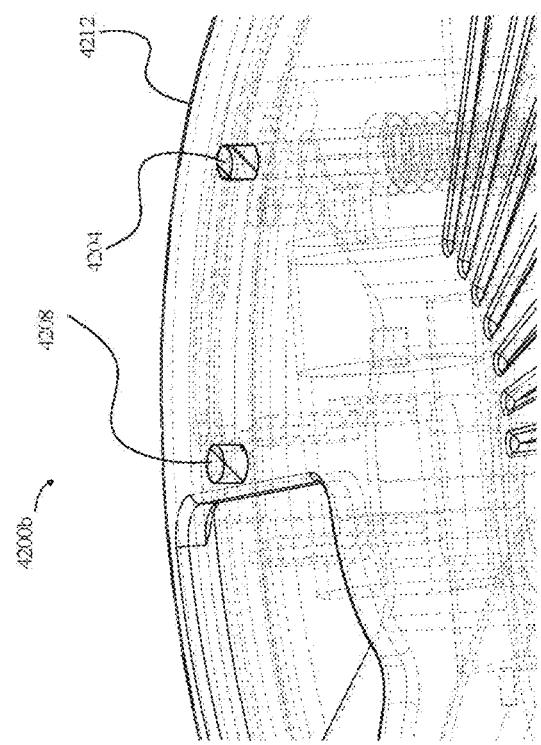
FIG. 42B is an exemplary illustration of a meta concept for an apparatus with a locking pin and a travel pin and slot in an unlocked and partially open state.
Figure 42A:
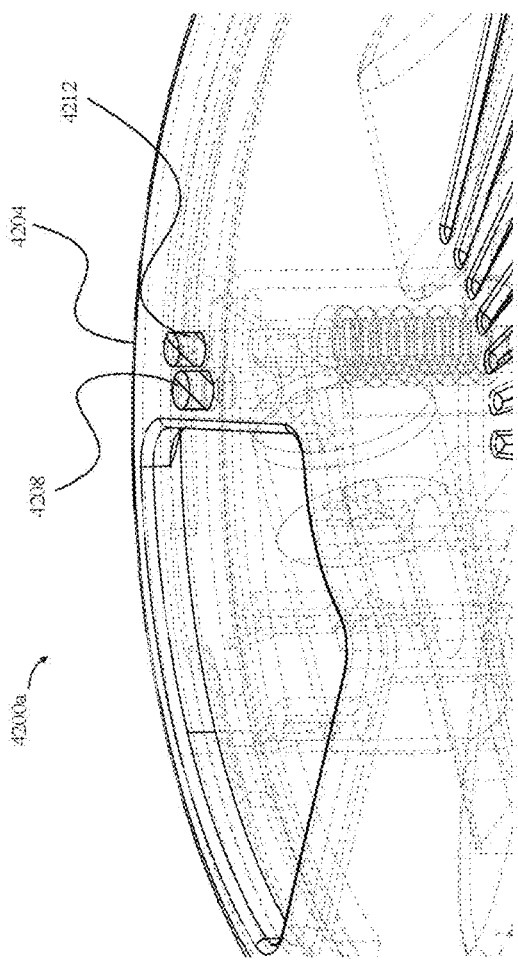
FIG. 42A is an exemplary illustration of a meta concept for an apparatus with a locking pin and a travel pin and slot in a stored state.

Referring now to FIG. 42A, an exemplary illustration 4200a of a meta concept for an apparatus with a locking pin and a travel pin and slot in a stored state. FIG. 42B is an exemplary illustration 4200b of a meta concept for an apparatus with a locking pin and a travel pin and slot in an unlocked and partially open state. In an embodiment FIG. 42A-B includes a rotating plate 4204, a locking pin 4208, and a travel pin and slot 4212. In an embodiment, the rotating plate 4204 may be locked in a stored state by a locking pin 4208. In an embodiment, upon successful fingerprint scan, the locking pin 4208 may be retracted. In an embodiment, the rotating plate 4204, which may be positioned at the top, may have a limited amount of rotation, which in this embodiment may be 60 degrees, as defined by a fixed pin and slot. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 43:
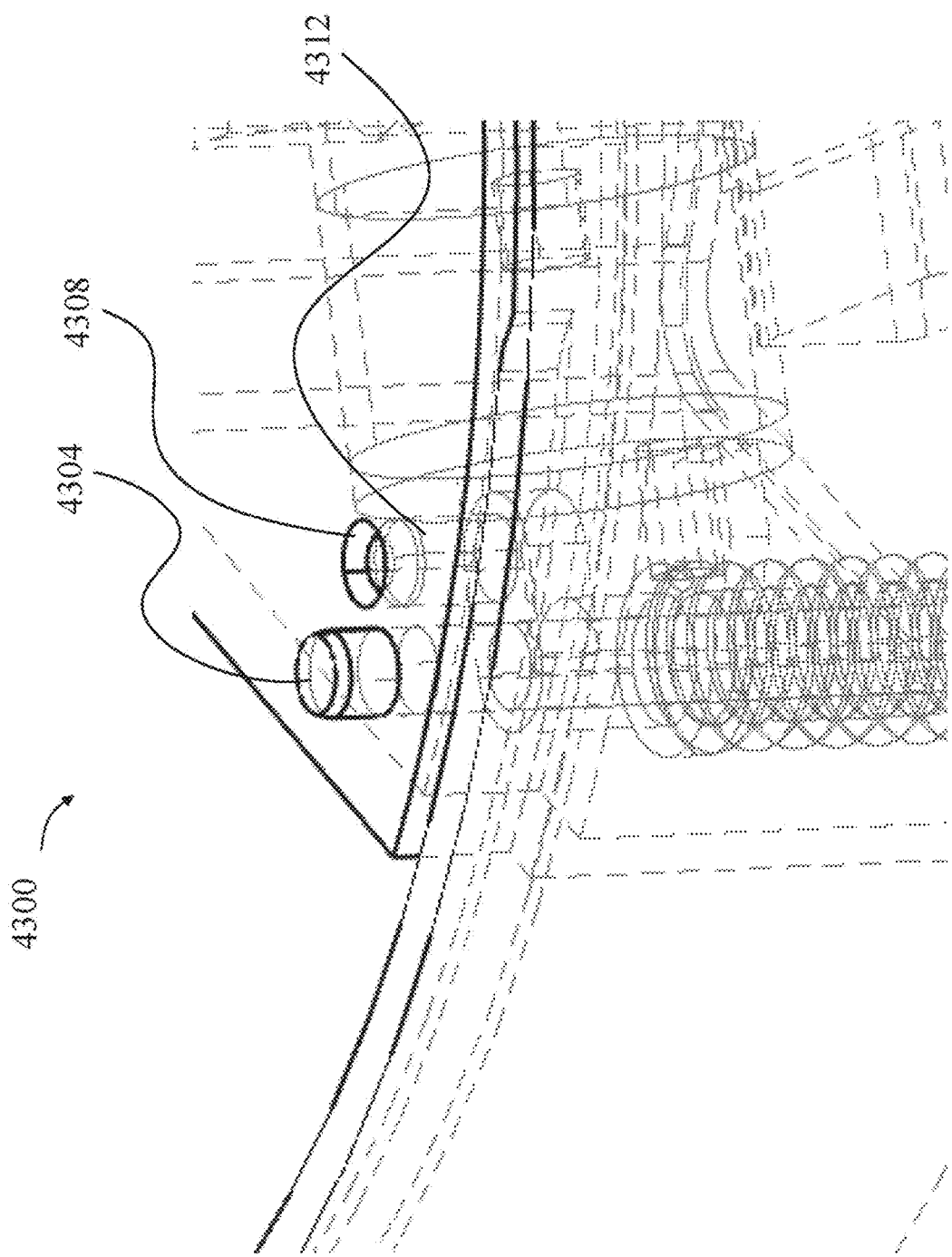
FIG. 43 is an exemplary illustration of a meta concept for an apparatus in an unlocked state with a locking pin out of a mating hole.

Referring now to FIG. 43, an exemplary illustration 4300 of a meta concept for an apparatus in an unlocked state with a locking pin out of a mating hole. In an embodiment, FIG. 43 includes a travel pin and slot, a locking pin hole 4308, and a locking pin 4312. In an embodiment, a motor may turn to unlock the rotating top plate, which may drive a gear box, such as a planetary gear box. In an embodiment, the gear box may drive the locking pin 4312 downward via a cam action. In an embodiment, the locking pin 4312 may drop out of the locking pin hole 4308, potentially providing enough clearance for the plate to turn. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Figure 44B:
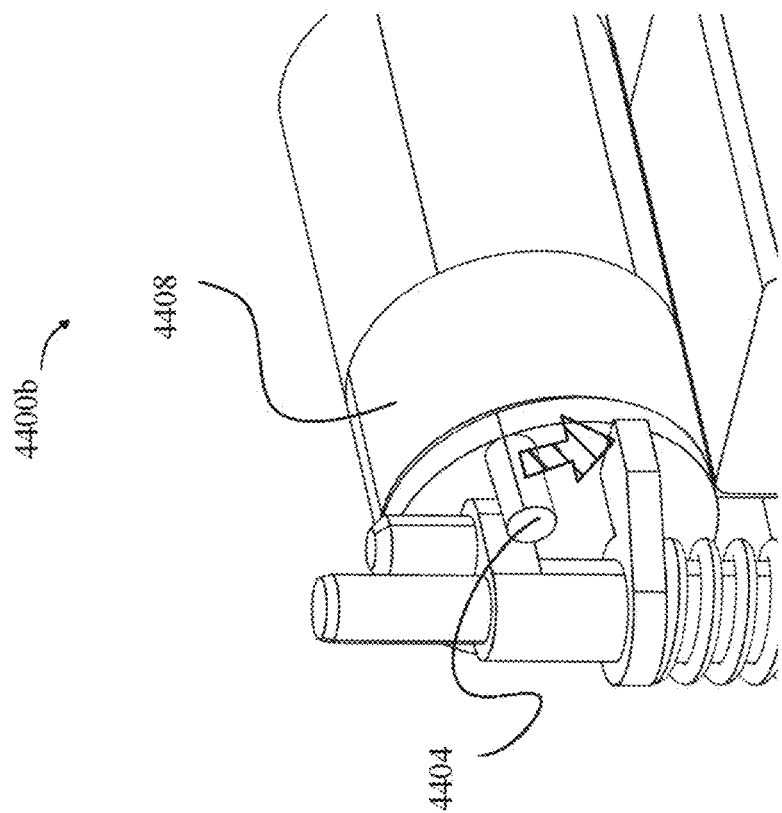
FIG. 44B is an exemplary illustration of a locking mechanism with a cam mechanism in an unlocked position.
Figure 44A:
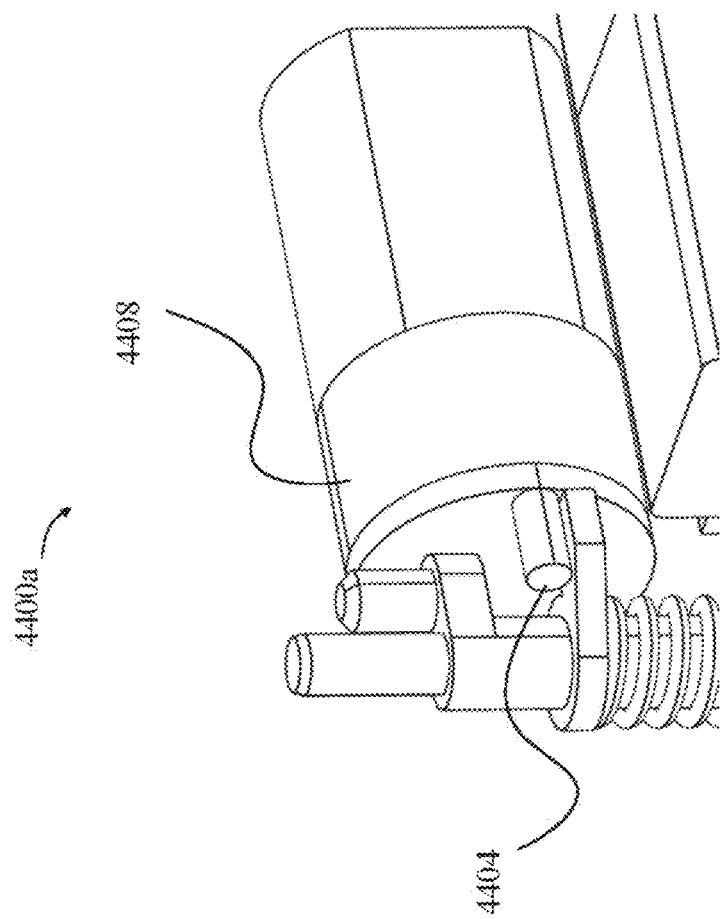
FIG. 44A is an exemplary illustration of a locking mechanism with a cam mechanism in a locked position.

Referring now to FIG. 44A, an exemplary illustration 4400a of a locking mechanism with a cam mechanism in a locked position. FIG. 44B is an exemplary illustration 4400b of a locking mechanism with a cam mechanism in an unlocked position. In an embodiment, the cam mechanism 4408 may drive the locking pin downward, allowing the pin 4404 to travel along the assembly pin as a bearing surface. In this embodiment, the pin 4404 may be sprung upwards at all times. In an embodiment, as the pin 4404 is driven downward, it may compress the spring and disengage from the rotating top plate. In an embodiment, the after a certain duration (e.g., 10 seconds), the motor may return to its original position (as shown in image 3). In an embodiment, if the rotating top plate is in the open condition, the sprung locking pin may press against the top plate. In an embodiment, once the rotating top plate is returned to the storage position, the locking pin may move into the locked position due to the spring force. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference any embodiment as described herein.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 45A:
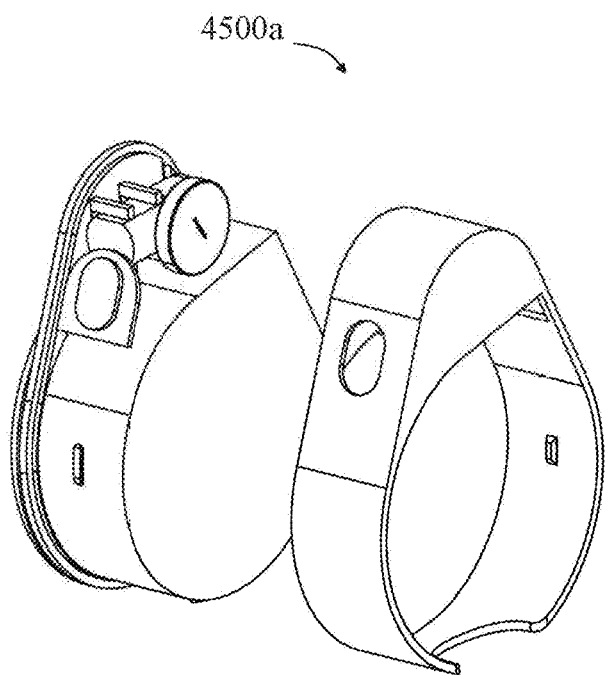
FIG. 45A is an exemplary illustration of an isometric view of an apparatus with the cover removed.
Figure 45B:
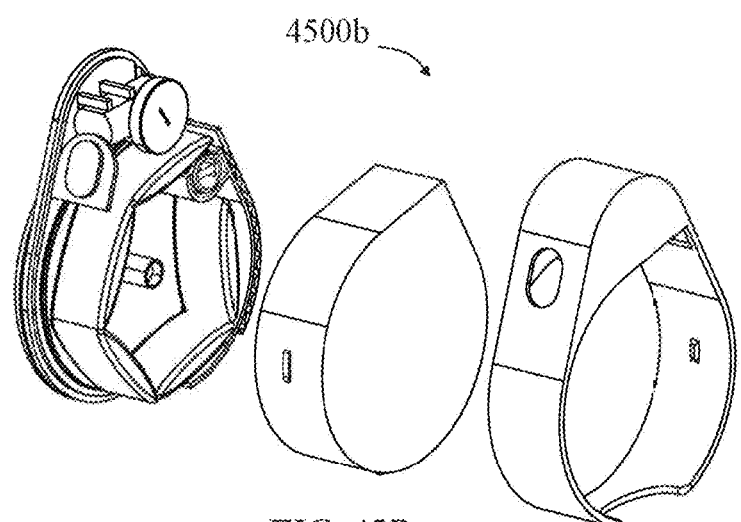
FIG. 45B is an exemplary illustration of an isometric view of an apparatus in a semi-exploded view.
Figure 45C:
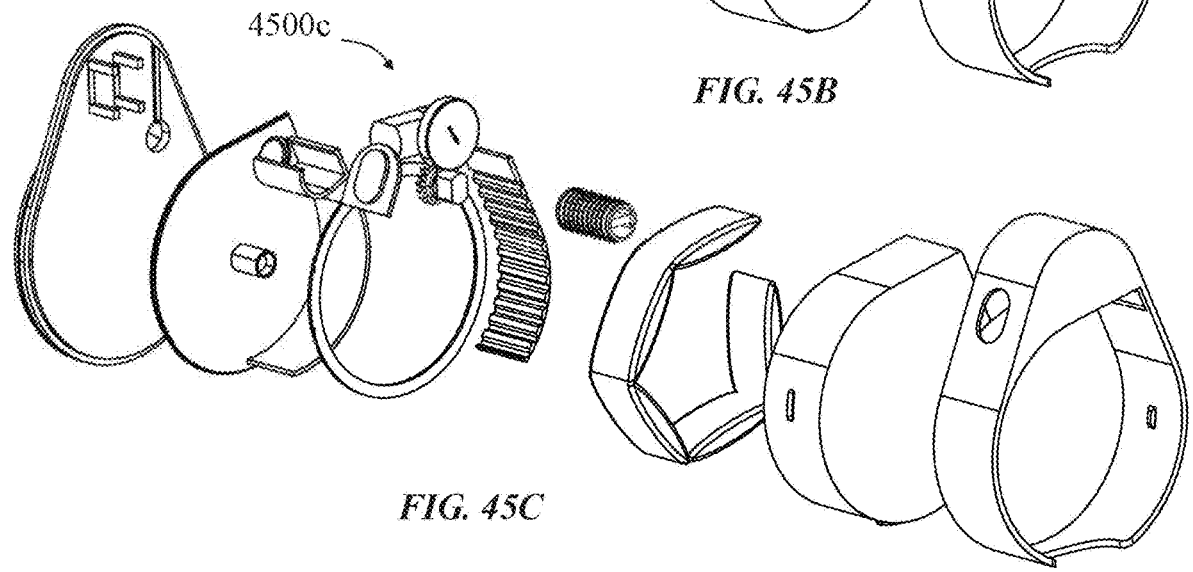
FIG. 45C is an exemplary illustration of an isometric view of an apparatus in an exploded view.

FIG. 45A is an exemplary illustration 4500*a* of an isometric view of an apparatus with the cover removed. FIG. 45B is an exemplary illustration 4500*b* of an isometric view of an apparatus in a semi-exploded view. FIG. 45C is an exemplary illustration 4500*c* of an isometric view of an apparatus in an exploded view.

FIG. 46A is an exemplary illustration 4600*a* of an isometric view of an apparatus with the cover removed. FIG. 46B is an exemplary illustration 4600*b* of an isometric view of an apparatus in a semi-exploded view. FIG. 46C is an exemplary illustration 4600*c* of an isometric view of an apparatus in an exploded view.

Figure 47C:
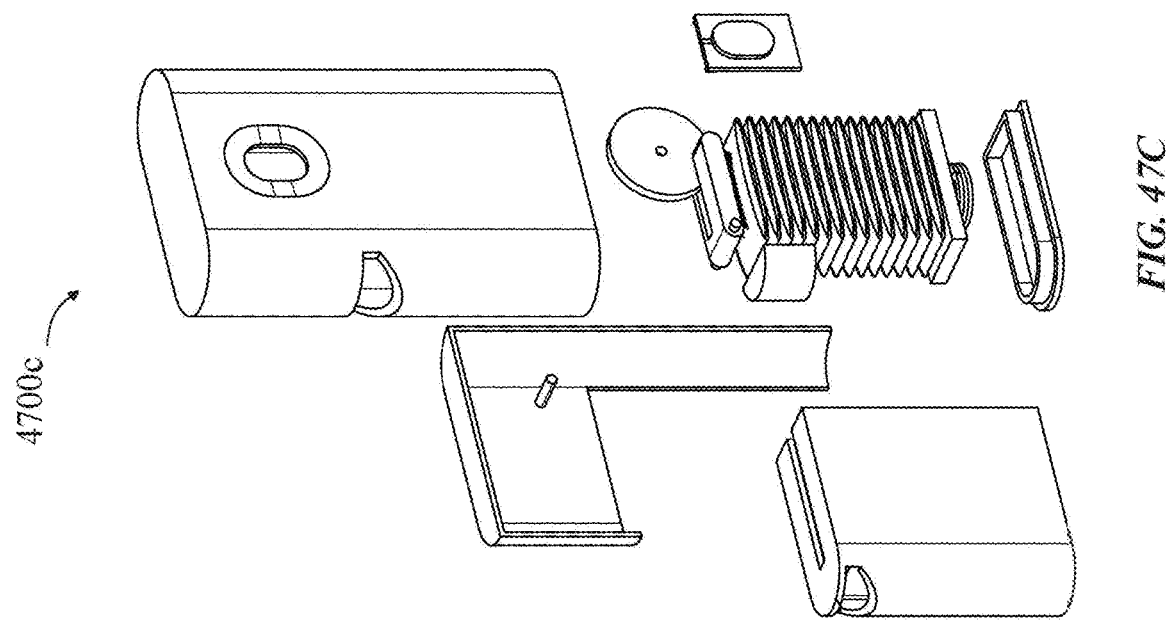
FIG. 47C is an exemplary illustration of an isometric view of an apparatus in an exploded view.
Figure 47B:
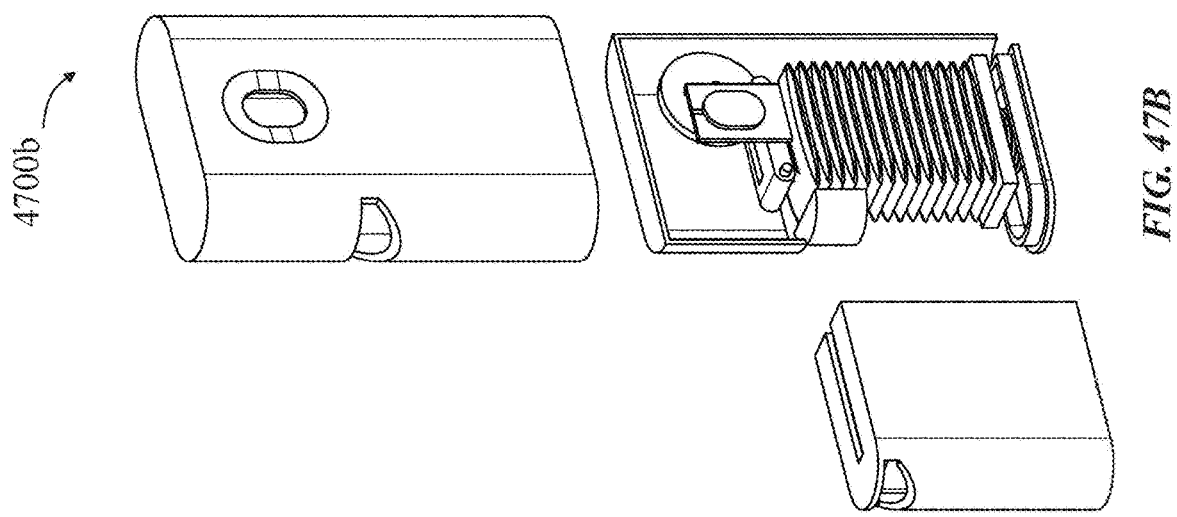
FIG. 47B is an exemplary illustration of an isometric view of an apparatus in a semi-exploded view.
Figure 47A:
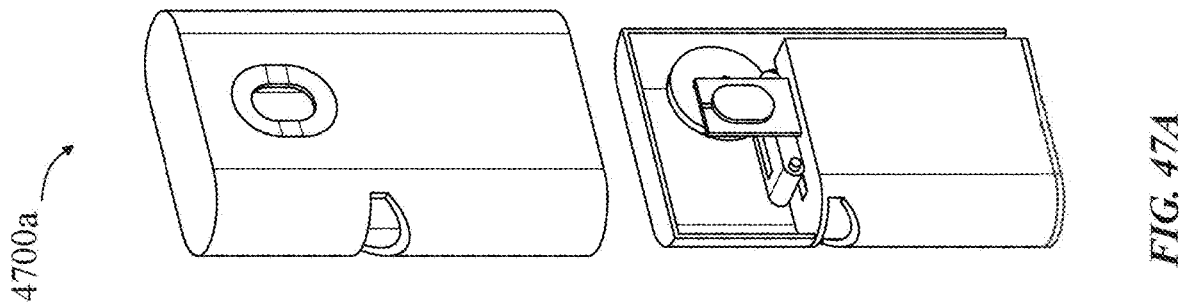
FIG. 47A is an exemplary illustration of an isometric view of an apparatus with the cover removed.

FIG. 47A is an exemplary illustration 4700*a* of an isometric view of an apparatus with the cover removed. FIG. 47B is an exemplary illustration 4700*b* of an isometric view of an apparatus in a semi-exploded view. FIG. 47C is an exemplary illustration 4700*c* of an isometric view of an apparatus in an exploded view.

Figure 48C:
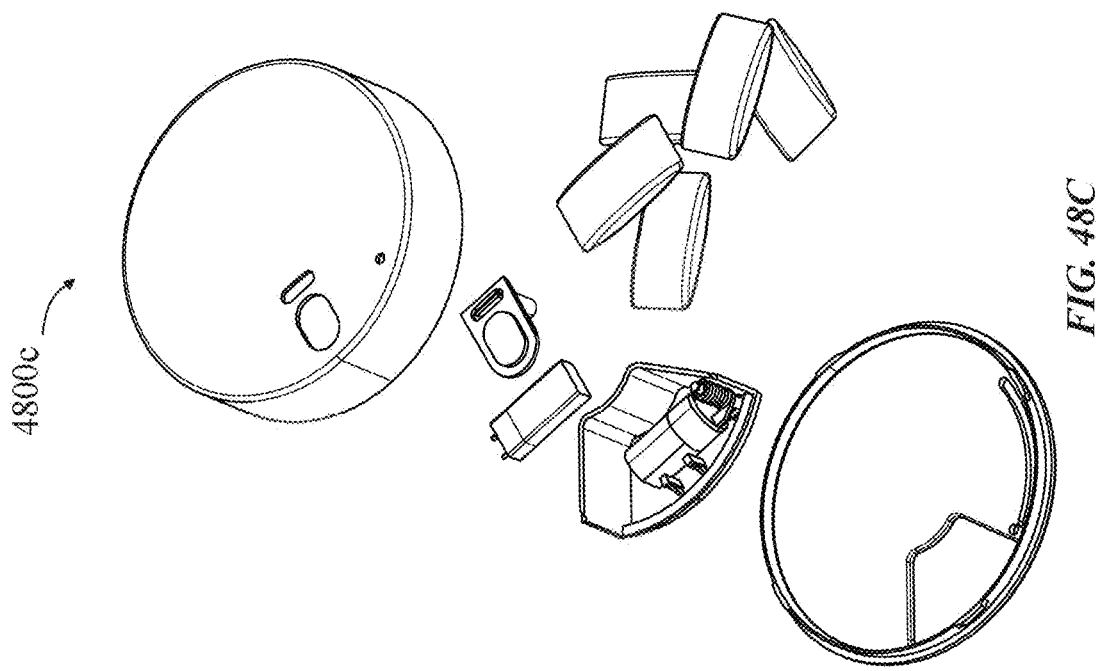
FIG. 48C is an exemplary illustration of an isometric view of an apparatus in an exploded view.
Figure 48B:
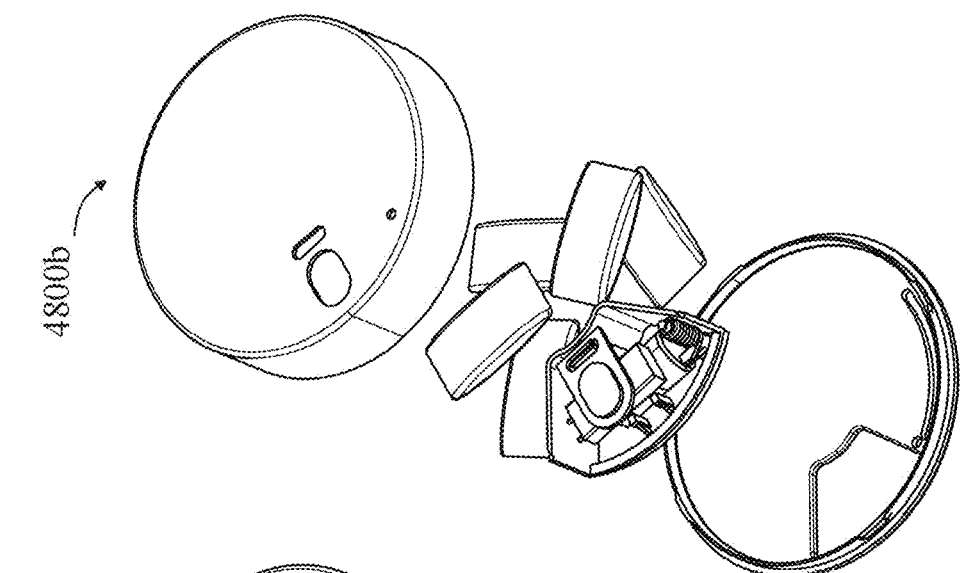
FIG. 48B is an exemplary illustration of an isometric view of an apparatus in a semi-exploded view.
Figure 48A:
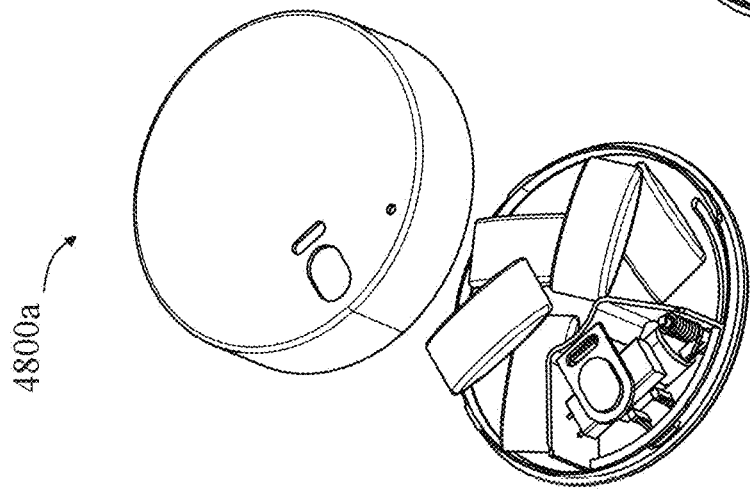
FIG. 48A is an exemplary illustration of an isometric view of an apparatus with the cover removed.

FIG. 48A is an exemplary illustration 4800*a* of an isometric view of an apparatus with the cover removed. FIG. 48B is an exemplary illustration 4800*b* of an isometric view of an apparatus in a semi-exploded view. FIG. 48C is an exemplary illustration 4800*c* of an isometric view of an apparatus in an exploded view.

Referring now to FIG. 49, a flow diagram of an exemplary method 4900 for dispensing oral nicotine is illustrated. At step 4905, method 4900 includes storing a plurality of a pods in a magazine within a body. This may be implemented as described and with reference to FIGS. 1-48.

Still referring to FIG. 49, at step 4910, method 4900 includes receiving a fingerprint scan from a user via a fingerprint scanner coupled to the body. This may be implemented as described and with reference to FIGS. 1-48.

Still referring to FIG. 49, at step 4915, method 4900 includes authenticating the fingerprint scan. This may be implemented as described and with reference to FIGS. 1-48.

Still referring to FIG. 49, at step 4920, method 4900 de-activating a locking mechanism to allow access to at least a pod upon successful authentication of the fingerprint scan. This may be implemented as described and with reference to FIGS. 1-48.

Still referring to FIG. 49, at step 4925, method 4900 dispensing, using at least a drive mechanism, the at least a pod from the magazine through an opening of the body. In a further non-limiting example, the pod may include other age restricted or person specific product, such as prescription medication, prescription medication with known abuse liability risk, recreational or medicinal *cannabis* products in jurisdictions where they have been legalized (gummies, pills, etc.), and the like. This may be implemented as described and with reference to FIGS. 1-48.

Figure 50:
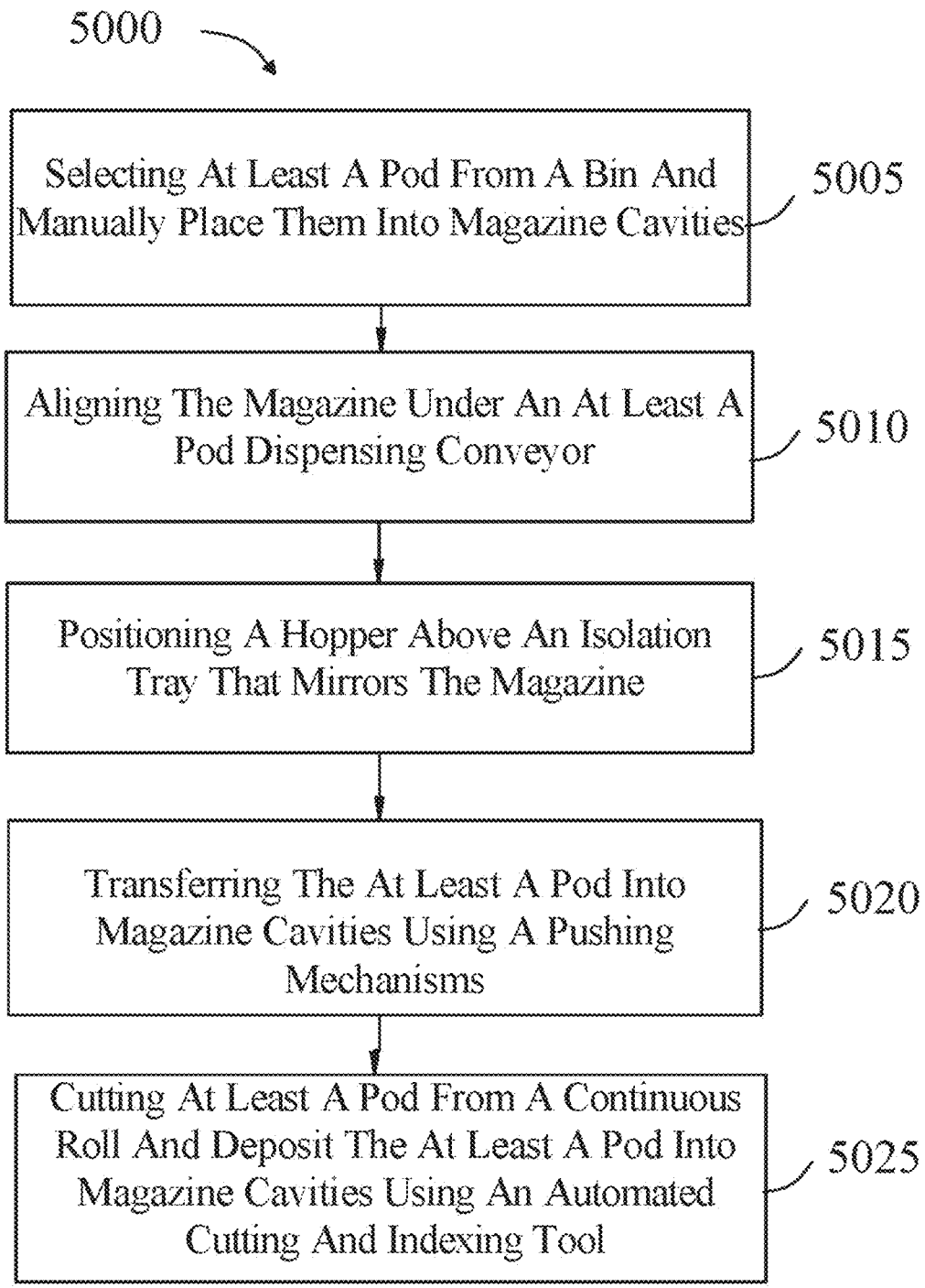
FIG. 50 is a block diagram of an exemplary method for filling an oral nicotine dispensing system.

Referring now to FIG. 50, a flow diagram of an exemplary method 5000 for filling an oral nicotine dispensing system. At step 5005, method 5000 includes selecting at least a pod from a bin and manually place them into magazine cavities. This may be implemented as described and with reference to FIGS. 1-48. At step 5010, method 5000 includes aligning the magazine under an at least a pod dispensing conveyor. This may be implemented as described and with reference to FIGS. 1-48. At step 5015, method 5000 includes positioning a hopper above an isolation tray that mirrors the magazine. This may be implemented as described and with reference to FIGS. 1-48. At step 5020, method 5000 includes transferring the at least a pod into magazine cavities using a pushing mechanisms. This may be implemented as described and with reference to FIGS. 1-48. At step 5025, method 5000 includes cutting at least a pod from a continuous roll and depositing the at least a pod into magazine cavities using an automated cutting and indexing tool. This may be implemented as described and with reference to FIGS. 1-48.

In an embodiment, there may be various methods for filling the oral nicotine dispensing system by filling the magazine with a drug product and can be classified into manual methods and automated methods. With manual methods, in one embodiment, at least a pods are selected by hand from a work in progress bin and placed manually in open cavities of magazines during the assembly process. In a further embodiment of manual methods, at least a pods are selected by hand from a work in progress bin and preloading into a reusable hopper that mirrors the geometry of the magazines. The reusable hopper tool would be aligned with the magazine open cavities and the at least a pods would be deposited in the magazine all at once due to gravity or a pushing/advancing mechanism that is calibrated to empty the at least a pod into its respective place in the magazine, before sealing the magazine.

Still referring to FIG. 50, automated methods of filling may include any of the following: 1. A tool that manipulates the magazine during assembly and places it under an automated at least a pod dispensing conveyor. After a cavity is filled the magazine is moved to index the next open cavity to receive a at least a pod from the conveyor. 2. A tool that manipulates an automated at least a pod dispensing conveyor. After a cavity is filled the conveyor dispensing point is moved to index the next open cavity to receive a at least a pod. 3. A hopper containing a surplus of many at least a pods is placed above a reusable at least a pod isolation tray. The isolation tray mirrors the geometry of the magazine. The tray is moved under the hopper and at least a pods fall into the open cavities of the tray. Due to the "falling" nature of the at least a pods each cavity is populated with a at least a pod. The tray is then shuttled horizontally to disengage with the hopper (thus stopping the movement of at least a pods from the hopper) and engages with the magazine. The at least a pods from the tray fall in a similar manner into the magazine cavities-transferring all at least a pods at once. 4. A hopper containing a surplus of many at least a pods is placed above a conveyor belt carrying magazines in a partial state of assembly. The magazine pass under the hopper and the open cavities align with the hopper exit port. The at least a pods fall from the hopper and fill the cavities of the magazines due to gravity. 5. At least a pods are manufactured in a similar manner as current best practice but not cut to isolate them individually. They are sealed as normal but not segmented. Instead, they are transported as a roll of at least a pods for easier handling. To deposit at least a pods it the magazine the at least a pods are cut from the roll as they are deposited into the magazine open cavities by an automated cutting and indexing tool. These and other methods of filling magazines may be implemented as described and with reference any embodiment as described herein.

Drug products including at least a pods require a stable moisture environment to prevent bacterial contamination or drug stability and shelf-life concerns. Various methods and apparatuses for the Prevention of Moisture Vapor Transmission exist. These include the following: 1. Magazine wrapped in foil at least a pod at point of manufacture 2. Magazine wrapped in a plastic at least a pod at point of manufacture 3. Magazine wrapped in plastic wrapper at point of manufacture 4. Magazine openings/ingress points covered with removable and disposable plastic component at point of manufacture that is removed prior to insertion into dispensing system 5. Magazine designed in such a way that all openings/ingress points have seals designed along the interfaces to create a moisture tight seal 6. Use materials in magazine with high resistance to moisture vapor transmission 7. Use materials in at least a pods with high resistance to moisture vapor transmission 8. Design dispensing device to seal magazine inside and act as moisture vapor transmission barrier 9. Add desiccating materials to magazine to absorb moisture vapor.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 51:
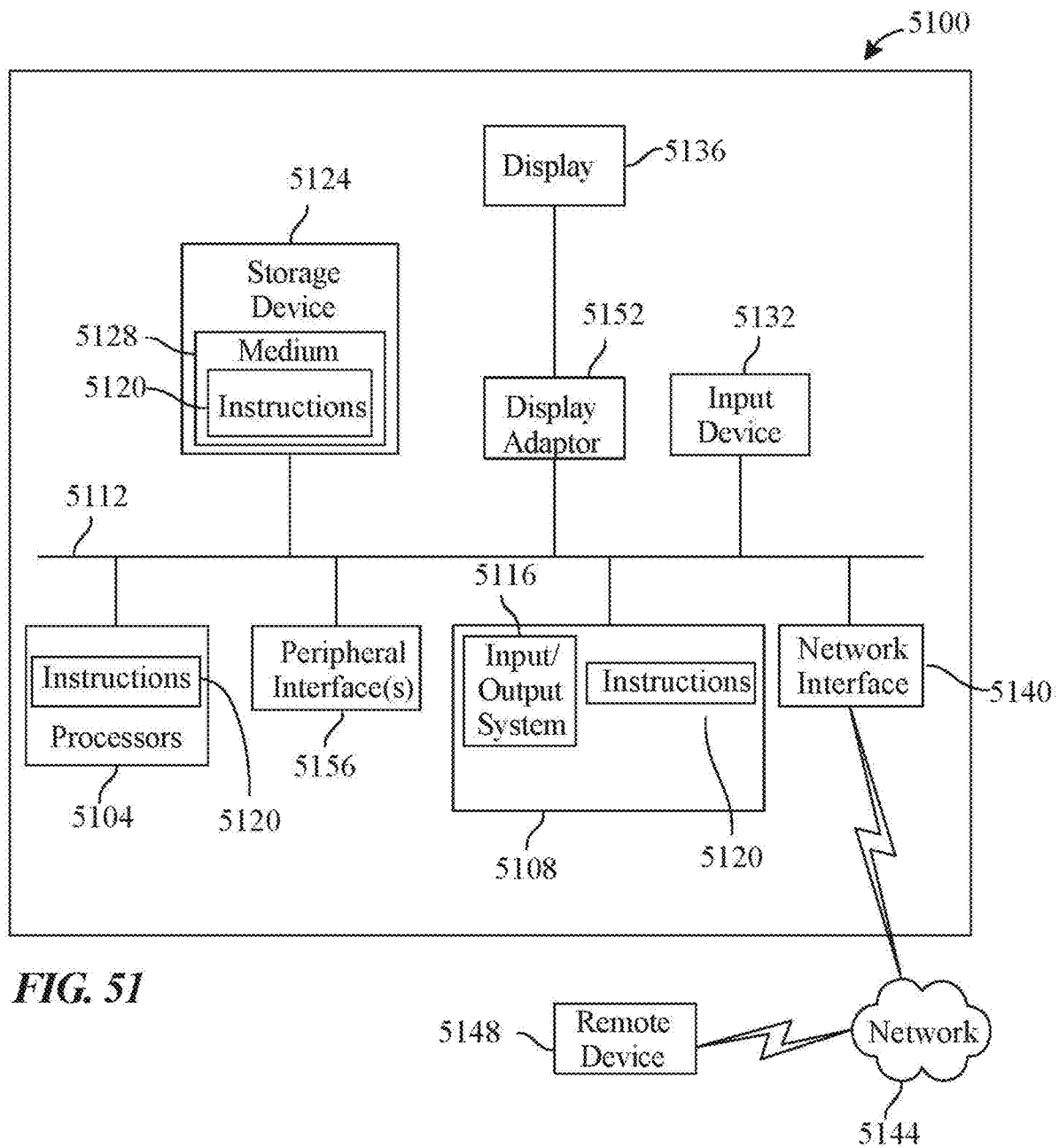
FIG. 51 is a block diagram of a computing system that can be used to implement any one or more of the methodologies disclosed herein and any one or more portions thereof.

FIG. 51 shows a diagrammatic representation of one embodiment of computing device in the exemplary form of a computer system 5100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 5100 includes a processor 5104 and a memory 5108 that communicate with each other, and with other components, via a bus 5112. Bus 5112 may include any of several types of bus structures including, but not limited to, a memory bus, a memory controller, a peripheral bus, a local bus, and any combinations thereof, using any of a variety of bus architectures.

Processor 5104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 5104 may be organized according to Von Neumann and/or Harvard architecture as a non-limiting example. Processor 5104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 5108 may include various components (e.g., machine-readable media) including, but not limited to, a random-access memory component, a read only component, and any combinations thereof. In one example, a basic input/output system 5116 (BIOS), including basic routines that help to transfer information between elements within computer system 5100, such as during start-up, may be stored in memory 5108. Memory 5108 may also include (e.g., stored on one or more machine-readable media) instructions (e.g., software) 5120 embodying any one or more of the aspects and/or methodologies of the present disclosure. In another example, memory 5108 may further include any number of program modules including, but not limited to, an operating system, one or more application programs, other program modules, program data, and any combinations thereof.

Computer system 5100 may also include a storage device 5124. Examples of a storage device (e.g., storage device 5124) include, but are not limited to, a hard disk drive, a magnetic disk drive, an optical disc drive in combination with an optical medium, a solid-state memory device, and any combinations thereof. Storage device 5124 may be connected to bus 5112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 5124 (or one or more components thereof) may be removably interfaced with computer system 5100 (e.g., via an external port connector (not shown)). Particularly, storage device 5124 and an associated machine-readable medium 5128 may provide nonvolatile and/or volatile storage of machine-readable instructions, data structures, program modules, and/or other data for computer system 5100. In one example, software 5120 may reside, completely or partially, within machine-readable medium 5128. In another example, software 5120 may reside, completely or partially, within processor 5104.

Computer system 5100 may also include an input device 5132. In one example, a user of computer system 5100 may enter commands and/or other information into computer system 5100 via input device 5132. Examples of an input device 5132 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 5132 may be interfaced to bus 5112 via any of a variety of interfaces (not shown) including, but not limited to, a serial interface, a parallel interface, a game port, a USB interface, a FIRE-WIRE interface, a direct interface to bus 5112, and any combinations thereof. Input device 5132 may include a touch screen interface that may be a part of or separate from display device 5136, discussed further below. Input device 5132 may be utilized as a user selection device for selecting one or more graphical representations in a graphical interface as described above.

A user may also input commands and/or other information to computer system 5100 via storage device 5124 (e.g., a removable disk drive, a flash drive, etc.) and/or network interface device 5140. A network interface device, such as network interface device 5140, may be utilized for connecting computer system 5100 to one or more of a variety of networks, such as network 5144, and one or more remote devices 5148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 5144, may employ a wired and/or a wireless mode of communication. In general, any network topology may be used. Information (e.g., data, software 5120, etc.) may be communicated to and/or from computer system 5100 via network interface device 5140.

Computer system 5100 may further include a video display adapter 5152 for communicating a displayable image to a display device, such as display device 5136. Examples of a display device include, but are not limited to, a liquid crystal display (LCD), a cathode ray tube (CRT), a plasma display, a light emitting diode (LED) display, and any combinations thereof. Display adapter 5152 and display device 5136 may be utilized in combination with processor 5104 to provide graphical representations of aspects of the present disclosure. In addition to a display device, computer system 5100 may include one or more other peripheral output devices including, but not limited to, an audio speaker, a printer, and any combinations thereof. Such peripheral output devices may be connected to bus 5112 via a peripheral interface 5156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The invention claimed is:

1. An apparatus for oral nicotine dispensing, wherein the apparatus comprises:
   a body;
   a magazine configured to store a plurality of pods;
   a drive mechanism coupled to the magazine and configured to guide at least one pod of the plurality of pods into a dispensing position; and
   an aperture located on the body and configured to allow for dispensing of the at least one pod from the dispensing position to an exterior environment,
   wherein the magazine comprises:
   a magazine door configured to be positioned in a closed state by default,
   a loaded spring, and
   a snap arm configured to prevent movement of the magazine door and to hold the magazine door in the closed state.

2. The apparatus of claim 1, wherein the magazine door is sprung upwards and the snap arm is a metal snap arm.

3. The apparatus of claim 2, wherein the body further comprises a magnet disposed on an inner wall of the body.

4. The apparatus of claim 3, wherein the magnet is configured to attract the snap arm away from the magazine door, thereby allowing the magazine door to translate freely.

5. The apparatus of claim 1, wherein the loaded spring is configured to hold the door in a closed state.

6. The apparatus of claim 1, wherein the drive mechanism comprises a motor, a power source, and a circuit board.

7. The apparatus of claim 1, wherein the drive mechanism comprises at least one of:
   a drive wheel and a slider;
   the drive wheel and a fork linkage; or
   a drive gear and a slider rack.

8. The apparatus of claim 6, wherein the motor is configured to spin the drive mechanism to push on the magazine door to open the magazine door.

9. The apparatus of claim 7, wherein the drive wheel is configured to push the slider in a linear motion to push the at least one pod from an interior of the magazine to an exterior of the magazine.

10. The apparatus of claim 1, wherein the body further comprises an access restriction mechanism including at least one of a radio frequency chip or a biometric sensor.

11. The apparatus of claim 1, wherein the body is formed in a cuboid shape or a cylindrical shape.

12. The apparatus of claim 6, wherein the power source comprises at least one of a battery or a piezoelectric hammer starter.

13. The apparatus of claim 6, wherein the power source is included in the magazine and is disposed to make contact with the apparatus upon insertion of the magazine.

14. The apparatus of claim 7, wherein the drive mechanism is configured to returns to a locking location after each dispensing cycle.

15. The apparatus of claim 7, wherein the slider is configured to move to a non-engaged location to allow for ejection of the magazine from the body.

16. A method for oral nicotine dispensing, the method comprising:
   providing a magazine comprising a plurality of pods, wherein the magazine comprises a magazine door configured to be positioned in a closed state by default and a snap arm configured to prevent movement of the magazine door and to hold the magazine door in the closed state;
   inserting the magazine into a body of a dispenser, wherein the insertion deactivates at least one mechanism configured to prevent opening of the magazine door; and
   using a drive mechanism disposed within the dispenser to open the magazine door and push at least one pod of the plurality of pods from an interior of the magazine to an exterior of the magazine.

17. The method of claim 16, wherein the body further comprises a magnet disposed on an inner wall of the body.

18. The method of claim 16, wherein the deactivation of the at least one mechanism configured to prevent opening of the magazine door is initiated by an interaction between the magnet and a ferrous metal component.

19. The method of claim 16, wherein the snap arm is a metal snap arm.

20. The method of claim 19, wherein the magnet is configured to attract the snap arm away from the magazine door, thereby allowing the magazine door to translate freely.

* * * * *